United States Patent
Buchalter et al.

(10) Patent No.: US 11,610,232 B2
(45) Date of Patent: *Mar. 21, 2023

(54) SYSTEMS AND METHODS FOR USING SERVER SIDE COOKIES BY A DEMAND SIDE PLATFORM

(71) Applicant: MediaMath, Inc., New York, NY (US)

(72) Inventors: Yehuda Ari Buchalter, Forest Hills, NY (US); Paul M. Mason, Brooklyn, NY (US); Joseph M. Zawadzki, New York, NY (US); Roland G. Cozzolino, East Williston, NY (US); Leo T. Craig, Herndon, VA (US)

(73) Assignee: MediaMath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,954

(22) Filed: Mar. 15, 2022

(65) Prior Publication Data
US 2022/0318855 A1 Oct. 6, 2022

Related U.S. Application Data

(63) Continuation of application No. 17/306,375, filed on May 3, 2021, now Pat. No. 11,308,526, which is a (Continued)

(51) Int. Cl.
G06Q 30/02 (2012.01)
G06Q 30/0273 (2023.01)
(Continued)

(52) U.S. Cl.
CPC ......... G06Q 30/0275 (2013.01); G06Q 30/02 (2013.01); G06Q 30/0241 (2013.01); G06Q 30/0255 (2013.01); G06Q 30/08 (2013.01)

(58) Field of Classification Search
CPC ............... G06Q 30/02; G06Q 30/0275; G06Q 30/0241; G06Q 30/0255; G06Q 30/08; G06Q 30/0207–30/0277
See application file for complete search history.

(56) References Cited

U.S. PATENT DOCUMENTS 5,923,902 A 7/1999 Inagaki
5,983,227 A 11/1999 Nazem et al.
(Continued)

FOREIGN PATENT DOCUMENTS

JP 2007535687 12/2007
KR 20020028238 4/2002
(Continued)

OTHER PUBLICATIONS

"Online Customized Ads Move a Step Closer" printed Sep. 6, 2007.
(Continued)

Primary Examiner — Thuy N Nguyen
(74) Attorney, Agent, or Firm — Knobbe, Martens, Olson & Bear, LLP

(57) ABSTRACT

The present disclosure is directed to methods for identifying a user by a demand side platform (DSP) across advertiser exchanges. The method includes establishing, by a DSP, a cookie mapping for a user. The cookie mapping includes a mapping of user identifiers for the user from advertisement exchanges to a user identifier assigned by the DSP for the user. The DSP stores to the cookie mapping a first mapping to the user identifier of the DSP, comprising a first user id received by a bidder from a first exchange and a first exchange id for the first exchange. A bidder inserts a pixel into a bid for an impression opportunity to a second
(Continued)

exchange. The pixel includes a key to the cookie mapping and a second user id for the user and a second exchange id. The second user id is received by the bidder from a second exchange.

20 Claims, 33 Drawing Sheets

Related U.S. Application Data continuation of application No. 16/773,073, filed on Jan. 27, 2020, now Pat. No. 11,080,763, which is a continuation of application No. 16/386,003, filed on Apr. 16, 2019, now Pat. No. 10,636,060, which is a continuation of application No. 14/853,712, filed on Sep. 14, 2015, now Pat. No. 10,332,156, which is a continuation of application No. 13/076,279, filed on Mar. 30, 2011, now Pat. No. 9,135,655.

(60) Provisional application No. 61/319,561, filed on Mar. 31, 2010, provisional application No. 61/319,547, filed on Mar. 31, 2010.

(51) Int. Cl.
*G06Q 30/0241* (2023.01)
*G06Q 30/0251* (2023.01)
*G06Q 30/08* (2012.01)

(56) References Cited

U.S. PATENT DOCUMENTS

| | | |
|---|---|---|
| 6,269,361 B1 | 7/2001 | Davis et al. |
| 6,285,983 B1 | 9/2001 | Jenkins |
| 6,327,574 B1 | 12/2001 | Kramer et al. |
| 6,430,539 B1 | 8/2002 | Lazarus et al. |
| 6,766,327 B2 | 7/2004 | Morgan et al. |
| 6,938,022 B1 | 8/2005 | Singhal |
| 6,941,376 B2 | 9/2005 | Mitchell et al. |
| 6,974,078 B1 | 12/2005 | Simon |
| 7,013,290 B2 | 3/2006 | Ananian |
| 7,069,256 B1 | 6/2006 | Campos |
| 7,139,723 B2 | 11/2006 | Conkwright et al. |
| 7,146,329 B2 | 12/2006 | Conkwright et al. |
| 7,197,472 B2 | 3/2007 | Conkwright et al. |
| 7,197,568 B2 * | 3/2007 | Bourne .......... H04L 29/06 709/229 |
| 7,203,909 B1 | 4/2007 | Horvitz |
| 7,219,078 B2 | 5/2007 | Lamont et al. |
| 7,236,941 B2 | 6/2007 | Conkwright et al. |
| 7,257,546 B2 * | 8/2007 | Ebrahimi .......... G06Q 30/02 705/14.73 |
| 7,523,087 B1 | 4/2009 | Agarwal et al. |
| 7,630,986 B1 | 12/2009 | Herz et al. |
| 7,685,232 B2 | 3/2010 | Gibbs et al. |
| 7,792,697 B2 | 9/2010 | Bhagchandani et al. |
| 7,805,332 B2 * | 9/2010 | Wilson .......... G06Q 30/02 705/14.66 |
| 7,840,438 B2 | 11/2010 | Carson et al. |
| 7,848,950 B2 | 12/2010 | Herman et al. |
| 7,860,743 B2 | 12/2010 | Stevens |
| 8,001,004 B2 | 8/2011 | Protheroe et al. |
| 8,086,697 B2 | 12/2011 | Goulden et al. |
| 8,108,254 B2 | 1/2012 | Lin et al. |
| 8,117,067 B2 | 2/2012 | Ketchum |
| 8,117,199 B2 | 2/2012 | Ghani et al. |
| 8,160,977 B2 | 4/2012 | Poulin |
| 8,175,950 B1 | 5/2012 | Grebeck et al. |
| 8,255,285 B1 | 8/2012 | Peretz et al. |
| 8,255,489 B2 | 8/2012 | Agergan et al. |
| 8,375,046 B2 * | 2/2013 | Dertinger .......... G06F 16/256 707/763 |
| 8,392,246 B2 | 3/2013 | Coladonato et al. |
| 8,527,342 B2 | 9/2013 | Feuerstein et al. |
| 8,548,909 B1 | 10/2013 | Snow et al. |
| 8,688,522 B2 | 4/2014 | Gern et al. |
| 8,782,249 B1 | 7/2014 | Hood |
| 8,972,530 B2 | 3/2015 | Agergan et al. |
| 9,047,612 B2 | 6/2015 | Anderson et al. |
| 9,076,166 B1 | 7/2015 | Peretz et al. |
| 9,135,655 B2 | 9/2015 | Buchalter et al. |
| 9,497,496 B1 | 11/2016 | Corley et al. |
| 10,191,972 B2 | 1/2019 | Maher et al. |
| 10,223,703 B2 | 3/2019 | Buchalter et al. |
| 10,332,156 B2 | 6/2019 | Buchalter et al. |
| 10,354,276 B2 | 7/2019 | Schobeiri et al. |
| 10,467,659 B2 | 11/2019 | Chalasani et al. |
| 10,592,910 B2 | 3/2020 | Buchalter |
| 10,628,859 B2 | 4/2020 | Buchalter et al. |
| 10,636,060 B2 | 4/2020 | Buchalter et al. |
| 11,049,118 B2 | 6/2021 | Buchalter |
| 2001/0037361 A1 | 11/2001 | Croy |
| 2001/0049620 A1 | 12/2001 | Blasko |
| 2001/0053995 A1 | 12/2001 | Nishimoto |
| 2002/0052825 A1 | 5/2002 | Bensemana |
| 2002/0055880 A1 | 5/2002 | Unold et al. |
| 2002/0059369 A1 | 5/2002 | Kern et al. |
| 2002/0065797 A1 | 5/2002 | Meidan et al. |
| 2002/0087573 A1 | 7/2002 | Reuning et al. |
| 2002/0087967 A1 | 7/2002 | Conkwright et al. |
| 2002/0103698 A1 | 8/2002 | Cantrell |
| 2002/0116491 A1 | 8/2002 | Boyd et al. |
| 2002/0133490 A1 | 9/2002 | Conkwright et al. |
| 2002/0188508 A1 | 12/2002 | Lee et al. |
| 2002/0194434 A1 | 12/2002 | Kurasugi |
| 2003/0018550 A1 | 1/2003 | Rotman et al. |
| 2003/0023489 A1 | 1/2003 | McGuire et al. |
| 2003/0033202 A1 | 2/2003 | Ogawa et al. |
| 2003/0101454 A1 | 5/2003 | Ozer et al. |
| 2003/0135464 A1 | 7/2003 | Mourad et al. |
| 2003/0149622 A1 | 8/2003 | Singh et al. |
| 2003/0208754 A1 | 11/2003 | Sridhar et al. |
| 2004/0054589 A1 | 3/2004 | Nicholas et al. |
| 2004/0073553 A1 | 4/2004 | Brown et al. |
| 2004/0083133 A1 | 4/2004 | Nicholas et al. |
| 2004/0123247 A1 | 6/2004 | Wachen et al. |
| 2004/0215501 A1 | 10/2004 | D'ornano |
| 2004/0225562 A1 | 11/2004 | Turner |
| 2005/0027593 A1 * | 2/2005 | Wilson .......... G06Q 30/0269 705/14.53 |
| 2005/0038700 A1 | 2/2005 | Doemling et al. |
| 2005/0080775 A1 | 4/2005 | Colledge et al. |
| 2005/0105513 A1 | 5/2005 | Sullivan et al. |
| 2005/0125289 A1 | 6/2005 | Beyda et al. |
| 2005/0144065 A1 | 6/2005 | Calabria et al. |
| 2005/0144072 A1 | 6/2005 | Perkowski et al. |
| 2005/0144073 A1 | 6/2005 | Morrisroe et al. |
| 2005/0159921 A1 | 7/2005 | Lourviere et al. |
| 2005/0171843 A1 | 8/2005 | Brazell et al. |
| 2005/0188400 A1 | 8/2005 | Topel |
| 2005/0197954 A1 | 9/2005 | Maitland et al. |
| 2005/0216339 A1 | 9/2005 | Brazell et al. |
| 2005/0235030 A1 | 10/2005 | Lauckhart et al. |
| 2005/0240354 A1 | 10/2005 | Mamou et al. |
| 2005/0251444 A1 | 11/2005 | Varian et al. |
| 2005/0261062 A1 | 11/2005 | Lewin |
| 2005/0273388 A1 | 12/2005 | Roetter |
| 2006/0026067 A1 | 2/2006 | Nicholas et al. |
| 2006/0031301 A1 | 2/2006 | Herz et al. |
| 2006/0041661 A1 | 2/2006 | Erikson et al. |
| 2006/0128469 A1 | 6/2006 | Willis et al. |
| 2006/0212350 A1 | 9/2006 | Ellis et al. |
| 2006/0224447 A1 | 10/2006 | Koningstein |
| 2006/0253323 A1 | 11/2006 | Phan et al. |
| 2007/0033105 A1 | 2/2007 | Collins et al. |
| 2007/0033269 A1 | 2/2007 | Atkinson et al. |
| 2007/0033532 A1 | 2/2007 | Lemelson |
| 2007/0050244 A1 | 3/2007 | Stevens |
| 2007/0061195 A1 | 3/2007 | Liu et al. |
| 2007/0118796 A1 | 5/2007 | Nazem et al. |
| 2007/0143171 A1 | 6/2007 | Boyd et al. |
| 2007/0150353 A1 | 6/2007 | Krassner et al. |

(56) References Cited

U.S. PATENT DOCUMENTS

| | | |
|---|---|---|
| 2007/0156524 A1 | 7/2007 | Grouf et al. |
| 2007/0157245 A1 | 7/2007 | Collins |
| 2007/0192356 A1 | 8/2007 | O'Kelley |
| 2007/0198350 A1 | 8/2007 | O'Kelley et al. |
| 2007/0214037 A1 | 9/2007 | Shubert et al. |
| 2007/0265923 A1 | 11/2007 | Krassner et al. |
| 2007/0271392 A1 | 11/2007 | Khopkar et al. |
| 2007/0271501 A1 | 11/2007 | Vasilik |
| 2007/0271511 A1 | 11/2007 | Khopkar et al. |
| 2008/0004954 A1 | 1/2008 | Horvitz |
| 2008/0021778 A1 | 1/2008 | Perkowski et al. |
| 2008/0052278 A1 | 2/2008 | Zlotin et al. |
| 2008/0052413 A1 | 2/2008 | Wang et al. |
| 2008/0086380 A1 | 4/2008 | Cohen et al. |
| 2008/0097832 A1 | 4/2008 | Lee et al. |
| 2008/0103799 A1 | 5/2008 | Domenikos et al. |
| 2008/0103800 A1 | 5/2008 | Domenikos et al. |
| 2008/0103895 A1 | 5/2008 | Burdick et al. |
| 2008/0109376 A1 | 5/2008 | Walsh et al. |
| 2008/0162574 A1 | 7/2008 | Gilbert |
| 2008/0189175 A1 | 8/2008 | Chan |
| 2008/0249855 A1 | 10/2008 | Collins et al. |
| 2008/0255922 A1 | 10/2008 | Feldman et al. |
| 2008/0256061 A1 | 10/2008 | Chang et al. |
| 2008/0262907 A1 | 10/2008 | Broady et al. |
| 2008/0275757 A1 | 11/2008 | Sharma et al. |
| 2008/0313027 A1 | 12/2008 | Jain et al. |
| 2009/0002852 A1 | 1/2009 | Wang |
| 2009/0012852 A1* | 1/2009 | O'Kelley ........... G06Q 30/0277 |
| | | 705/14.53 |
| 2009/0063250 A1 | 3/2009 | Burgess |
| 2009/0083145 A1 | 3/2009 | Lee |
| 2009/0098891 A1 | 4/2009 | Park et al. |
| 2009/0112629 A1 | 4/2009 | Leiper |
| 2009/0150362 A1 | 6/2009 | Evenhaim |
| 2009/0216619 A1 | 8/2009 | Tavernier |
| 2009/0228397 A1 | 9/2009 | Tawakol et al. |
| 2009/0327006 A1 | 12/2009 | Hansan |
| 2010/0023863 A1 | 1/2010 | Cohen-Martin |
| 2010/0042497 A1 | 2/2010 | Pritchard et al. |
| 2010/0049602 A1 | 2/2010 | Softky |
| 2010/0070322 A1 | 3/2010 | Lahaie et al. |
| 2010/0082402 A1 | 4/2010 | Kantak et al. |
| 2010/0082429 A1 | 4/2010 | Samdadiya et al. |
| 2010/0094758 A1 | 4/2010 | Chamberlain et al. |
| 2010/0100407 A1 | 4/2010 | Lin et al. |
| 2010/0114716 A1 | 5/2010 | Heilig et al. |
| 2010/0145763 A1 | 6/2010 | Swanson |
| 2010/0185516 A1 | 7/2010 | Swanson et al. |
| 2010/0191558 A1 | 7/2010 | Chickering et al. |
| 2010/0228634 A1* | 9/2010 | Ghosh ............... G06Q 30/0275 |
| | | 705/14.71 |
| 2010/0250332 A1 | 9/2010 | Ghosh et al. |
| 2010/0268603 A1* | 10/2010 | Nolet ................. G06Q 30/02 |
| | | 705/14.53 |
| 2011/0035259 A1 | 2/2011 | Das et al. |
| 2011/0035287 A1 | 2/2011 | Fox |
| 2011/0055009 A1 | 3/2011 | Kiversis |
| 2011/0078143 A1 | 3/2011 | Aggarwal |
| 2011/0119125 A1 | 5/2011 | Javangula et al. |
| 2011/0145570 A1 | 6/2011 | Gressel et al. |
| 2011/0191714 A1 | 8/2011 | Ting et al. |
| 2011/0213659 A1 | 9/2011 | Fontoura et al. |
| 2011/0225037 A1 | 9/2011 | Tunca et al. |
| 2011/0231264 A1* | 9/2011 | Dilling ............... G06Q 30/0251 |
| | | 705/14.71 |
| 2011/0246298 A1 | 10/2011 | Williams et al. |
| 2011/0246310 A1 | 10/2011 | Buchalter et al. |
| 2011/0251875 A1 | 10/2011 | Cosman |
| 2011/0276389 A1 | 11/2011 | Kulkarni et al. |
| 2011/0313757 A1 | 12/2011 | Hoover et al. |
| 2012/0041816 A1 | 2/2012 | Buchalter |
| 2012/0129525 A1* | 5/2012 | Pazhyannur ......... H04W 36/08 |
| | | 455/436 |
| 2012/0215607 A1 | 8/2012 | Brereton, II et al. |
| 2012/0226560 A1 | 9/2012 | Chang et al. |
| 2012/0253928 A1* | 10/2012 | Jackson ............... G06Q 30/02 |
| | | 705/14.49 |
| 2012/0323674 A1 | 12/2012 | Simmons et al. |
| 2013/0124316 A1 | 5/2013 | Kiversis |
| 2013/0124669 A1 | 5/2013 | Anderson et al. |
| 2013/0185039 A1 | 7/2013 | Tesauro et al. |
| 2013/0276009 A1 | 10/2013 | Ajitomi et al. |
| 2013/0346597 A1 | 12/2013 | Baumback et al. |
| 2014/0059343 A1 | 2/2014 | Mohajeri et al. |
| 2014/0082660 A1 | 3/2014 | Zhang et al. |
| 2014/0108139 A1 | 4/2014 | Weinstein |
| 2014/0143032 A1 | 5/2014 | Tomlin et al. |
| 2014/0201007 A1 | 7/2014 | Stack et al. |
| 2014/0222593 A1 | 8/2014 | Cosman |
| 2014/0279595 A1 | 9/2014 | Senaratna et al. |
| 2015/0051986 A1 | 2/2015 | Saifee et al. |
| 2015/0066793 A1 | 3/2015 | Brown |
| 2015/0193818 A1 | 7/2015 | Turner et al. |
| 2015/0042379 A1 | 8/2015 | Kuivinen et al. |
| 2015/0242379 A1 | 8/2015 | Kuivinen et al. |
| 2015/0347353 A1 | 12/2015 | Turner et al. |
| 2015/0348141 A1 | 12/2015 | Parker et al. |
| 2016/0071168 A1 | 3/2016 | Buchalter et al. |
| 2016/0170567 A1 | 6/2016 | Hunter et al. |
| 2016/0316240 A1 | 10/2016 | Hirsch et al. |
| 2017/0052652 A1 | 2/2017 | Denton et al. |
| 2017/0330245 A1 | 11/2017 | Guermas et al. |
| 2018/0040032 A1 | 2/2018 | Chalasani et al. |
| 2018/0189843 A1 | 7/2018 | Kulkarni et al. |
| 2019/0205900 A1 | 7/2019 | Buchalter |
| 2019/0244257 A1 | 8/2019 | Goldman et al. |
| 2019/0340655 A1 | 11/2019 | Buchalter et al. |
| 2019/0347693 A1 | 11/2019 | Schobeiri et al. |
| 2019/0347697 A1 | 11/2019 | Chalasani et al. |
| 2019/0373077 A1 | 12/2019 | Lepore et al. |
| 2020/0160388 A1 | 5/2020 | Sabeg et al. |
| 2021/0090126 A1 | 3/2021 | Schobeiri et al. |
| 2021/0125223 A1 | 4/2021 | Schobeiri et al. |

FOREIGN PATENT DOCUMENTS

| | | |
|---|---|---|
| KR | 20000030103 | 8/2008 |
| WO | WO 2005/094175 | 10/2005 |
| WO | WO 2009/078861 | 6/2009 |
| WO | WO 2012/167209 | 12/2012 |
| WO | WO 2014/074347 | 5/2014 |

OTHER PUBLICATIONS

"Yahoo New "SmartAds" Meld Brand and Direct Response Advertising" printed Sep. 6, 2007.

"Yahoo Smart Ads Demo Page" printed Sep. 6, 2007.

Abacus Selects MicroStrategy for Enhanced Marketing Campaign Reporting and Analysis, PRNewswire, Mar. 1, 2006, Retrieved from: http://prnewswire.com/news-releases/abacus-selects-microstrategy-for-enhanced-marketing-campaign-reporting-and-analysis-55192512.html (1 page).

Chen, M., et al., Mining changes in customer behavior in retail marketing, 2005, pp. 773-781, Expert Systems with Application, vol. 28, 9 pages.

Eric W. Tyree et al, Bankruptcy prediction models: probabilistic neural networks versus discriminant analysis and backpropagation neural networks, 1996.

EP Extended Search Report for Application No. 11713434.6 dated Feb. 24, 2014.

EP Supplementary Search Report for Application No. 11713434.6 dated Mar. 13, 2014.

Fu, A., et al., Privacy-Preserving Frequent Pattern Mining Across Private Databases, 2005, Proceeding of the Fifth IEEE International Conference on Data Mining, 4 Pages.

Google, A Revolution in Measuring Ad Effectiveness: Knowing Who Would have Been Exposed. 2015.

International Preliminary Report on Patentability dated Jan. 31, 2013 in PCT Application No. PCT/US2011/044386.

(56) References Cited

OTHER PUBLICATIONS

International Search Report and Written Opinion dated Jan. 27, 2012 in PCT Application No. PCT/US2011/030587.
International Search Report and Written Opinion dated Jan. 9, 2012 in PCT Application No. PCT/US2011/044386.
International Search Report and Written Opinion dated Feb. 24, 2014 in PCT Application No. PCT/US13/67330.
International Search Report and Written Opinion PCT/US11/43231 dated Jan. 19, 2012.
Privacy Preserving Data Mining Biography, Retrieved from: http://www.cs.umbc.edu/-kunliu1/research/privacy_review.html (12 pages).
Sammy, Ryan, Google's New Beta PPC Service Dubbed Remarketing, retrieved from internet: www.searchenginejournal.com/google%E2%80%99s-new-beta-ppc-service-dubbed-remarketing/18900/ (posted on Mar. 17, 2010).
Seufert, Eric, Measuring advertising incrementality using Ghost Ads, 2014 (Year: 2014).
University of Colorado Boulder Web Central, Expandable Content Sample, Apr. 4, 2016, (https://www.colorado.edu/webcentral/webexpress-features/site-building-snap/expandable-content-sample (Year: 2016).
Wikipedia contributors. "Conditional probability distribution." Wikipedia, The Free Encyclopedia, Mar. 10, 2016 Web. Mar. 30, 2016.
Wikipedia contributors. "Posterior probability." Wikipedia, The Free Encyclopedia. Wikipedia, The Free Encyclopedia, Mar. 9, 2016. Web. Mar. 30, 2016.
Wikipedia contributors. "Probability distribution." Wikipedia, The Free Encyclopedia. Wikipedia, The Free Encyclopedia, Mar. 28, 2016. Web. Mar. 30, 2016.
Wikipedia contributors. "Stepwise regression." Wikipedia, The Free Encyclopedia. Wikipedia, The Free Encylcopedia, Mar. 19, 2016. Web. Mar. 30, 2016.
Xiong, L., et al., k Nearest Neighbor Classification across Multiple Private Databases, Nov. 5-11, 2006, CIKM'06, 2 pages.
Sweeney, "How Real-Time Bidding (RTB) Changed Online Display Advertising", Clearcode Blog, Jan. 8, 2015 https://clearcode.cc/blog/real-time-bidding-online-display-advertising/[Feb. 3, 2021 11:48:43 AM].
Hornyack, et al. ("These aren't the droids you're looking for: retrofitting android to protect data from imperious applications," in Proceedings of the 18th ACM conference on Computer and cummuications security (CCS '11), Association for Computing Machinery, New York, NY, USA, 639-652. 2011. (Year:2011).

\* cited by examiner

| Parameter | Parameter/Data Name | Exh A | Exh B | Exh C | Exh D | Exh N |
|---|---|---|---|---|---|---|
| P1 | API format | POST, Google protocol | GET, query string params | POST, JSON | GET, query string params | POST, Google protocol |
| P2 | Response Time | buffer | 150ms | | 75ms | buffer |
| P3 | RequestID | | admeld_request_id | bid_request_guid | requestId | 125ms |
| P4 | UserID | google_user_id | admeld_user_id | adbrite_visitor_id | uid | request_id |
| P5 | Ext UserID | | external_user_id | | | user_cookie_id |
| P6 | IP | ip | ip_address | visitor_ip | ip | user_ip_address |
| P7 | TimeZone | | time_zone | geo_data.timezone | timezone | |
| P8 | Language | detected_language | language | | language | user_lang |
| P9 | Browser | user_agent | user_agent | user_agent | browser | user_agent |
| P10 | Site URL | | | zone_data.zone_url | site-url | |
| P11 | Page URL | url | url | page_data.page_url | pageurl | url |
| P12 | Referrer (of Page URL) | | refer_url | | refurl | http_referer |
| P13 | Cookie | | via request's "Cookie" header | partner_visitor_data | cookie | |
| P14 | Category | detected_vertical, AdSlot.targetable_channel | | | | ox_cat_tier_1, ox_cat_tier_2 |
| P15 | PublisherID | | | zone_data.zone_quality | | |
| P16 | TagID | anonymous_id | admeld_tag_id | zone_data.zone_id | | |
| P17 | SiteID | | admeld_website_id | | adid | |
| P18 | Age | | | demo_data.age | | |
| P19 | Gender | | | demo_data.gender | | |
| P20 | Country | country | | geo_data.country | | user_geo_country |
| P21 | Region | region | | | | user_geo_state |
| P22 | DMA | metro | | geo_data.dma | | user_geo_dma |
| P23 | City | city | | | | |
| P24 | AdTagType (js, html) | | | zone_data.supported_ad_types | adTagType | |
| P25 | AdType | AdSlot.excluded_attribute? | | zone_data.weight | | pub_blocked_type |
| P26 | Width | AdSlot.width | size (wxh) | zone_data.height | adWidth | ad_width |
| P27 | Height | AdSlot.height | size (wxh) | | adHeight | ad_height |
| P28 | ScreenWidth | | | | screenResolution (WxH) | user_screen_width |
| P29 | ScreenHeight | | | session_data.number_of_page_views | screenResolution (WxH) | user_screen_height |
| P30 | Frequency | | | page_data.number_of_ads_on_page | | |
| P31 | Ads on Page | | | | | |
| | | hashed_cookie, cookie_version, excluded_click_through_url, AdSlot.allowed_vendor_type, AdSlot.excluded_category, AdSlot.id, MatchingAdData.adgroup_id | view_count, position, max_response_time | zone_data.supported_rich_media_vendorss, impression_attributes, zone_keywords, session_data.previous_page, view_time | bidCurrency | pub_blocked_content, pub_blocked_url, pub_blocked_cat |
| PN | Others | | | | | |

*Fig. 2H*

| Para-meter | Parameter/ Data Name | Exh A | Exh B | Exh C | Exh D | Exh N |
|---|---|---|---|---|---|---|
| P1 | API format | Google protocol buffer | JSON | JSON | Plain text | Google protocol buffer |
| P2 | Response size | < 1K | not specified | not specified | not specified | <1K |
| P3 | Response Code | - | - | response_code : "bid", "error code", "pass" | - | - |
| P5 | CPM | - | cpm | bid_amount | bid | cpm_bid_micros |
| P6 | Creative | AdSlot.max_cpm_micros | creative | ad_code | either: creativeHTMLURL or creativeJSURL | ad_code |
| P7 | Creative ID | html_snippet | creative_id | - | - | - |
| P8 | Creative Attribute | - | - | - | - | - |
| P9 | Click-thru URL | attribute | - | - | - | click_url |
| P10 | Request ID | click_through_url | request_id | - | request_id | request_id |
| P11 | Transaction ID | AdSlot.id (not quite) | - | - | id | - |
| P12 | Brand Type | - | - | - | - | - |
| P13 | Notification URL | vendor_type | - | win_feedback_image_url | - | - |
| P14 | Piggyback Cookie | - | - | - | piggybackCookie | - |
| P15 | Others | processing_time_ms, AdSlot.min_cpm_micros | brand_name, brand_id, filter | win_feedback_html, visitor_ignore_interval, | bidCurrency | - |

SYSTEMS AND METHODS FOR USING SERVER SIDE COOKIES BY A DEMAND SIDE PLATFORM

RELATED APPLICATIONS

This present application is a continuation of and claims priority to and the benefit of U.S. patent application Ser. No. 17/306,375, entitled "SYSTEMS AND METHODS FOR USING SERVER SIDE COOKIES BY A DEMAND SIDE PLATFORM," filed May 3, 2021, which is a continuation of U.S. patent application Ser. No. 16/773,073, entitled "SYSTEMS AND METHODS FOR USING SERVER SIDE COOKIES BY A DEMAND SIDE PLATFORM," filed Jan. 7, 2020, which is a continuation of U.S. patent application Ser. No. 16/386,003, entitled "SYSTEMS AND METHODS FOR USING SERVER SIDE COOKIES BY A DEMAND SIDE PLATFORM," filed Apr. 16, 2019, which is a continuation of U.S. patent application Ser. No. 14/853,712, entitled "SYSTEMS AND METHODS FOR USING SERVER SIDE COOKIES BY A DEMAND SIDE PLATFORM," filed Sep. 14, 2015, which is a continuation of U.S. patent application Ser. No. 13/076,279, entitled "SYSTEMS AND METHODS FOR USING SERVER SIDE COOKIES BY A DEMAND SIDE PLATFORM," filed Mar. 30, 2011, which claims priority to and is a Non-provisional Application of U.S. Provisional Patent Application Ser. No. 61/319,547 entitled "SYSTEMS AND METHODS FOR PROVIDING A DEMAND SIDE PLATFORM," filed on Mar. 31, 2010 and U.S. Provisional Patent Application Ser. No. 61/319,561 entitled "SYSTEMS AND METHODS FOR INTEGRATION OF A DEMAND SIDE PLATFORM," filed on Mar. 31, 2010. The entire contents of each of the foregoing applications are hereby incorporated herein by reference for all purposes.

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

FIELD OF THE DISCLOSURE

This disclosure generally relates to systems and methods for trading online advertising space. In particular, this disclosure relates to systems and methods for integrating multiple pools of impression opportunities from multiple advertising exchanges for bidding by advertisers directly provided by or related to the online publishers. In some embodiments, these impression opportunities are available to advertisers for a price. These impression opportunities are sometimes made available directly to advertisers or through one or more advertising networks (sometimes referred to as "ad networks") operating as middlemen. In some embodiments, advertising exchanges provide a platform for buying and selling advertising impressions by consolidating and managing impression opportunities across a plurality of publishers. Advertisers interested in impression opportunities may comprise an individual, company or other client entity, which may be further represented by one or more advertising agencies. An advertising agency may design and/or implement an advertising campaign on behalf of a client and procure or buy impression opportunities based on the advertising campaign. As online activity trends upwards and advertisers are looking for the right media to maximize their online exposure, trading in impression opportunities have become increasingly sophisticated.

BRIEF SUMMARY OF THE DISCLOSURE

In various aspects, the present application is directed to methods and systems for providing a demand side platform, which integrates multiple pools of impression opportunities from multiple exchanges for bidding by advertisers. In some embodiments, the system includes a platform, sometimes referred to as a demand side platform (DSP). The DSP may provide an advertiser access to a plurality of impression opportunities provided via different providers, such as ad exchanges. The DSP may function as an interface between the plurality of providers (or sellers) and the advertisers (buyers). The DSP may process information associated with the various impression opportunities and normalize these into appropriate parameters for comparison against goals and constraints set by advertisers. In some embodiments, the DSP may statistically and/or intelligently process past and present information to help the advertiser customize, determine or develop an ad campaign against the goals and constraints set by the advertisers. Based on the ad campaign, the DSP may determine a bidding process or rule set. The DSP may determine whether to bid for an impression opportunity based on its normalized parameters. The DSP may dynamically update the bidding rule set based on bidding outcomes and/or market dynamics.

In one aspect, the present invention is related to method for matching, by a demand side service, an advertisement with an impression of a plurality of impressions available across a plurality of impression opportunity providers. The method may include receiving, by a demand side service executing on one or more servers, a request to bid for placement of an advertisement on one or more impression opportunities from a plurality of impression opportunities available across a plurality of impression opportunity providers. The demand side service may determine an impression opportunity from the plurality of impression opportunities to bid on. The demand side service may communicate, via a network, one or more bids via an interface to an impression opportunity provider of the plurality of impression opportunity providers. The demand side service may complete a transaction to procure the impression opportunity from the impression opportunity provider responsive to a winning bid from the one or more bids.

In some embodiments, the demand side service provides to a requestor of the request a single interface for bidding on impression opportunities across different impression opportunity providers. The demand side service may provide to a requestor of the request a single interface for bidding on impression opportunities across different data interfaces to each of the plurality of impression opportunity providers. The demand side service may receive the request comprising a goal for an ad campaign. In certain embodiments, the demand side service receives the request comprising a constraint for placement of the advertisement.

In certain embodiments, the demand side service determines the impression opportunity to bid on based on a goal of an ad campaign specified by the request. The demand side service may determine the impression opportunity to bid on based on a constraint specified by the request. A bidding engine of the demand side service may determine a price of a bid based on one or more bidding rules. The demand side service may automatically deliver the advertisement to the procured impression opportunity. The demand side service may determine an estimate of daily impression opportunities across the plurality of impression opportunity providers.

In another aspect, the present invention is related to a system for matching, by a demand side platform, an advertisement with an impression of a plurality of impressions available across a plurality of impression opportunity providers. The system may include a demand side platform executing on one or more servers. The demand side platform may match advertisements with impressions from a plurality of impression opportunities offered by a plurality of impression opportunity providers. A bidder of the demand side platform may receive a request to bid on one or more impressions for placement of an advertisement for an advertiser. The bidder may determine an impression opportunity of the plurality of impression opportunities to bid on. In certain embodiments, the bidder communicates one or more bids via an interface to an impression opportunity provider of the plurality of impression opportunity providers. The bidder may complete, responsive to a winning bid of the one or more bids, a transaction to procure the impression opportunity from the impression opportunity provider.

In some embodiments, the demand side platform provides to a requestor of the request a single interface for bidding on impression opportunities across different impression opportunity providers. The demand side service may provide to a requestor of the request a single interface for bidding on impression opportunities across different data interfaces to each of the plurality of impression opportunity providers. The demand side service may receive the request comprising a goal for an ad campaign. The demand side service may receive the request comprising a constraint for placement of the advertisement.

In certain embodiments, the bidder determines the impression opportunity to bid on based on a goal of an ad campaign specified by the request. The bidder may determine the impression opportunity to bid on based on a constraint specified by the request. The bidder may determine a price of a bid based on one or more bidding rules. The bidder may automatically provide for delivery of the advertisement to the procured impression opportunity. The demand side platform may determine an estimate of daily impression opportunities across the plurality of impression opportunity providers.

In yet another aspect, the present disclosure is related to methods and systems for integrating multiple pools of impression opportunities from multiple advertising exchanges for bidding by advertisers. The methods and systems include receiving, via an interface of a demand side platform (DSP), at least one constraint and at least one goal for an online advertising campaign from a user. A bidding module of the demand side platform receives an impression opportunity for bidding, the impression opportunity accompanied by a first set of data delivered via a first advertising exchange. The bidding module receives another impression opportunity for bidding, this impression opportunity accompanied by a second set of data delivered via a second advertising exchange. The bidding module may normalize the first set of data and the second set of data. An engine of the demand side platform may determine to bid on either impression opportunities based on the normalized first and second sets of data and/or any bidding goals of the campaign.

In certain aspects, the present disclosure is related to methods and systems for attributing an user event to an impression opportunity. The impression opportunity may be procured through a DSP. The impression opportunity may be served and tracked via the DSP. The DSP may associate each impression opportunity with a creative tag. The DSP may associate each user event with an event tag. The DSP may associate an event tag with a creative tag based at least in part on proximity of an user event corresponding to the event tag to an availability of an impression opportunity corresponding to the creative tag. The DSP may attribute an user event to a viewing of an impression opportunity based on one or more event tags and creative tags. The DSP may attribute an user event to a click or other action to an impression opportunity based on one or more event tags and creative tags.

In one aspect, the present invention is related to a method for attribution of a conversion to an impression via a demand side service. A demand side service, executing on one or more servers, may match conversion events that occurred within a period of time of advertisements to impressions corresponding to the advertisements. The method may include identifying, by the demand side service, a plurality of event records for the conversion events matched to the impressions. The demand side service may match an event of an event record from the plurality of event records corresponding to an advertiser and a user, to a plurality of impressions matched by the demand side service for the advertiser and the user. The demand side service may select an impression from the plurality of impressions with a time stamp less than a time stamp of a conversion event of the event record. The demand side service may further store an attribution of the selected impression with the conversion event of the event record.

In some embodiments, the demand side service identifies event records corresponding to a user click within the period of time. The demand side service may identify event records corresponding to a user view within the period of time. The demand side service may identify a plurality of event records for conversion events that occurred within a predetermined number of days. The demand side service may match the event of a post view conversion to the plurality of impressions. In certain embodiments, the demand side service matches the event of a post click conversion to the plurality of impressions. The demand side service may match the event records having an advertiser identifier and a user identifier matching the advertiser identifier and the user identifier of records for the plurality of impressions.

In some embodiments, the demand side service selects the impression from the plurality of impressions with the time stamp closest to the time stamp of the event record. The demand side service may calculate a time lag for attribution by subtracting the time stamp of the impression from the event time stamp. The demand side service may determine whether the time lag for attribution is within an attribution window for a campaign of the advertiser corresponding to the impression.

In another aspect, the present invention is related to a system for attribution of a conversion to an impression via a demand side service. The system may include a demand side service executing on one or more servers. The demand side service may match advertisements to impression opportunities. An events database may include a plurality of event records for conversion events that occurred within a period of time of advertisements matched to impression opportunities by the demand side service. An attribution component of the demand side service may match an event of an event record from the plurality of event records of the events database corresponding to an advertiser and a user, to a plurality of impressions matched by the demand side service for the advertiser and the user. The attribution component may select an impression from the plurality of impressions with a time stamp less than a time stamp of a conversion event of the event record. The attribution component may store an association of the selected impression with the conversion event of the event record.

In some embodiments, the demand side service identifies event records corresponding to a user click within the period of time. The demand side service may identify event records corresponding to a user view within the period of time. The demand side service may identify a plurality of event records for conversion events that occurred within a predetermined number of days. In certain embodiments, the attribution component matches the event of a post view conversion to the plurality of impressions.

In some embodiments, the attribution component matches the event of a post click conversion to the plurality of impressions. The attribution component may match the event records having an advertiser identifier and a user identifier matching the advertiser identifier and the user identifier of records for the plurality of impressions. The attribution component may select the impression from the plurality of impressions with the time stamp closest to the time stamp of the event record. The attribution component may also calculate a time lag for attribution by subtracting the time stamp of the impression from the event time stamp. In certain embodiments, the attribution component determines whether the time lag for attribution is within an attribution window for a campaign of the advertiser corresponding to the impression.

In some aspects, the present solution is directed to a method for identifying a user by a demand side platform across a plurality of different advertiser exchanges. The method includes establishing, by a demand side platform executing on one or more server, a cookie mapping for a user. The cookie mapping may include a mapping of user identifiers for the user from one or more advertisement exchanges to a user identifier assigned by the demand side platform for the user. The method may include storing, by the demand side platform to the cookie mapping, a first mapping to the user identifier of the demand side platform, the first mapping comprising a first user id received by a bidder from a first advertisement exchange of a plurality of advertisement exchanges and a first exchange id for the first advertisement exchange. A bidder may insert into a bid for an impression opportunity to a second advertisement exchange a pixel. The pixel comprising a key to the cookie mapping and a second user id for the user and a second exchange id. The second user id may be received by the bidder from a second advertisement exchange of the plurality of advertisement exchanges.

In some embodiments, the demand side platform establishes the cookie mapping to identify user data for the user collected from the plurality of advertisement exchanges. Each of the plurality of advertisement exchanges may identify the user with a different user identifier. A pixel server of the demand side platform may establish the cookie mapping responsive to not finding a mapping of the first exchange id to the user identifier. The demand side platform may store to the first mapping in the cookie mapping a timestamp of when the first mapping was created. The demand side platform may insert the key to the cookie mapping in the pixel if the second advertisement exchange includes the second user id in a bid request. The demand side platform may encode the second user id and second exchange id into a uniform resource locator of the pixel. A pixel server of the demand side platform receive a call from the pixel and decode the second user id and second exchange id from a string parameter of a query of the call from the pixel. The pixel server may decode the second user id and second exchange id from the string parameter. The pixel server may store to the cookie mapping, a second mapping to the user identifier of the demand side platform. The second mapping may comprise a second user id received by the bidder from a second advertisement exchange of the plurality of advertisement exchanges and a second exchange id for the second advertisement exchange.

In some aspects, the present solution is directed to a method for identifying user data for a user from a plurality of different advertiser exchanges. The method includes establishing, by a demand side platform executing on one or more server, a cookie for a user. The cookie mapping user identifiers for the user from one or more advertisement exchanges to a user identifier assigned by the demand side platform for the user. A bidder of the demand side platform receives a biddable request from a first advertisement exchange of a plurality of advertisement exchanges. The biddable request comprising a first user identifier of the user for the first advertisement exchange. The bidder identifies the user identifier of the demand side platform for the user from the mapping of the cookie of the first user identifier to the user identifier. The bidder may questing, using the user identifier from the cookie, a user database for data of the user collected from one or more of the plurality of advertisement exchanges.

In some embodiments, a pixel server of the demand side platform may maintain the cookie to map each of the different user identifiers from each of the plurality of advertisement exchanges to the user identifier of the user assigned by the demand side platform. The demand side platform may maintain the user identifier of the user valid only for the demand side platform. The bidder may receiver a first user identifier of the user valid only for transactions with the first advertisement exchange. The bidder may identify that the cookie for the user is in a cache of the demand side platform. Using the user identifier. the bidder may obtain any one or more of the following from the user database: user profile, user preferences, logs of user actions and geographic information. Using the user identifier, the bidder may obtain information of the user from a third-party provider. The bidder wait for a predetermined time for query results from the user database and if not received within the predetermined time, bid via the first advertisement exchange without user data. If received within the predetermine time, the bidder may use the user information received from the user database responsive to the query to determine a bid for the first advertisement exchange. The bidder may also user information collected from a second advertisement exchange received from the user database responsive to the query to determine a bid for the first advertisement exchange.

In some aspects, the present solution is directed to a method for maintaining anonymity of segment data from a third party provider while performing segment targeting via a demand side platform. The method may include receiving, by a demand side platform executing on one or more servers, one or more segment identifiers for segment data of a data supplier. Each of the one or more segment identifiers comprising a random integer uniquely assigned to a specific segment of the segment data. The demand side platform may provide a pixel for segmented targeting of an impression opportunity for an advertisement exchange. The demand side platform may use or receive from the data supplier, a tracking agent to associate data collected via the demand side platform with the segment identifier. A bidder of the demand side platform executes or provides a placement of an advertisement matched to an impression opportunity. The placement includes the tracking agent and the pixel. The demand side platform may receive segment data from the data supplier based on execution of the tracking agent. The segment data corresponds to the segment identifier for the placement.

In some embodiments, the demand side platform receives a segment mapping dictionary comprising a mapping of the one or more segment identifiers to a corresponding segment of the segment data. In some embodiments, the demand side platform provides the pixel comprising a remarketing pixel associated with the segment identifier. In some embodiments, the demand side platform receives from the data supplier, the tracking agent in the form of a pixel or a cookie. In some embodiments, the demand side platform generates a unique placement id. The placement id may be used to associate segment data with placement data. The demand side platform may receive segment data on a per user basis. The demand side platform may receive segment data on a real-time basis via an interface to the data supplier. The demand side platform may receive segment data on a real-time basis responsive to activation of the tracking agent. The demand side platform, may receive segment data on an offline basis via import of a file of a predetermined type.

In some aspects, the present solution is related to another method for maintaining anonymity of a user corresponding to segment data from a third party provider via a demand side platform. The method includes receiving, by a demand side platform executing on one or more servers, a segment mapping dictionary for segment data of a data supplier. The demand side platform may provide a demand side platform pixel for an impression via an advertisement exchange. The demand side platform receives from the data supplier a data supplier pixel for segment matching. The demand side platform identifies via the segment mapping dictionary a segment identifier for the impression using the demand side platform pixel and data supplier pixel. A bidder of the demand side platform uses segment data corresponding to the segment identifier to determine to bid on a second impression of a plurality of impressions across a plurality of advertisement exchanges.

In some embodiments, the segment mapping dictionary comprises a plurality of segment identifiers and each of the plurality of segment identifiers comprising a random integer uniquely assigned to a specific segment of the plurality of segments of the segment data. The demand side platform may provide the demand side platform pixel comprising a remarketing pixel associated with the segment identifier. The data supplier pixel may comprise a non-segment pixel. A bidder of the demand side platform may execute a placement of an advertisement matched to the impression. The placement may include the data supplier pixel and the demand side platform pixel. The demand side platform may receive segment data for a user associated with the impression. The segment data corresponds to the segment identifier. The demand side platform may receive segment data responsive to activating the data supplier pixel. The demand side platform may generate a placement identifier for the impression. The placement identifier may be inserted in the data supplier pixel. The demand side platform may join segment data for the impression from the data supplier with placement data of the impression tracked by the demand side platform. The bidder may determine whether to make a bid on a second impression based on the joined segment data and placement data.

In some aspects, the present solution is directed to a method for bidding using segment data from a third party provider via a demand side platform. The method includes receiving, by a demand side platform executing on one or more servers, a biddable request from a first exchange of a plurality of exchange. The exchange may identify a remarketing pixel corresponding to a segment identifier. The demand side platform identifies a segment identifier corresponding to the remarketing pixel. The demand side platform may obtain segment data corresponding to the segment identifier. A bidder of the demand side platform may use the segment data to determine a bid on the first exchange.

In some aspects, the present solution is directed to a method for bidding using segment data from a third party provider via a demand side platform. The method may include receiving, by a demand side platform executing on one or more servers, a biddable impression opportunity from a first exchange of a plurality of exchanges. The first exchange to the demand side platform may communicate that the impression opportunity is directed to a user identified by a remarketing pixel. The demand side platform may identifying that the remarketing pixel corresponds to a segment targeted by the demand side platform. A bidder of the demand side platform may place a bid on the impression opportunity responsive to the identification.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2H is a block diagram depicting an embodiment of a different data related to bid requests for a plurality of impression opportunity providers;

FIG. 2I is a block diagram depicting an embodiment of a different data related to bid response for a plurality of impression opportunity providers;

FIG. 2J is a block diagram depicting an embodiment of defining goals and constraints for a campaign;

DETAILED DESCRIPTION

For purposes of reading the description of the various embodiments below, the following descriptions of the sections of the specification and their respective contents may be helpful:

- Section A describes a network environment and computing environment which may be useful for practicing embodiments described herein;
- Section B describes embodiments of systems and methods for providing a demand side platform;
- Section C describes embodiments of systems and methods for attribution of a conversion to an impression opportunity;
- Section D describes embodiments of systems and methods for integration and anonymization of supplier data
- Section E describes embodiments of systems and methods for using server side cookies for user identification and user data collection; and
- Section F describes embodiments of systems and methods for using packed names in third-party data interfaces.

A. Computing and Network Environment

Figure 1A:
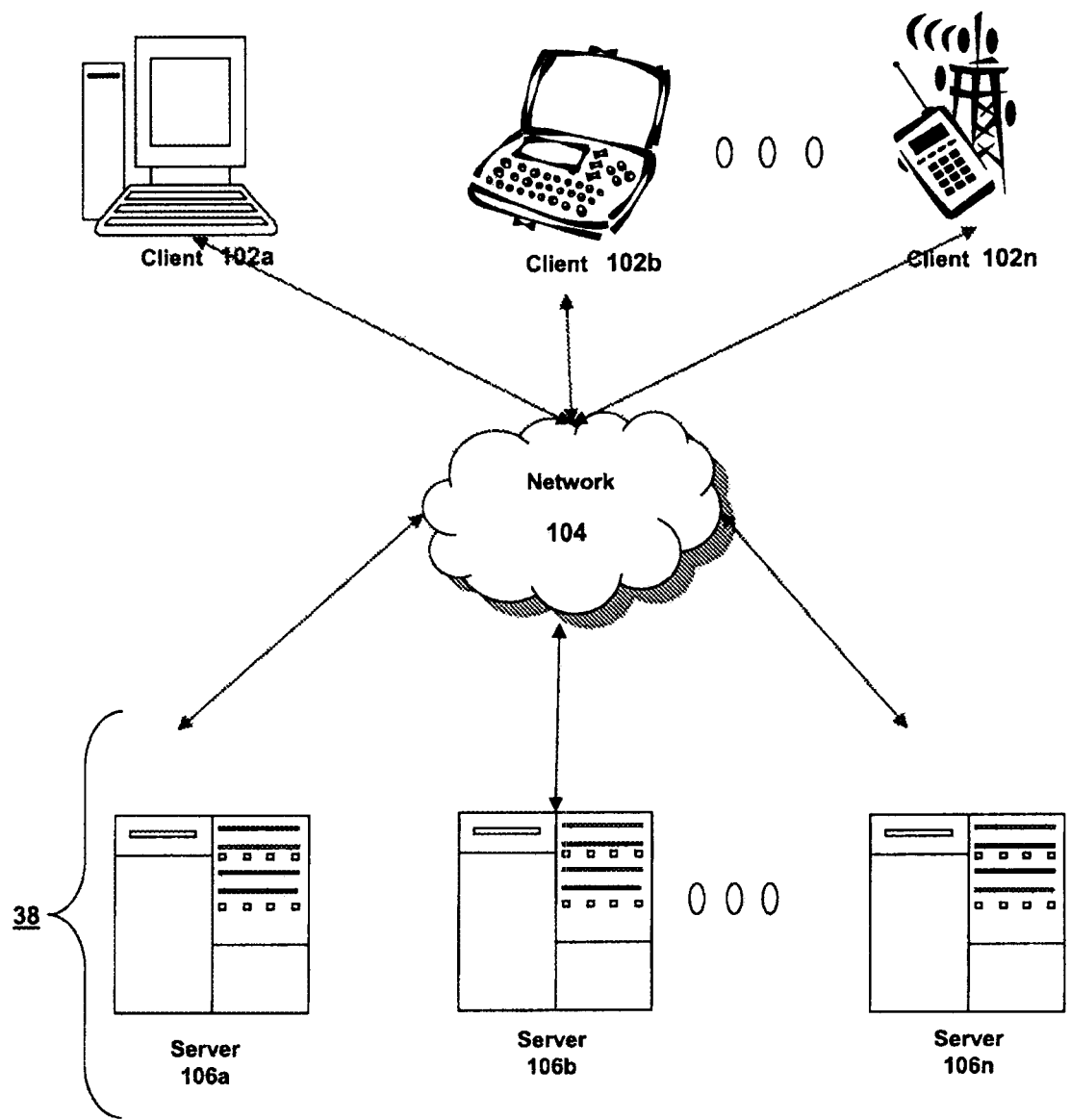
FIG. 1A is a block diagram depicting an embodiment of a network environment comprising client machines in communication with remote machines.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 102 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 102, forwards the requests to a second server 206b and responds to the request by the client 102 with a response to the request from the server 106b. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

Figure 1B:
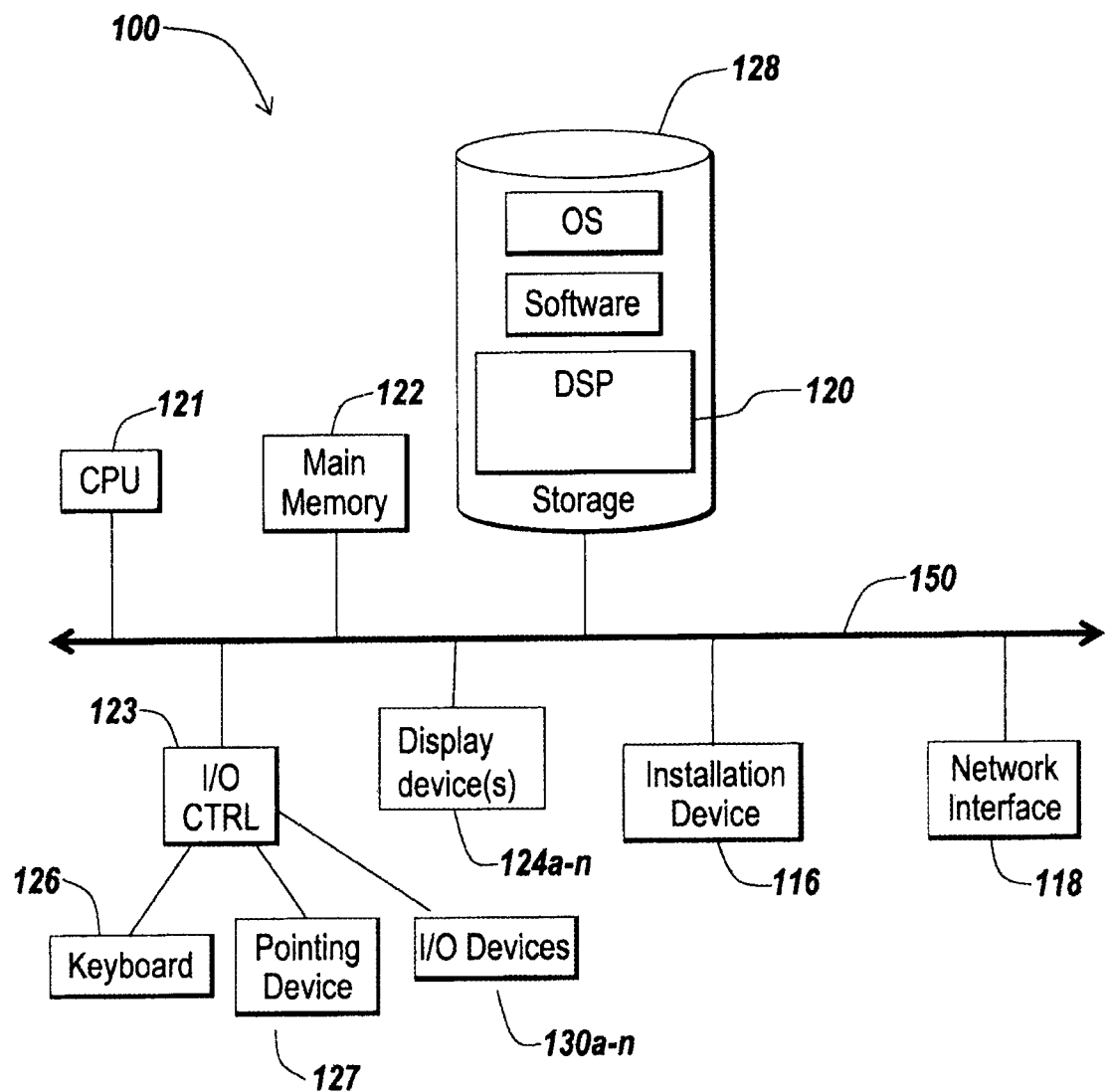
FIGS. 1B and 1C are block diagrams depicting embodiments of computing devices useful in connection with the methods and systems described herein.
Figure 1C:
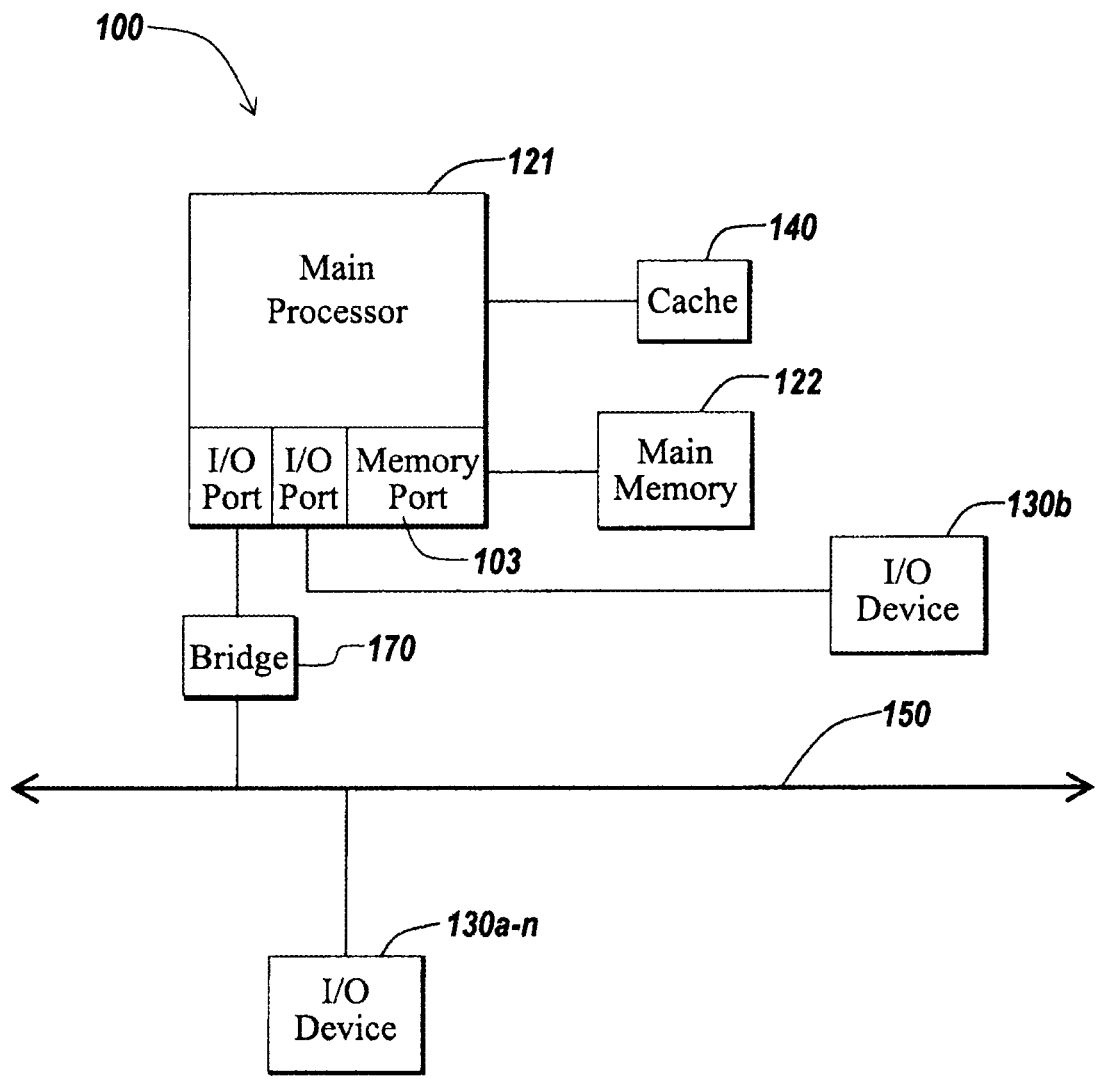

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system, software, and a software of a demand side platform 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for the demand side platform. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700 p, 700 w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95c1, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudimpression opportunity layer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 102 includes a combination of devices, such as a mobile phone combined with a digital audio player or portable media player. In one of these embodiments, the communications device 102 is a smartphone, for example, an iPhone manufactured by Apple Computer, or a Blackberry device, manufactured by Research In Motion Limited. In yet another embodiment, the communications device 102 is a laptop or desktop computer equipped with a web browser and a microphone and speaker system, such as a telephony headset. In these embodiments, the communications devices 102 are web-enabled and can receive and initiate phone calls. In other embodiments, the communications device 102 is a Motorola RAZR or Motorola ROKR line of combination digital audio players and mobile phones.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Demand Side Platform

Online publishers typically provide or allocate areas or portions of their web pages for advertising (or "ad") purposes. These areas or portions are generally differentiated from content created or published by the publishers. These areas or portions are hereafter sometimes generally referred to as impression opportunities. Some of these impression opportunities are available for advertising products, services, or businesses not directly provided by or related to the online publishers. In some embodiments, these impression opportunities are available to advertisers for a price.

Impression opportunities may include any form or type of space or region on a web page. This space or region may overlap with or reside within (or as part of) content on the page (e.g., locations for banners, ad blocks, sponsored listings, margin ads and flash displays). Impression opportunities may be temporal, e.g., associated with a time slot (e.g., screening of a sponsored video footage prior to a requested screening, or available on a part of a day referred to as a day part). In some embodiments, an impression opportunity may sometimes not directly reside on a webpage. For example and in one embodiment, an impression opportunity may be generated from a webpage, such as due to an user action or some other trigger. For example, a pop-up may be generated when a webpage is loaded onto a browser. A window display or other widget may be generated responsive to a mouse-over. In some embodiments, an impression opportunity may include one or more elements such as a banner and an animated flash display extending from the banner boundary. In some embodiments, elements that may individually qualify as an impression opportunity may be collectively packaged as a single impression opportunity. In some embodiments, an impression opportunity is sometimes referred to as "inventory" (e.g., of a publisher).

Impression opportunities are sometimes offered directly to advertisers. In some embodiments, publishers may offer impression opportunities through one or more ad networks and/or ad exchanges. An ad network or ad exchange may consolidate and/or manage impression opportunities on behalf of a publisher. An ad network or ad exchange may consolidate and/or manage impression opportunities across a plurality of publishers. In particular, an ad exchange may provide a platform for buying and selling advertising impressions. An ad exchange may provide services (e.g., for trading impression opportunities) beyond that of ad networks. In some embodiments, ad networks and ad exchanges have distinct features as defined by the Interactive Advertising Bureau (IAB). Ad exchanges may include, but is not limited to Microsoft AdECN, Yahoo Right Media, and DoubleClick, a Google subsidiary.

In some embodiments, an ad exchange operates as a platform, interface or mediator for matching an impression opportunity buyer with a seller. As the online ad market becomes more automated and exchange-driven, ad exchanges may provide better efficiency and value to buyers and sellers than ad networks. As an ad exchange attempts to broker a transaction, the buy side (e.g., advertiser or ad agency) may make a bid and the sell side (e.g., publisher) may set a floor for accepting a bid or accept the highest bid from multiple sellers. Due to the benefits provided by ad exchanges, ad exchanges may command a relatively large share of the profit from transacting an impression opportunity. This may be especially true as ad rates or impression opportunity rates drop. In some cases, ad agencies may see their margins drop, e.g., to 10% or lower. Taking more control of the buying process, such as by using the methods and systems disclosed herein, may change such a trend.

Moreover, in some embodiments, an ad exchange brokering a transaction between a seller and multiple buyers may provide more value to the seller than to the buyers. In other embodiments, an ad exchange may represent only a limited pool of impression opportunities to a buyer. Furthermore, an ad exchange may offer less competitive terms to a buyer for a given impression opportunity as compared to another ad exchange. The transaction interface provided by an ad exchange to a buyer may include unique and/or proprietary processes, specific configuration of impression opportunity-related information, non-uniform transaction terms and/or parameters. Due to the non-uniform transaction interface provided by each ad exchange, a seller may not be able to determine a preferred ad exchange(s) to work with. This can be true in general, for a particular ad campaign, or for a particular impression opportunity bid. In some embodiments, the systems and methods disclosed herein provide a single interface for a buyer (e.g., an ad agency) to access a plurality of ad exchanges, and integrate multiple pools of impression opportunities from these ad exchanges for bidding by the buyer.

Embodiments of the methods and systems of a demand side platform disclosed herein may address the issues described above. The platform of the present disclosure provides the following one or more features and/or combination of the features that characterize the platform as a demand side platform:

(a) the platform integrates and interfaces to multiple exchanges to provide normalized access to a cross-exchange spectrum of disparate and different supply sources;

(b) the platform integrates and interfaces to third party ad servers for reporting on performance and/or operations;

(c) the platform calculates daily impression estimates for the multiple exchanges and campaigns;

(d) the platform provides an interface to match buyer demand to supplier supply by matching against the inventory of impressions;

(e) the platform provides a system to trade demand to supply to connect a plurality of buyers (demand) across a plurality of disparate sellers (supply)

(f) the platform provides reporting of performance of an ad campaign of a buyer across a cross-exchange spectrum of suppliers.

(g) the platform provides flighting: a period of time in which a defined bid price, daily spend goal and frequency cap are defined.

Embodiments of the demand side platform may include any combination of the above-mentioned features. With these embodiments of the demand side platform, the present disclosure provides performance, simplicity, processing algorithms and reporting not previously offered in a single integrated solution and service. Embodiments of the demand side platform may be offered, delivered or deployed as a software, a service or a managed service, application or platform. Embodiments of the demand side platform may be offered, delivered or deployed as an outsourced service. In some embodiments, the demand side platform may be offered, delivered or deployed as a combination of managed and outsourced service.

Figure 2A:
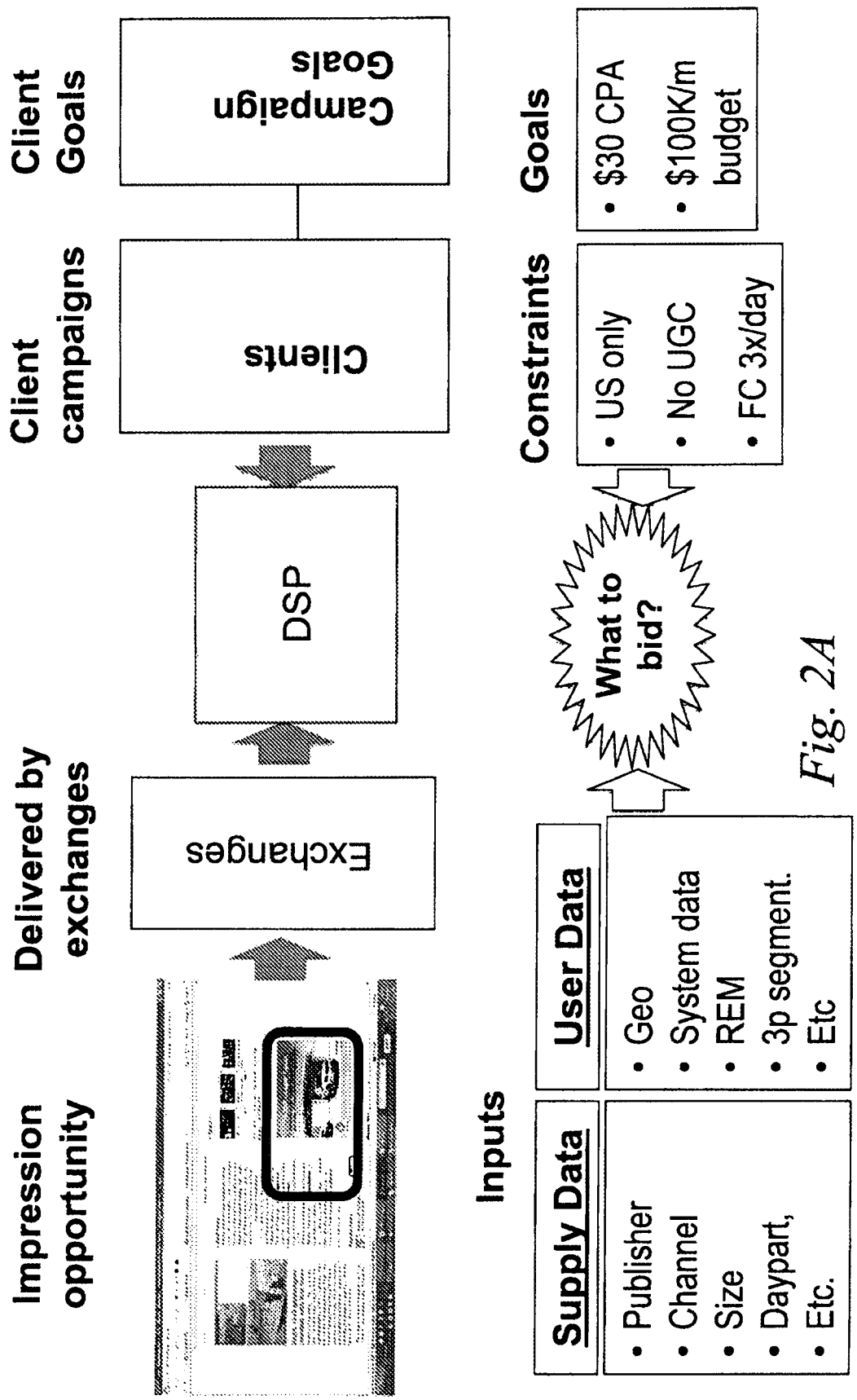
FIGS. 2A-2D are block diagrams depicting embodiments of systems and methods for providing a demand side platform.

Referring now to FIG. 2A, embodiments of a system for a demand side platform which may integrate multiple pools of impression opportunities from multiple ad exchanges for bidding is shown. In brief summary, the system shows one or more impression opportunities available and/or delivered via one or more ad exchanges for bidding by one or more ad agencies. Each ad agency may represent one or more clients. The system further includes a Demand Side Platform (DSP) for interfacing between the one or more ad agencies and the one or more ad exchanges. The DSP determining for the ad agencies and/or the clients which impression opportunity to bid and how to bid based on information provided from the buy side and sell side.

In further details of FIG. 2A, each ad agency may represent one or more clients. Client entities interested in impression opportunities may comprise an individual, company, organization or a groups of individual with shared interests. An ad agency may design and/or implement an ad campaign on behalf of a client. The ad agency may further procure or buy impression opportunities based on the advertising campaign on behalf of the client. In some embodiments, an ad agency and/or one or more clients the agency represents may collectively or individually be referred to as an advertiser. In one of these embodiments, an advertiser includes an ad agency and a client the agency represents. A client may be an advertiser that directly uses the DSP to procure impression opportunities, e.g., without using an ad agency. In some embodiments, an ad agency may use a DSP to concurrently and/or independently run ad campaigns for one or more clients. In some embodiments, an ad exchange may interface with an advertiser via a DSP. In other embodiments, an ad exchange may interface directly with an advertiser that uses a DSP to process information provided by the ad exchange.

A DSP may be implemented in hardware or a combination of hardware and software. The DSP may be built and/or configured for supporting or providing impression opportunity analyses and/or transactions. In some embodiments, a DSP is built and configured for providing buy side services for impression opportunities. A DSP may provide automation for impression opportunity workflow (e.g., designing ad campaigns and applying these to multiple ad exchanges), supply integration (e.g., interfacing with multiple ad exchanges and other supply partners to normalize pools of impression opportunity for analysis and bidding), and insight and analytics (e.g., quantitative analysis in determining outgoing bids and reviewing performance).

The DSP may include any module, script, program, agent, state machine, component or set of executable instructions executing on one or more machines or servers 106. The DSP technology stack may incorporate open source and/or commercial code platforms, including but not limited to: Flex/Catalysts (e.g., implemented in the DSP user interface and middleware in some embodiments), Perl (e.g., implemented in the application layer and business logic in some embodiments), C/C++ (e.g., implemented in the bidding module and/or brain engine in some embodiments), Netezza/PostGreSQL (e.g., implemented in DSP data warehousing or data marts in some embodiments). These code platforms, as implemented in the DSP system, can support agile and interactive development of the system. In some embodiments, the DSP includes a self-monitoring and/or self-healing framework. The DSP may include application programming interfaces (APIs) into some or all subsystems of the DSP.

The one or more machines or servers 106 providing the DSP may include one or more server farms 38, for example incorporating features of server farms 38 described above in connection with FIG. 1A. The DSP hardware may interface with other network components via any type or form of communication protocol, including standard, proprietary and custom protocols. The DSP may have components operating at one or more layers of the network stack, such as the transport layer. The DSP may operate as an intermediary, logically and/or physically, between one or more ad exchanges and one or more advertisers (e.g., ad agencies).

In certain embodiments, a DSP may be referred as a demand side service. In some embodiments, the DSP may include one or more services, subsystems, modules and/or applications hosted by a provider and/or an advertiser. For example and in one embodiment, the DSP may include a service or application engine hosted on one or more servers of the advertiser and/or a third party. The third party may be a server farm or hardware provider and/or service provider. The DSP may include a service, module and/or application dedicated for an advertiser, e.g., to interface that advertiser with one or more ad exchanges. For example and in one embodiment, a DSP may include services, applications and/or hardware leased and/or owned by an advertiser. In some embodiments, an ad exchange may provide a DSP or some features of a DSP to an advertiser, e.g., for ad campaign planning. Any of the systems and/or features associated with a DSP may be provided to advertisers and/or ad exchanges for a fee, e.g., on a per use basis (e.g., online access), for an access/lease period (e.g., software license), and/or for purchase (e.g., custom or configured hardware).

The DSP may provide an advertiser access to a plurality of impression opportunities provided via different providers (e.g., publishers). The plurality of impression opportunities may include one or more pools of impression opportunities. For example and in one embodiment, a pool of impression opportunities may include impression opportunities from a publisher, a group of publishers, an ad exchange, and/or an ad network. In some embodiments, a pool of impression opportunities comprises impression opportunities across discrete and disparate supply sources. Certain ad networks and/or ad exchanges may control, distribute, offer, administer or otherwise manage one or more pools of impression opportunities. In some embodiments, certain impression opportunities or pools of impression opportunities may only be available via a specific ad network or ad exchange. The DSP may function as an interface between a plurality of impression opportunity providers (or sellers) and an advertiser (buyer). The DSP may offer a single interface, point of access, and/or relationship to a buyer, e.g., to simplify transactions and/or analyses associated with a plurality of sellers. In some embodiments, the pools of impression opportunities may correspond to different types or categories of impression opportunities, e.g., impression opportunities associated with a segment, channel, particular type of website or premium level, mouse-over vs. page-embedded impression opportunities, etc.

The DSP may process or analyze information associated with various impression opportunities and normalize these into metrics for comparison against goals set by advertisers. The DSP may normalize the information across impression opportunities, pools of impression opportunities, and/or ad exchanges. In some embodiments, the DSP may statistically and/or intelligently process or analyze the information to help an advertiser customize, determine or develop an advertising campaign based on the advertiser's goals. The DSP may dynamically update the metrics to help an advertiser adjust or implement advertising campaigns based on the goals. For example, the DSP may determine (e.g., via an impression calculator and/or a bidding module of the DSP) an estimate of daily impression opportunities across the plurality of impression opportunity providers to identify an appropriate advertising campaign strategy. The methods and systems described herein may use the normalized metrics to bid for impression opportunities, e.g., according to the advertising campaigns developed.

In some embodiments, a DSP may provide services to one or more advertisers in parallel, in sequence, on demand or otherwise. For example and in one embodiment, a single DSP may perform analysis and/or transactions for one or more advertisers concurrently and/or sequentially. An analysis may include any type or form of data processing, such as any statistical, algorithmic or other intelligent computation, profiling and/or prediction of impression opportunity information that may be useful in the formulation of ad strategy, campaign and/or bidding across one or more ad exchanges. A transaction may include any type or form of operation associated with bidding, trading, and/or procuring impression opportunities. Each analysis and/or transaction may be independent of another analysis and/or transaction of the same or different advertiser. For example, in some embodiments, an analysis may account for one or more transactions taking place at the same time. In certain embodiments, a transaction may affect or compete with another transaction. A transaction may be assigned a different priority and/or be configured relative to another transaction, e.g., to potentially effect a certain result or a different result. In one embodiment, such as between transactions of a same advertiser, a transaction (e.g., impression opportunity bid) may be processed to optimize or improve the chances or outcome of another transaction. In another embodiment, such as between transactions of different advertisers and/or ad campaigns, a transaction may be processed blindly, fairly and/or independently of another transaction.

In some embodiments, a plurality of DSPs may operate in parallel. In some embodiments, the plurality of DSP supporting different advertisers. A transaction may affect or compete with another transaction from another advertiser or DSP. In certain embodiments, an advertiser may operate a plurality of DSPs in parallel, either using the same ad campaigns or using different ad campaigns. For example and in one embodiment, an advertiser may be evaluating one DSP against another, or comparing one ad campaign against another. A different DSP may help the same advertiser (e.g., ad agency and/or client) develop a different ad campaign. A different DSP may provide the same advertiser access to different ad exchanges and/or information.

As a single interface across a plurality of ad exchanges, a DSP can receive and process any type or form of information supplied via the ad exchanges. For example, and as depicted in the embodiment shown in FIG. 2G, each ad exchange and/or publisher may supply different types of information, similar information in a different format, data structure or granularity, using different communication protocols or standards, and at different time instances or intervals. In some embodiments, the information provided via some ad exchanges may conform at least in part to some standards. In certain embodiments, the information provided by an ad exchange may be specific to the ad exchange's custom or semi-custom interface. The availability and type of information provided via ad exchanges may vary, e.g., from publisher to publisher. In some embodiments, an ad exchange may process and/or convey information from different publishers differently. Some ad exchanges and/or publishers may provide support for requesting or querying different types or granularity of data. Information provided via ad exchanges may include supply data with respect to impression opportunities, and user data.

User data may include any type or form of data related to a user of a webpage, website, web session and/or web application. Such user information may include geolocation or geographical (sometimes generally referred to as "geo") information, system data, remarketing information, and third-party segment information. Geo information may include information including but not limited to information related to the user network, internet protocol (IP) address, access point (e.g., wifi hotspot), geographical location and mobile tracking, and demographic and other geographical information system (GIS) data linked to the user location. System data may include any user information stored or tracked by the publisher or network, including but not limited to user preferences, browsing and transaction history, and user device information. Some of these information may be tracked by cookies and/or Adware.

Third-party segment information may include information identifying specific audience segments with certain online shopping habits. A number of companies, such as BlueKai, Exelate and Axciom, may provide such insights into the in-market shopping profiles of advertisers site audiences. Third-party segment information may include information related to a conversion (e.g., pattern of user behavior and/or advertising characteristics leading to a newsletter sign-up, registration, transaction, etc) as well as behavioral targeting data sourced or bought from ad networks. Advertisers can use pre-existing segments or use the information provided to create custom audience segments, identify matching impression opportunities and reach prospects.

Remarketing information may include information including but not limited to information related to tracking a user after the user has left a publisher's site with a goal of driving the user back to a client's site to complete an action or transaction. Remarketing information may identify user or user attributes indicating past or potential success in remarketing efforts. In addition to the above, user data may include "IXI" data that provides measures of user wealth, income, spending, credit, investment style, share-of-wallet and share-of-market.

Supply data may include any type or form of data related to impression opportunities. Supply data may include information related to, but not limited to the network, publisher, channel, ad size and daypart. Network data may include information including but not limited to information related to the size, characteristics and audience reach of an ad network associated with an impression opportunity. Publisher data may include information including but not limited to information related to the content and web traffic of a publisher or website offering an impression opportunity. Publisher data may include an identifier of the publisher and/or website. Ad size may indicate the size of the impression opportunity using any type or form of measure, e.g., digital image dimensions by pixels, such as 300×250. Daypart information specifies portions of the days during which the impression opportunity is offered, e.g., 12 pm-6 pm, 6 pm-9 pm, primetime, morning segment, late night, etc. Weekpart information may specify between weekend and weekday. Other time-specific parts may be provided or defined.

Channel data may include information including but not limited to information related to the type and reach of a media channel associated with an impression opportunity. A channel may be a category of media content targeting a specific audience. For example, channels may include categories such as news, finance, women, men, etc. In some embodiments, a channel may be a media type, for example, rich media, in-stream video, search, banner, text links, e-mail spam, opt-in e-mail advertising, other trackable media. Media type channels may also include podcasts, mobile device content and RSS feeds.

A DSP can receive a variety of sell-side information received via ad exchanges and normalize the information for a buyer or advertiser. The DSP may have custom interfaces for communicating with each ad exchange, e.g., as depicted in the embodiment shown in FIG. 2G. Each custom interface may include standard and/or custom modules for receiving portions of information from the corresponding ad exchange. Each custom interface may support the appropriate communication protocol conversion or translation. Each custom interface may include filters for removing redundant and/or unsupported data received from an ad exchange or other third party providers (e.g., BlueKai). Each custom interface may include any type or form of extract, translate and load (ETL) capabilities to create a set of data or parameters in normalized, standard or generic (hereafter generally referred to as "normalized") form for the corresponding ad exchange. The normalized set of parameters may include one or more of geo, system, REM, third-party segment, IXI, publisher (ID), channel, ad size, weekpart and daypart data pertaining to an impression opportunity.

Figure 2B:
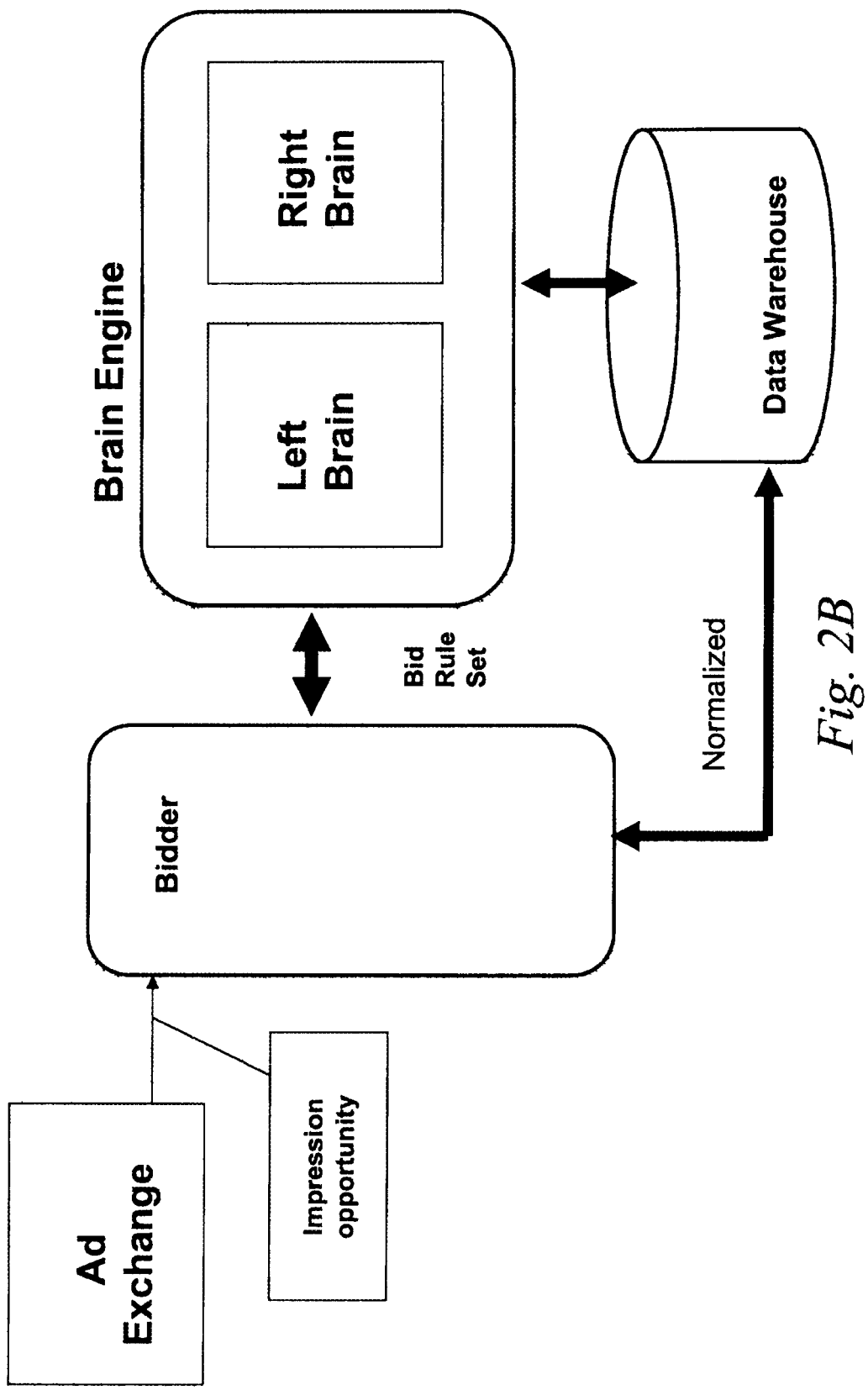

Referring now to FIG. 2B and in some embodiments, each set of sell-side information received by a DSP may be associated with an impression opportunity. In other embodiments, each set of sell-side information received by a DSP is associated with a pool of impression opportunities, a publisher, an ad network, or an ad exchange. In some embodiments, the DSP includes at least one bidding engine or module (e.g., a MathBid module) for initiating bids to any of the ad exchanges, ad networks, supply partners and/or publishers. A bidding engine or module is sometimes referred to as a bidder. A DSP may include any number of high performance bidding modules. In some embodiments, the DSP bidding modules can operate at 500,000 queries per second. A bidding module may be configured to bid on every impression opportunity or on selected impression opportunities. A bidding module may bid on one or more impression opportunities for placement of an advertisement. A bidding module may be configured to bid one or more times on an impression opportunity based on the corresponding impression opportunity provider's response to the bid. A bidding module may be configured to bid one or more times on an impression opportunity to try to achieve a successful bid.

Figure 2C:
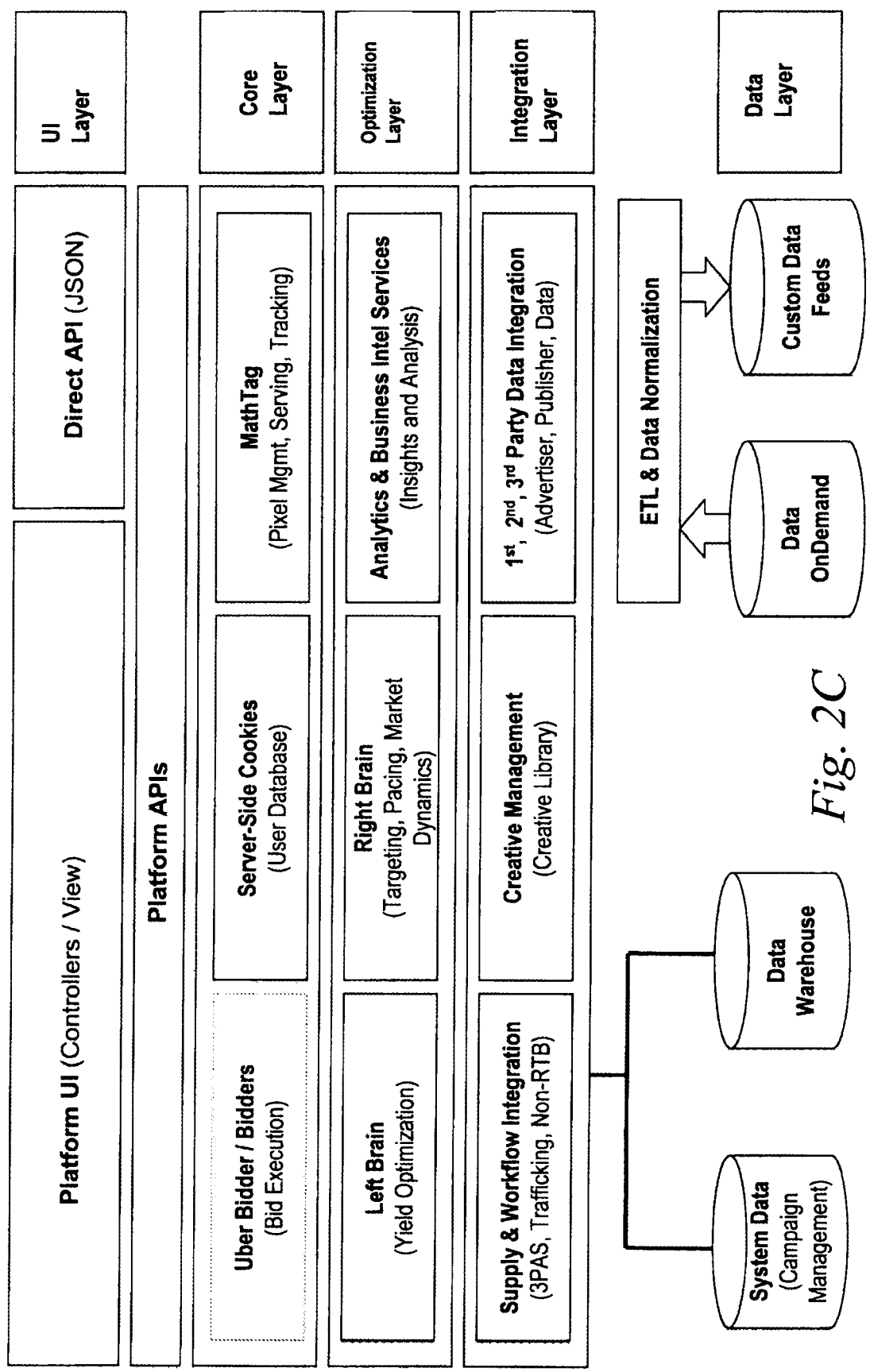
Figure 2D:
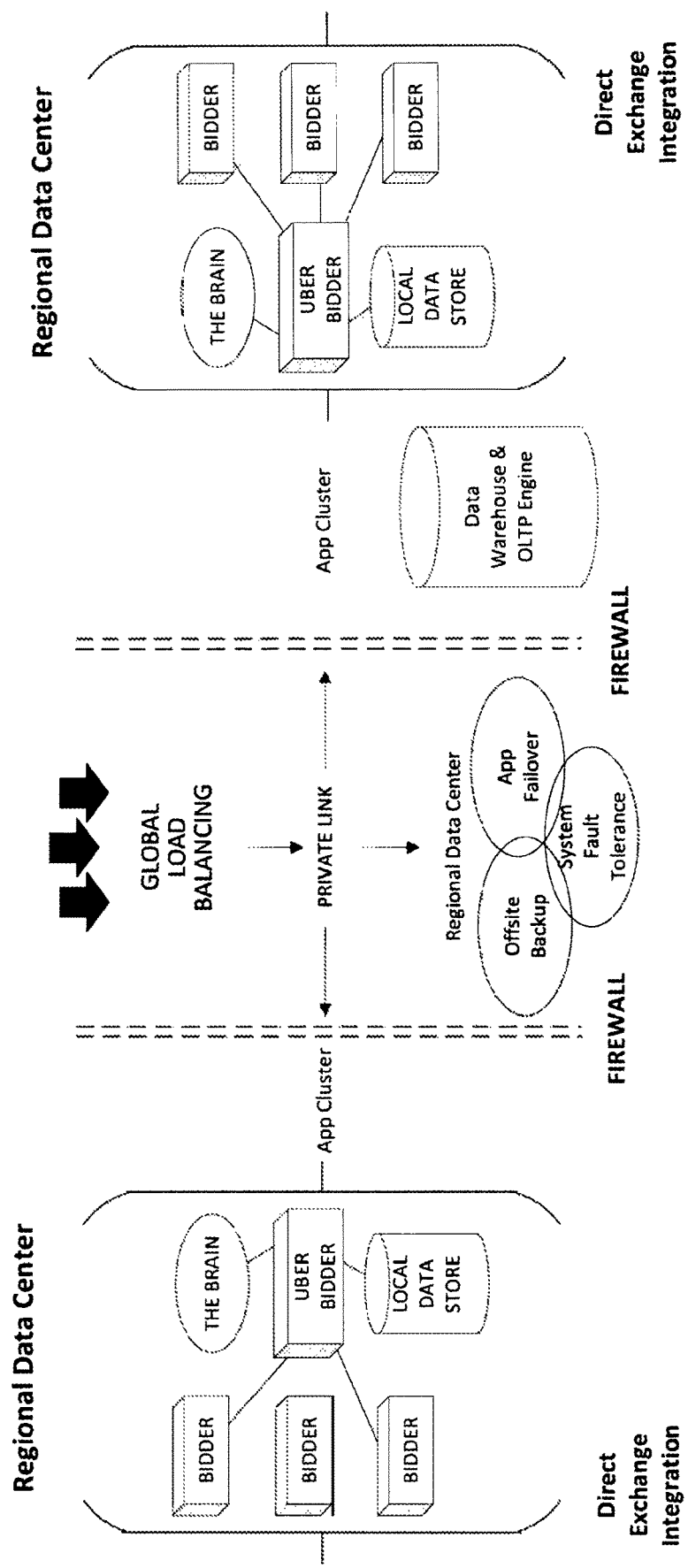

In certain embodiments, a bidding module may include or incorporate the one or more custom interfaces described above. The bidding module may receive sets of sell-side information via the custom interfaces. The bidding module(s) may integrate all supply sources across real time, different APIs and bid sheet environments. The custom interfaces may normalize each set of sell side information into sets of data that can be processed by the bidding module and/or a brain engine of the DSP. The normalized sets of data may be stored in a data warehouse in some embodiments. The bidding modules may include a uber or master bidder, e.g., as depicted in FIGS. 2C and 2D. The master bidder may execute on brain engine instructions and/or generated rule sets. The master bidder may load balance bids across one or more of the other biding modules (sometimes generally referred to as "bidders"). The brain engine may constantly update the bidders (e.g., via the master bidder) as statistically significant variables are recognized and/or pockets of performing media or impression opportunities are unlocked.

The data warehouse may include a database management module for logging, tracking and managing the normalized sets of data. The database management module may be implemented in hardware or a combination of hardware and software. The database management module may be built and configured for storing, retrieving, organizing and managing impression opportunity-related information, including normalized sets of data or parameters. In some embodiments, the database management module is built and configured for efficient and/or fast storing, retrieving, organizing and managing impression opportunity-related information. The database management module may include any module, script, program, agent, component or set of executable instructions executing on one or more machines or servers 106.

The data warehouse may include one or more storage devices, incorporating features from embodiments of storage devices 128, 122, 140 described above in connection with FIGS. 1B and 1C. Moreover, the data warehouse may include data structures for storing and organizing the sets of normalized data. In certain embodiments, the data warehouse includes or operates with a reporting module for processing routine reporting or requests for information. In some embodiments, the DSP system includes a massively parallel data warehouse, e.g., for processing high levels of impression opportunity transactions and/or analysis. In one embodiment, the DSP data warehouse has a capacity of 20 TB or more. The DSP data warehouse may be built or configured to support massive data sets for reporting, optimization and insights. The DSP data warehouse may be built or configured to integrate with third-party systems and/or other data warehouses.

Referring to FIG. 2C, one embodiment of a platform architecture for the DSP system is shown. In brief summary, the DSP system includes an interface layer, a core layer, an optimization layer, an integration layer and a data layer. The data layer may include the DSP data warehouse discussed above. Bidding modules are depicted as the uber bidder and bidders in the core layer. The core layers may also include a cookies module and a MathTag module. The cookie module may generate and/or provide cookies to generate user data. The cookie module may communicate with server-side cookies to receive user data. The MathTag module may provide functionality for managing pixels and/or tracking code. The MathTag module may provide functionality for serving and/or tracking pixels or REM segment users.

The DSP integration layer may include a number of modules, including but not limited to Supply and Workflow Integration (SWI), creative management and data integration. In some embodiments, the SWI module processes and/or integrates supply data (from impression opportunity sellers such as ad exchanges). The SWI module may also process and/or integrate workflow data. These data can include third-party analytics data, trafficking data and non-real-time-bidding (non-RTB) data. These data may include system data, such as campaign management data. The SWI module may interface with the DSP data warehouse to retrieve data for processing and/or store data processed by the SWI module. The DSP integration layer may include a creative management module for storing, creating, updating, organizing, or otherwise managing creatives. The creative management module may manage a library of creatives.

The data integration module may process and/or integrate any type or form of data from first, second and/or third parties, such as an advertiser (e.g., ad agency and/or client), a publisher, an ad exchange, ad network, third-parties like BlueKai, etc. The data integration module may comprise, interoperate or interface with the one or more custom interfaces described above and in connection with FIG. 2G. The data integration module may operate with a ETL module to extract and normalize data from various sources. The data integration module may provide specific data on demand. In some embodiments, the data integration module may provide custom data feeds to requestors. One or more of the integration layer modules may operate with each other and/or with the DSP data warehouse to provide data for use in the optimization layer and/or provide data requested by any requestor.

The DSP may include a brain engine for performing operations based on any portion of the data discussed above. In some embodiments, the brain engine may perform operations using data collected or generated by the core layer. The brain engine may be implemented in hardware or a combination of hardware and software. The brain engine module may include any module, script, program, agent, component or set of executable instructions executing on one or more machines or servers 106. The brain engine may be built and configured for quickly processing massive data sets, applying machine learning against that data and deploying learnt real-time data into bidders. The brain engine may be implemented in the optimization layer of the DSP system.

The brain engine may include one or more processors, e.g., executing in parallel or substantially in parallel. In some embodiments, the brain engine includes a plurality of processing cores. In some embodiments, the brain engine includes distributed processing (e.g., across multiple server farms). The capability for parallel processing can for example, support multi-scenario analysis in modeling a bidding process. In some embodiments, the brain engine incorporates cloud computing features. In some embodiments, the DSP platform includes a distributed brain engine or a plurality of brain engines. The DSP platform may include a plurality of brain engines that can operate in a coordinated or collaborative fashion. In other embodiments, the DSP platform may include a plurality of brain engines that can operate independently.

In one embodiment, the brain engine includes a left brain component for performing yield optimization (e.g., bidding success, competitive bid prices, REM success, low CPM, etc). In some embodiments, the left brain component can determine the Fair Market Value (FMV) of impressions based on variables obtained via requests (e.g. HTTP) to supply partners and/or from third party data. In some embodiments, the left brain component can determine FMV (fair market value) based on the data of past bidding and campaign performance and operational data stores in the data warehouse. The brain engine may includes a right brain component for handling operations such as targeting (e.g., targeting segments, channels, dayparts), pacing (e.g., controlling spend rate with respect to bidding) and market dynamics (e.g., updating bid rules according to bid results and/or market information). In some embodiments, the right brain component can adjust FMV bids based on targeting, pacing and/or market dynamics.

In some embodiments, the brain engine may be built and configured for one or more of: (i) retrieving appropriate sets of normalized data from the data warehouse and/or the bidding module, (ii) comparing and ranking impression opportunities based on the sets of normalized data, (iii) grouping impression opportunities, e.g., based on the comparison and/or ranking, (iv) generating one or more rules for bidding on impression opportunities, (v) generating an initial bidding prediction based on the one or more rules and/or sets of normalized data, (vi) adapts the one or more rules based on bidding results, and (vii) optimizes the one or more rules. The brain engine may generate an initial set of bidding rules for the bidding module to bid for impression opportunities. In some embodiments, the bidding module executes one or more initial bids without using any bidding rules. The bidding module may forward or summarize bidding results to the brain engine for developing and/or refining bidding rules. In some embodiments, the brain engine exports a rule set optimized according to bidding results. The brain engine may export or provide the rule set to the bidding module. In certain embodiments, the brain engine dynamically updates the bidding rules based on new bidding results. The brain engine may dynamically update bidding rules for an ad campaign to the bidding module. The brain engine may, in some embodiments, export an updated rule set to the bidding module based on one or more of: an export schedule, a change or substantial change in the bidding rules, a change in the corresponding ad campaign, or some other triggering event.

Referring again to FIG. 2A, the brain engine generates bidding rules for an online ad campaign based in part on constraints and/or goals provided by an advertiser. In some embodiments, a client or advertiser provides one or more goals for an ad campaign. Goals may include a budget cap or target for an effective cost per Action (eCPA or CPA). An eCPA may be used as a measure of the effectiveness of impression opportunities procured by the advertiser. For example, an ad campaign may involve multiple bids over a plurality of impression opportunities. To determine the eCPA, the bid price for successful bids may be summed over a period of time and divided by the number of desired user actions (e.g., a form submission or purchase) linked to an advertisement successfully bid. The larger the number of desired user actions, the more successful the ad campaign is as the eCPA lowered. Ad campaign goals may also specify the budget for the ad campaign over a period of time. Budget spending for an ad campaign may be capped at $100,000 per month for bidding on impression opportunities. Therefore bidding may be paced (e.g., by the DSP) so that the budget is not exceeded.

Goals may also be set based at least in part on bidding success rate, conversion rate for remarketing efforts, rate of user actions, number of actions from unique users, and click through rate (CTR—which can be a way of measuring the success of an online ad campaign, obtained by dividing the number of users who clicked on an ad on a web page by the number of impression delivered). Such goals may also be set to target certain preferred websites, demographics, dayparts, etc. For example, in one embodiment, a campaign goal or objective may be to increase online order volume at or below a target eCPA. In another embodiment, campaign goals or objectives include attracting a more engaged audience as measured by CTR while maintaining a fixed cost per click through (CPC). In another embodiment, campaign goals or objectives may include achieving aggressive order volume targets at or above a return on investment (ROI) hurdle. An advertiser may define any type or form of constraints for an ad campaign. For example and in various embodiments, constraints may limit the ad campaign to certain geographical regions, such as the US only. In one embodiment, only user actions (such as registrations) completed by users residing in the US are desired. The ad campaign may prefer websites hosted in the US and/or targeting a US audience. Some advertisers may require exclusion of impression opportunities offered with user generated content (UGC). UGC, sometimes also known as consumer generated media (CGM), may refer to any online material, such as blogs and online comments, created by non-media professionals. In certain embodiments, advertisers may specific a frequency limit on the number of bids per time period. An advertiser may also limit the number of campaign flights over a time period, such as three flights per day. A flight may refer to a period of time in which a defined bid price, daily spend goal and frequency cap are defined. An ad campaign may specify one or more flights, and the bid prices, daily spend goals and frequencies at which a specific set of ads are served during these flights.

Based at least in part on the goals and/or constraints, an advertiser may define or design an ad campaign. The DSP can provide a simple and intuitive interface to help advertisers develop and/or run an ad campaign. The DSP may provide an interface for the advertiser to specify, define, compose, develop, test, refine, modify and/or design an ad campaign, for example, as depicted in FIG. 2G. The DSP may provide an interface for the advertiser to manually and/or automatically bid on an impression opportunity. In some embodiments, the DSP system provides this interface in the user interface (UI) layer. The interface provides access to and presentation of any of the functionality and services of the DSP. An advertiser may use the interface to select or specify ad exchanges for inclusion in the ad campaign. An advertiser may specify the goals and/or constraints for any ad campaign via the interface. In addition, an advertiser may access any information provided by the ad exchanges and/or publishers via the interface. These information may be processed (e.g., reformatted, organized, analyzed, normalized, etc) and may be presented in a way that is more user friendly and/or easily understood.

The interface may be any type or form of interface, such as a graphical user interface (GUI) and/or a command line interface. The interface may be a web interface or an application/software interface. Portions of the interface and interface content may be provided by a locally-executing application (e.g., software program) on a client machine 102. Portions of the interface and interface content may be remotely transmitted from a server 106 to a client machine 102 for presentation (e.g., on a browser executing on the client machine 102). The interface may include any number of widgets. A widget may comprise any one or more elements of a user interface which may be actionable or changeable by the user and/or which may convey information or content. Interface widgets may comprise any type and form of executable instructions that may be executable in one or more environments. Each widget may be designed and constructed to execute or operate in association with an application and/or within a web-page displayed by a browser. One or more widgets may operate together to form any element of the interface, such as a dashboard.

In some embodiments, using any type and form of web browser such as Mozilla Firefox, Safari, Konqueror, Opera, Flock, Internet Explorer, Epiphany, K-Meleon and AOL Explorer, an advertiser can create an account and access DSP services remotely. In certain embodiments, an advertiser may access DSP services locally and/or remotely via an application executing on a device operated by the advertiser. The advertiser can compose their ad campaign using digital content stored on the machine the advertiser is operating or by accessing a remote storage location. Since DSP components may be distributed across networks, each component may communicate with another component using any type and form of interface, protocol, inter or intra process communications, messaging, etc. In some embodiments, the interface communicates with a DSP Server using JavaScript Object Notation, (JSON) format, e.g., as specified in RFC 4627. For example and in one embodiment, the DSP system may include a direct application programming interface (API) to support JSON or other formats. In some embodiments, Hypertext Transfer Protocol (HTTP) and/or Hypertext Transfer Protocol Secure (HTTPS) may be used as the communications protocol.

DSP services, including web services, may be accessed through the provided interface via any type and form of web browsers and/or applications that can connect to a network. In certain embodiments, DSP services are provided via a website or portal for online access. In some embodiments, Secure Sockets Layer (SSL) cryptographic protocol or Transport Layer Security (TLS) protocol is used by the DSP platform, portal or website to provide secure communications with web browsers and application. Any type and form of security mechanisms and/or protocols may be used to provide a secure session or connection with the DSP platform, portal, service or website. Embodiments of the systems described herein may include any type or form of high speed connection with the DSP platform, portal or website, such as one or more T1 lines and/or higher bandwidth lines.

In some embodiments, the interface facilitates creation of online display ad campaigns. By way of illustration and not intended to be limiting in any way, the following description shows how an advertiser may create a REM online display campaign using the interface. In connection with the ad campaign, goal-based optimization, marketing options based on core plans, and/or the ability to target or buy audiences may be provided as part of DSP services. The advertiser can use the interface to perform any of: (i) create a new REM campaign for an existing advertiser, or select from a list of pre-existing campaigns (e.g., under the Campaign Settings section of the interface), (ii) configure start/end date, price, spend and frequency (e.g., under the Campaign Settings section of the interface), (iii) select a pixel to use in a REM target segment campaign (e.g., under the Pixels section of the interface), (iv) enter an ad tag creative to be used in the campaign (e.g., under the Creatives section of the interface), and (vii) launch the REM campaign. A creative, as referenced above, may represent online ads that are referenced via ad tags. These online ads may be used to remarket to users.

In some embodiments, a pixel, as referenced above, is an image that is placed on an advertiser's page or pages and used to target a REM segment. In some embodiments, a pixel is a unique tracking element which is used to serve ads to a visitor when they are on other web sites. The pixel can be of any size, such as 1×1. The pixel may represent, include or incorporate any type or form of script or program code. The script or program code may be activated when the pixel and/or the host webpage is loaded onto a browser or device. This pixel may install a tracking device on a consumer's device used to visit the advertiser's page or website. REM may target known consumers who have taken a specific action at a site as they travel to other sites across the internet. A successful REM may reach these consumers by serving them compelling ads based on their previous actions.

In certain embodiments, the DSP interface is designed to allow an advertiser to enter any type or form data as it becomes available to the advertiser. The interface may include a dashboard that provides a listing of ad campaigns in the DSP system associated with an advertiser. The dashboard may indicate the status of each campaign dynamically in real-time or with updates at defined instants. In some embodiments, an advertiser can perform any of the following from the Dashboard: adding a new campaign, editing an existing campaign, launching a campaign or stopping a campaign that is currently running. Campaigns may be listed in chronological order (e.g., newest to oldest), or in any order. In some embodiments, the interface can display any type or form of campaign data, such as ☐Campaign Name, Advertiser, ☐Campaign Type, Start/End Date, Status (e.g., Not Ready to Launch, Ready to Launch, Scheduled Pause, Manual Pause, Running, Completed, etc). The interface may also include Action Buttons or widgets for performing specific actions (e.g., Edit Campaign, Launch Campaign and Pause Campaign).

The display can present additional details of any listed campaigns, e.g., upon user demand. For example and in one embodiment, a user may view additional details regarding the status of steps required to create a launch-ready Campaign. In certain embodiments, the interface includes three sections for defining or configuring an ad campaign: Campaign Settings, Pixels and Creative. In one embodiments, a campaign is ready for launching when these three sections are complete. An advertiser may create a new campaign in the Campaign Settings section. To edit a campaign, a user may select the campaign and identify the section(s) for editing. In some embodiments, a campaign is editable if the campaign's status is "Not Ready to Launch" or is paused (e.g., manually or through scheduling). In one embodiment, a user can manually pause a campaign that has already launched (e.g., performing impression opportunity monitoring and/or bidding) via the dashboard (e.g., a "Pause Campaign" Action Button). After making edits, an advertiser can launch an edited campaign (e.g., via a "Launch Campaign" Action Button). In some embodiments, a Launch Confirmation screen allows a user to review some of the settings before launching a campaign.

In some embodiment, once a campaign is launched, the corresponding status may be "Running" or "Scheduled Pause" (e.g., if the start date is in the future). A campaign will continue until (i) the campaign is manually paused by a user, (ii) the campaign is scheduled to pause by placement of a gap between flight dates, or (iii) the campaign has completed one or more flights, or its run of flights.

A user may include any type and form of configuration setting for a campaign via the interface. In some embodiments, a user (e.g., from an a agency) may identify a client (e.g., from a plurality of clients) for which the user is creating a campaign. The user may specify or select the type of campaign (e.g., REM, prospecting) to create or launch. The user may specify or select a third-party ad server (e.g., Atlas and DART for Advertisers (DFA), 3PAS), e.g., as depicted in FIG. 2G. The user may also specify or select one or more of: the advertiser site, targeted unique visitor count (e.g., per month), spending goals (e.g., daily spend goals), targeted segment (e.g., defined by third-party analytics such as Exelate and Axciom), types of completed actions, types of impression opportunity, types of published content, channels, day parts, week parts, ad size preferences, bid range and targets.

A user may include any type and form of configuration setting for a flight via the interface. For example, a user can specify the start and end dates/times for a campaign flight. A user can create multiple or additional flights via the interface. A user can extend a campaign or test different bid prices, daily spends and frequency caps against each other. Any type or form of flight details can be presented on demand via the interface, e.g., responsive to a mouse-over, presenting a visual reference of a flight. Any of the specifications or settings described herein may be entered into data structure for evaluation, verification, calculation or checks. For example and in one embodiment, price, daily spend and frequency goals and/or caps for a flight may be entered into a budget matrix of the interface. Specifications classified as a goal (e.g., daily spend goal) is specified as a target to the DSP and may not be guaranteed. Specifications classified as a range, limit, floor or cap may be guaranteed.

In some cases, an ad agency may represent a client. The ad agency may have a CPM price agreement with the client for an ad campaign. The ad agency may specify this CPM (or Advertiser IO Price) via the DPS interface, for example to determine or calculate the maximum bid for the ad campaign. A user may specify a bid price via the interface. The range of the bid price may be determined or capped by the Advertiser IO Price. In some embodiments, the DPS may calculate a Daily Estimated Available Impressions (e.g., At Cost) using an algorithm that approximates the total pool of available number impressions. The DPS may comprise or communicate with an impression calculator that determines an estimate of daily impression opportunities available across one or more providers. In certain embodiments, the Daily Estimated Available Impressions (DEAI) represents the total possible impressions, e.g., at the set price and frequency cap. In other embodiments, the DEAI represents the number of estimated impressions at the set price and frequency cap. The DPS may calculate the DEAI based on the number of monthly unique users to the Advertiser Site. By way of illustration, the DPS may determine the flight spending by multiplying Daily Spend Goal by the number of days in the flight. The DPS may determine the campaign budget based on the flight spending of flights in the campaign.

An advertiser may specify a frequency cap for serving the advertiser's ads. The advertiser may have an option of choosing how often ads are served per number of Hours, Days, or other time period. An advertiser may specify or choose to have the ads served ASAP, evenly distributed, according to other distribution profiles or via the DSP's recommended or optimized settings. An advertiser can save any portion of the settings or specifications disclosed herein at any point of time.

An advertiser may select or create any type or form of REM targeting segment pixel for a campaign. The advertiser may add one or more ads for the campaign. Each ad may be referenced by an ad tag. Each ad may be served from an ad server which may be specified via the interface. In some embodiments, some ads may be uploaded into the DPS via the interface. In certain embodiments, ads may be designed, customized and/or modified via the DPS interface. An advertiser can specify one or more ad sizes. In some embodiments, standard ad sizes may be specified or automatically configured. In one embodiment, the DPS may automatically resize and/or crop an ad to match an ad size offered by an impression opportunity.

In some embodiments, the brain engine of the DSP processes some or all of the data provided via the UI, core and/or integration layers. The brain engine may use any of these data for campaign creation, trafficking management, yield management and/or generating analytics. In some embodiments, trafficking refers to running campaigns by sending ad tags to publishers and/or ad exchanges. Yield management may refer to analysis or evaluation of campaigns to obtain measures of online advertising success. Online advertising success may be measured in any one or a combination of cost, budget-management, user actions or conversions, increased audience awareness of advertiser products and/or services, bidding success rate and/or efficiency, order volume and revenue. Online advertising success may incorporate metrics such as CPM, CPI, CPC, CTR, CPA, ROI, cost per lead or registration (CPL) and cost per sale (CPS).

The DSP system may be designed and built for scalability. Some estimates have reported that over thirteen billion impression opportunities may be available per day. Accordingly, the DSP system can operate to analyze and/or handle transactions for large volumes of impression opportunities efficiently and effectively. In addition, the DSP can interface with any number or type of ad exchanges and/or ad networks, including but not limited to RightMedia, Google AdX, AdECN, Adsdaq, Adbrite, Valueclick, Admeld, SpotXchange, AdNexus, AdBidcentral, Traffiq, OpenX, BidPlace, Facebook, Pubmatic and Yahoo APT. In some embodiments, the systems and methods described herein can source for new ad exchanges and/or ad networks online (hereafter sometimes referred to as "supply partners"), and incorporate new interfaces for these or adapt existing interfaces for reuse on these supply partners. The DSP platform can interface with biddable media sources of any level of sophistication, including but not limited to real-time bidding, API based platforms, and UI/bidsheet interfaces.

In various embodiments, the DSP platform can handle one or more bidding transactions (or bids) within short periods of time (e.g., 30 ms). During a short period of time, the DSP platform can communicate or submit one or more bids for an advertiser to one or more impression opportunities for the placement of an advertisement. These periods of time may be dependent on, or relative to network latency and/or load times for a page or image (e.g., on a web page). In some embodiments, the DSP platform includes direct connections to some or all supply sources, which can enable low bid latency. For example and in one embodiment, a user action may trigger loading of a web page having an impression opportunity. In another embodiment, a user action may trigger loading of an application interface having an impression opportunity. In some embodiments, the impression opportunity is offered for bidding (e.g., via one or more ad exchanges) responsive to the user action. In other embodiments, the impression opportunity is preemptively offered for bidding prior to a user action or schedule action. During any portion of the time from offer of the impression opportunity until the complete loading of the page or interface, a DSP may perform any of the impression opportunity analysis, determination of whether to bid, bidding rule adjustments, actual bidding, delivery of ad to publisher, payment of a successful bid, etc. The DSP may consider the impression opportunity in connection with one or more other impression opportunities to determine which impression opportunities to bid on at any instant of time and/or at what bid prices. For an impression opportunity that is offered via multiple ad exchanges, the DSP may also determine the ad exchange(s) to submit a bid to.

The DSP, including the brain engine, may incorporate any standard, proprietary and/or custom algorithms and/or software for executing on hardware from the DSP provider, advertisers and/or DSP partners. The algorithms and/or software may incorporate any type or form of predictive modeling, simulation methods, and computational techniques, e.g., from physics, statistics, game theory, and algorithmic securities trading. The algorithms and/or software integrated in the DSP platform may be refined or tuned via any number of real-world or simulated campaigns.

The DSP, via the interface and/or brain engine, may operate across any number of exchanges, accounting for differences in available data sets, variable naming, and bid types (CPM, CPC, etc). The DSP, via the interface and/or brain engine, may incorporate any number and/or type of variables, including third-party data (e.g., from Exelate service). The DSP may identify any important groupings within those variables. The DSP, via the brain engine, may recognize and account for interactions between variables (e.g., Monday impressions perform poorly, but Monday in News channel works well except for dialup connections). The DSP, via the brain engine, may adaptively adjust bidding rules based on interactions between variables.

The DSP, via the brain engine, may optimize bidding operations towards any definable or measurable buyer goal (e.g., click count, orders, post-order activity, ROI, etc). The DSP, via the brain engine, may auto-update predictions and/or bidding rules as more data becomes available. The DSP, via the brain engine, may determine and implement competitive bidding, e.g., by adjusting bids according to recent bidding results and parameters. The brain engine may continually or dynamically re-test predictions and/or rule sets to ensure ongoing accuracy of predictions, competitive bidding prices, consistency with advertiser goals and/or constraints. In some embodiments, the brain engine can identify anomalous activity, e.g., via profiling impression opportunity transactions and/or user actions. Based on the anomalous activity, the brain engine may adjust the bidding process or rule set, the DSP's interaction with any ad exchange or publisher, or any other aspect of the ad campaign.

By way of illustration and not intended to be limiting in any way, the brain engine of the DSP system can generate estimates for metrics such as CPM for different categories of impression opportunities. For example, pools of impression opportunities may be integrated and normalized into a single pool of impression opportunity supply. In some embodiments, the brain engine predicts the impression pool size for a particular day or other time period through analysis of available data. Based on this pool, the estimated CPM may be $1.37, for example. This pool may be further divided into impression opportunities suitable for REM (e.g., 4% of all impression opportunities, CPM=$5.53) and prospecting (e.g., 96% of all impression opportunities, CPM=$1.20). The prospecting impression opportunities may be further classified according to segments (e.g., 5% from BlueKai segment at $2.24, 7% from Exelate segment at $2.17, etc). Each segment may be further classified into channels (e.g., 8% from news at $1.14, 11% from women at $1.31, etc). Each channel may be further classified into dayparts (e.g., 13% from the 12 pm-6 pm slot at $0.86). In some embodiments, the REM impression opportunities may be further classified according to ad size (e.g., 2% are 728×90 ads at a CPM of $2.24), and further classified according to weekpart (e.g., 1% of impression opportunities applies to weekend at a CPM of $4.90). Based on this impression opportunity pool analysis, the DSP system can help an advertiser tailor a campaign and/or match demand (e.g., for specific inventory types) with the available supply of impression opportunities.

In some embodiments, the DSP platform can provide comprehensive reporting capabilities. Reporting capabilities includes support for internal clients (e.g., DSP administrators and developers) as well as external client (e.g., ad agencies). Reporting may be provided via the DSP interface and/or delivered directly to a requestor, e.g., via email. Reporting capabilities include operational reporting as well as any type or form of insight and analytics. In some embodiments, operational reporting includes any type or form of statistics, logs, records, summaries and/or alerts pertaining to the operation of the DSP system, running of a campaign, execution of a flight and/or status of a bid. Insights and analytics may include any type or form of information or data processed or derived from operational data, supply partners, third-party sources and/or advertisers. The DSP platform can provide real-time analytics, e.g., via a feedback loop in which the brain engine constantly updates bidding modules as statistically significant variables are discovered and/or pockets of performing media are unlocked.

A business intelligence (BI) suite may provide insights and analytics capabilities. A BI suite may provide an external presentation layer as part of the DSP reporting capabilities. For example and in one embodiment, the BI suite may provide insight and analytics to ad agencies using the DSP platform. A BI suite may apply analysis and intelligence on data inputs incorporated from various sources and applications. A BI suite may provide a range of features such as interactive dashboards, proactive intelligence delivery and alerts, ad hoc queries and analysis, operational and volume reporting, online analytical processing (OLAP) analysis and presentation, dynamic predictive intelligence, disconnected analytics, unified metadata processing and ETL from any data source.

In some embodiments, the DSP can provide site or audience analysis as part of its insight and analytics capabilities. In various embodiments, the DSP's BI, insight and analytics capabilities may be implemented in the optimization layer. In some embodiments, the DSP's insight and analytics capabilities can estimate, determine and/or recommend optimal frequencies (e.g., of flights, bidding), rank responsive of regions or target segments, identify the relative success of ad channels and/or publishers (e.g., with respect to order volume and/or user actions), and characterize or classify conversions. In certain embodiments, the DSP can provide analysis pertaining to creatives. For example and in some embodiments, the DSP can profile or summarize the attributes of creatives applied in ad campaigns. The DSP may determine which creative concepts are driving performance in terms of sales and/or different types of user actions.

In certain embodiments, the DSP can provide attribution and segmentation analysis. This may include determining an optimal timelag window for attribution, bidding, presenting an ad, executing flights, or running a campaign. The DSP may determine the economics (e.g., ROI, CPM, etc) at an ideal timelag window. The DSP brain engine may determine the characteristics and/or profiles of conversion segments. The DSP brain engine may attribute success of certain metrics to particular segments, channels, ad flights, campaigns, etc. In some embodiments, the DSP can forecast spending levels. For example and in some embodiments, the DSP can predict what CPA (or other metric) can be achieved according to certain budget levels. The brain engine of the DSP can adjust or scale the forecasts based on changes in different budgeting aspects.

In some embodiments, the DSP system provides distributed processing for its subsystem components. FIG. 2D depicts one embodiment of this distributed DSP platform. In certain embodiments, a plurality of data centers may house brain engines, pixel management technology, bidding modules, data warehouses, offsite backup, system fault tolerance support, application failover clusters, etc. Some data centers or server farms 38 may include an application cluster comprising a brain engine, an uber bidder, bidders, a local data store or warehouse. Client requests, including ad campaign creation, requests for reports, campaign execution and campaign simulation, may be distributed via global load balancing (e.g., via a central server) to one or more data centers for processing.

Some of the DSP data centers or application clusters may be connected by private transit interconnects or links. Some of the DSP data centers or application clusters may be secure by firewalls. In some embodiments, the DSP platform includes direct links to major peering points, e.g., peer and internet exchange (PAIX), New York International Internet Exchange (NYIIX), etc. Some of all of the DSP distributed system may be monitored via a distributed or central Network Operations Center. In some embodiments, the distributed DSP platform provides fault tolerant operation and/or failover. The distributed DSP platform may provide dynamic, real-time scalability. The distributed DSP platform can be customized ore reconfigured to meet evolving needs. In various embodiments, the distributed DSP platform can provide high system availability and/or high system performance.

Figure 2E:
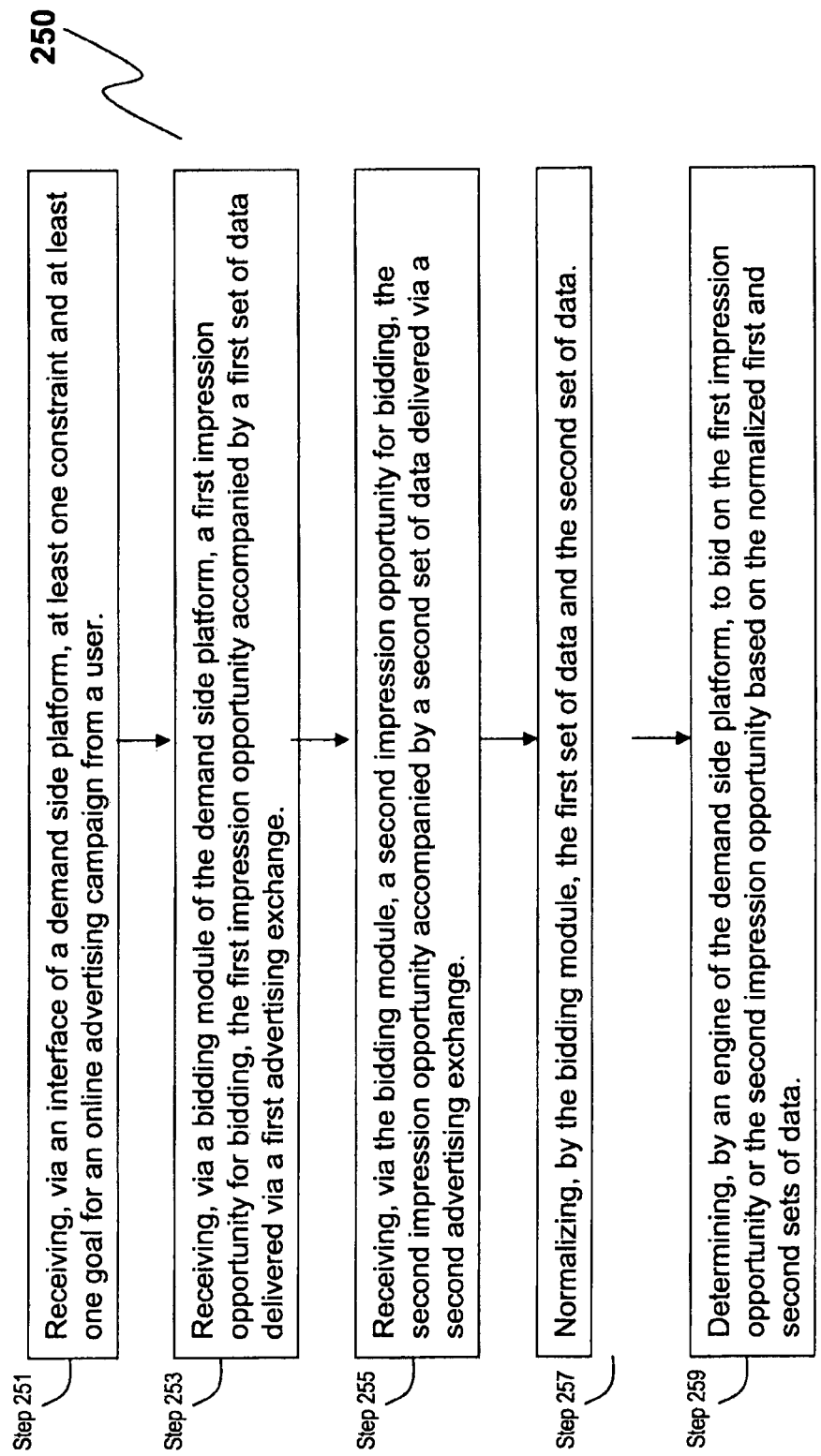
FIG. 2E is a flow diagram depicting an embodiment of a method for integrating multiple pools of impression opportunities from multiple advertising exchanges for bidding by advertisers.

Referring now to FIG. 2E, a flow diagram depicts embodiments of steps taken in a method 250 for integrating multiple pools of impression opportunities from multiple advertising exchanges for bidding by advertisers. The method includes receiving, via an interface of a demand side platform (DSP), at least one constraint and at least one goal for an online advertising campaign from a user (251). A bidding module of the demand side platform receives a first impression opportunity for bidding, the first impression opportunity accompanied by a first set of data delivered via a first advertising exchange (253). The bidding module receives a second impression opportunity for bidding, the second impression opportunity accompanied by a second set of data delivered via a second advertising exchange (255). The bidding module normalizes the first set of data and the second set of data (257). An engine of the demand side platform determines to bid on the first impression opportunity or the second impression opportunity based on the normalized first and second sets of data (259).

Referring now to FIG. 2E, and in greater detail, the method includes receiving, via an interface of a DSP, at least one constraint and at least one goal for an online advertising campaign from a user (step 251). In some embodiments, a user (e.g., of an ad agency), enters or otherwise inputs at least one constraint and goal for an ad campaign via an interface provided by the DSP. These constraints and/or goals may incorporate features of the constraints and/or goals discussed above in connection with FIGS. 2A and 2B.

The user may enter additional information with respect to the campaign, such as parameters or settings of any type or form described above in connection with FIGS. 2A-2C. For example, the user may specify the advertiser or client for the campaign. The user may specify any one or more of: the type of campaign, the advertiser site, targeted unique visitor count, spending goals, targeted segment, types of completed actions, types of impression opportunity, types of published content, channels, day parts, week parts, ad size preferences, bid range and targets. The user may include any type and form of configuration setting for a flight, such as the start and end dates/times. The user may specify a frequency cap and/or profile for serving the advertiser's ads. The user may select or create a REM pixel and/or ads for the campaign.

The user may enter any of these information, constraint(s) and/or goal(s) using a form, script and/or command line submission. The user may provide any of these information and/or selection via a web or application interface. In some embodiments, the user may request the DSP to recommend at least one constraint, goal, setting and/or parameter for the campaign. The DSP may determine a recommendation of a constraint, goal, setting and/or parameter based at least in part on other information provided by the user, available in the DSP warehouse and/or from third-party sources. The DSP may calculate estimates for metrics such as campaign budget, based at least in part on other information provided by the user, available in the DSP warehouse and/or from third-party sources. In some embodiments, the DSP may predict a measure of success for the campaign based in part on estimated impression opportunity availability and/or past statistics.

In further details of 253, a bidding module of the DSP receives an impression opportunity for bidding. The impression opportunity is accompanied by a set of data delivered via an advertising exchange. The bidding module may receive a set of data specific to the ad exchange. The bidding module may receive the set of data associated with or describing the impression opportunity. The bidding module may receive the impression opportunity in real-time as the impression opportunity is about to be presented to a user. The bidding module may receive the impression opportunity before a user can cause it to be presented to the user.

In further details of 255, the bidding module receives another impression opportunity for bidding. This impression opportunity is accompanied by a another set of data delivered via another advertising exchange. This set of data may be specific to the corresponding ad exchange. The bidding module may recognize or determine that this set of data is presented or organized differently from the earlier set of data. The bidding module may recognize or determine that this set of data includes more (or less) information than the earlier set of data. In some embodiments, the bidding module determines that this impression opportunity is the same as the other impression opportunity, although the accompanying data sets may differ in some aspects.

In further details of 257, the bidding module normalizes the two sets of data. The bidding module may apply any type or form of ETL, filtering, protocol translation, data integration, mapping, reformatting or other processing techniques to normalize the two sets of data. The bidding module may compare the types of data between the two sets of data in determining how to perform the normalization. The bidding module may request for additional data for each set of data from the corresponding ad exchange and/or retrieve additional data from a data warehouse of the DSP.

In further details of 259, an engine of the demand side platform determines to bid on one of the first impression opportunities based on the normalized sets of data. The engine may process one or more of the constraints, goals, parameters, settings and/or normalized sets of data to determine whether to bid on either impression opportunities. The engine may generate an initial set of one or more rules from one or more of the constraints, goals, parameters, settings and/or normalized sets of data to determine whether to bid on either impression opportunities. The engine may determine to whether to bid on either impression opportunities based on the initial set of rules. The engine may predict an outcome for a bid. The engine may determine what price to use for a bid. In some embodiments, the engine determines not to bid. In other embodiments, the engine determines to bid on one or both of the impression opportunities.

In some embodiments, the engine submits a bid to one of the impression opportunities. The DSP may deliver a REM pixel and/or ad for the impression opportunities. If the bid is accepted, the DSP may process payment for the bid. In some embodiments, the outcome of the bid is updated into the DSP's data warehouse. The DSP may adjust or change the initial rule set based on the outcome of the bid.

Figure 2F:
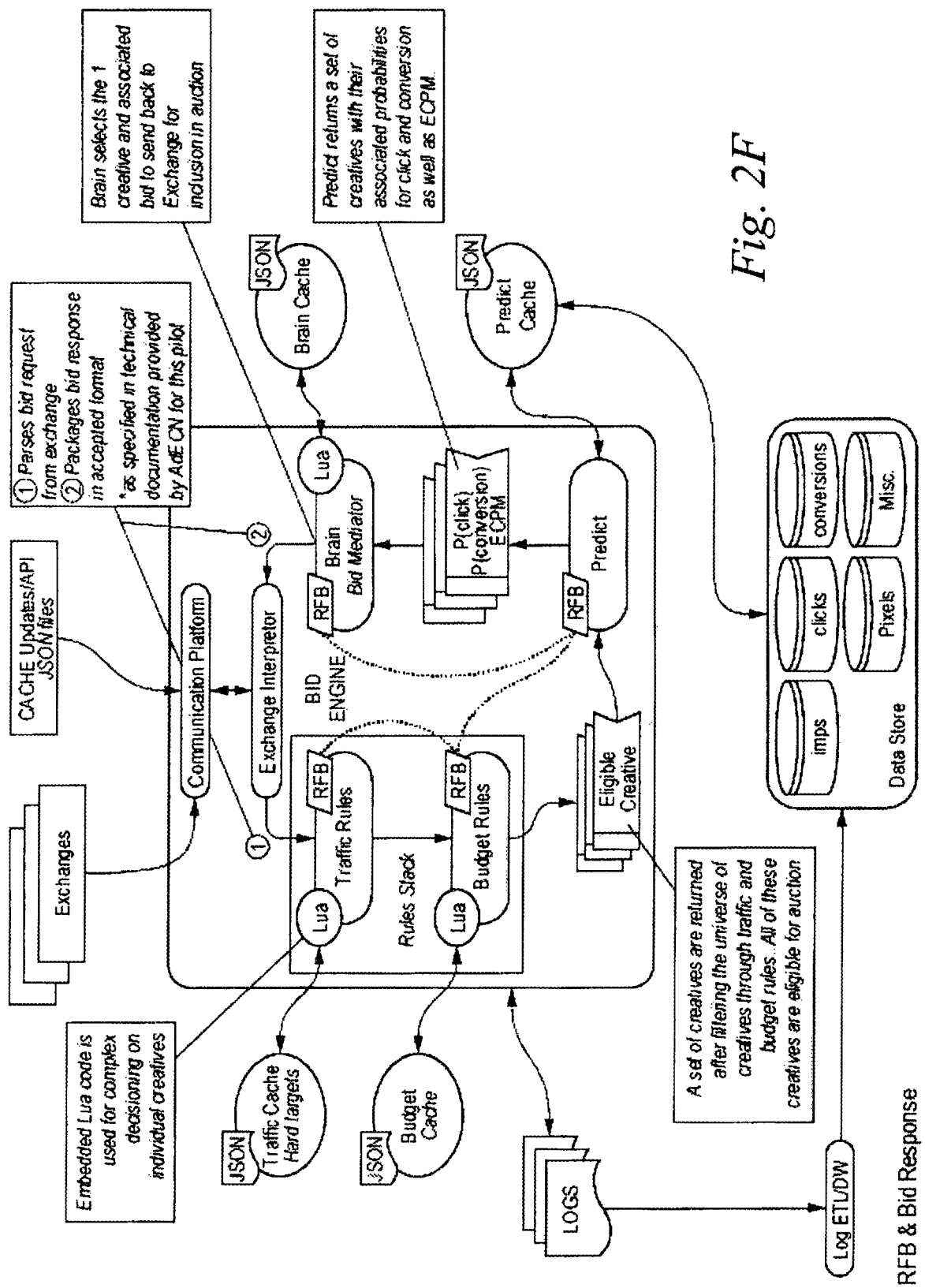
FIG. 2F is a block diagram depicting an embodiment of a transaction environment for providing a normalized interface to a plurality of exchanges.
Figure 2G:
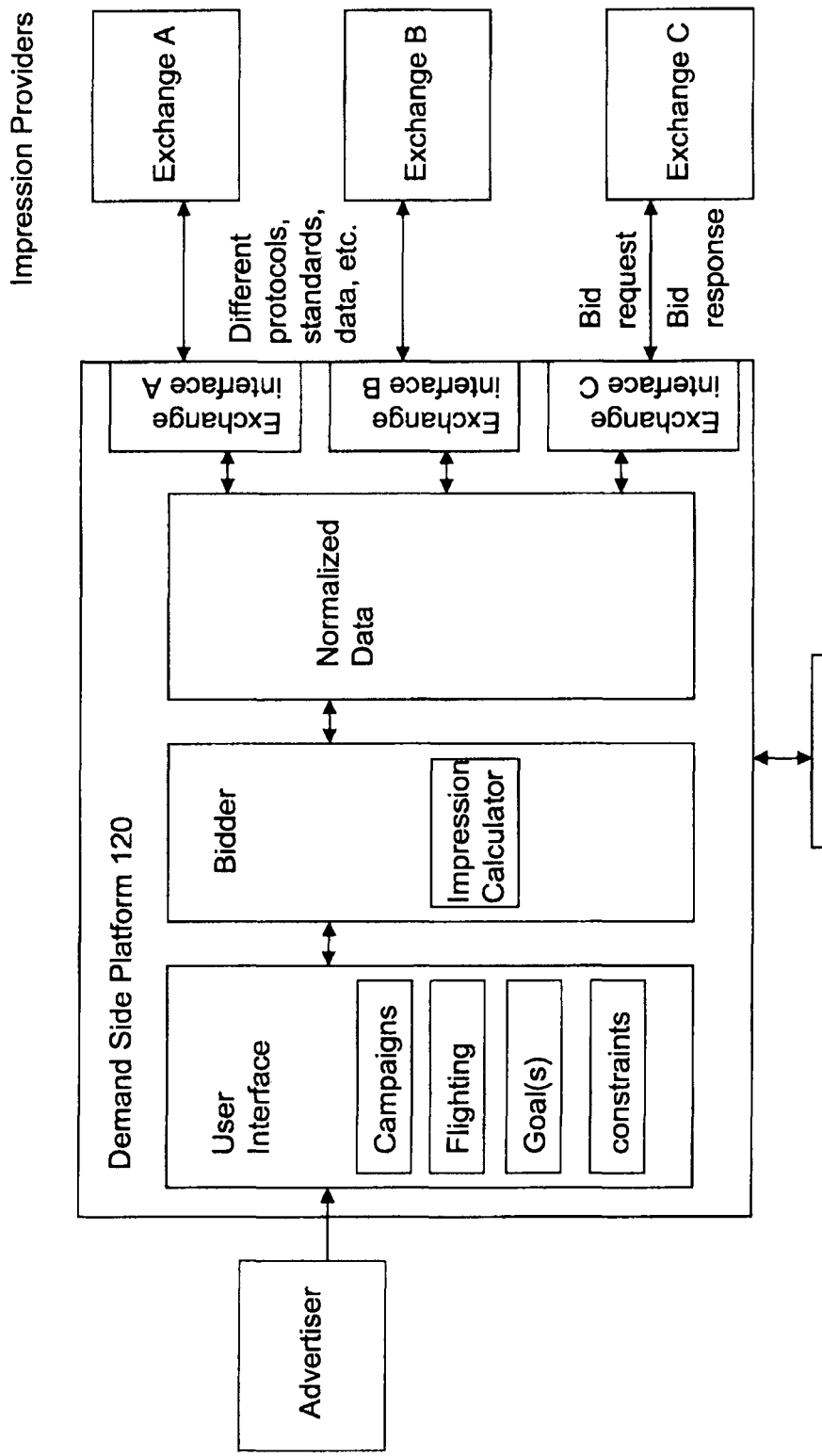
FIG. 2G is a block diagram depicting an embodiment of a system for matching, by a demand side platform, an advertisement with an impression of a plurality of impressions available across a plurality of impression opportunity providers.

Referring now to FIG. 2F, embodiments of analysis and normalization of data and interfaces across a plurality of disparate and different supply sources, referred to as cross-exchange integration and normalization, is depicted. FIG. 2F depicts, in one of the embodiments, a transaction system and environment for cross-exchange interfacing and bidding.

In brief overview of FIG. 2F, an embodiment of the transactional bid environment is depicted. The transaction bid environment includes a connection manager, exchange interpreter, decisioning/decisioner, predictor, brain engine and transaction level data aggregation and reporting, Each of the above modules may comprise any type and form of executable instructions executing on any one or more computing devices.

The connection manager comprises logic, functions and operations for initiating and maintaining connections and communications to each of the disparate and discrete exchanges. The connection manager may be designed and constructed to communicate and interface to each exchange based on the technology, API, protocols and command and data communications specific to each exchange.

The exchange interpreter comprises logic, functions and operations for normalizing the input and output data and information from each of the exchanges. The exchange interpreter identifies and maps the input and output data from the exchanges to a common, single interface and data set to be used by the demand side platform and/or bid transaction system. In some embodiments, the exchange interpreter includes the ETL features to normalize and load the exchange inputs (bid requests) and bid environment outputs (bid response).

The decisioning or decision module comprises logic, functions and operations for identifying creatives or forms of advertisements available for auction based on bid request, traffic rules and budget rules. The traffic rules may comprise any type and form of policies or rules for deciding on bidding based on the publisher, user, location, geo data, network information of the traffic and any other information about the source of the advertisement to the destination of delivery of the advertisement. The budget rules may comprise any type and form of policies or rules for deciding on bidding based on any constraints or goals of the campaign, including budget and flighting.

The predict module may comprise logic, functions and operations to calculate, identify and/or present the probability of click and conversion for a set of creatives. The brain engine generates the bid based on decisioning, prediction and campaign metadata. The transactional environment provides one or more reporting modules that provide performance and operation metrics, information and data on any level of granularity from transaction level to campaign level to exchange level. Each reporting module may provide performance and operation metrics, information and data on any aggregation of agency, campaigns, transactions, exchanges including cross-transaction, cross-campaign and cross-exchange information. The reporting module may provide performance and operation metrics, information and data on any of the traffic and budget rules and the performance and operation of any of the modules, including bidder, predictor and decisioning modules.

Referring now to FIG. 2G, an embodiment of a DSP 120 is depicted. In brief overview, the DSP may include an interface for requestors to request campaigns be executed for bidding via the bidder on impression opportunities provided by a plurality of impression opportunity providers, sometimes referred to as exchanges. Each of the different exchanges may have different data formats, protocols and parameters used by the exchange interface for bidding, such as different data formats, protocols and parameters for a bid request and bid response. The DSP may have a plurality of exchange interfaces that are designed and constructed to interface to or communicate with the interface of each of the plurality of exchanges. The DSP may include a normalizer to provide a normalized set of data from the plurality of different data and data formats provided by the different exchanges. The bidder may use the normalized set of data for bid requests and bid responses communicated with an exchange. The bidder may operate responsive to a campaign set up via an interface that allows a requestor to setup campaign goals and constraints. Using a single interface to setup and request execution of a campaign, the bidder may execute the campaign to trade or match a plurality of advertisement placements to a plurality of impressions across a plurality of different exchanges.

In further details, each of the exchange interfaces may comprise any type and form of executable instructions that are designed and constructed to interface to, communicate with and/or transact with a predetermined exchange and the interface provided by such an exchange. Each exchange interface may be designed and constructed to use formats, data, parameters and protocols recognized and used by the exchange, such as any of those depicted in FIGS. 2H and 2I described below. Each exchange interface may be designed and constructed to handle bid requests and bid responses or otherwise perform a bid related transaction with the exchange. Each exchange interface may identify and process data received by the exchange to store to a database for use by the bidder in further bidding determinations. Each exchange interface may store the data sent to and/or received from an exchange to the database in a desired manner for normalization or otherwise to a normalized data storage or structure storing the data. In some cases, a single multi-interface exchange interface may be designed and constructed to interface to and/or communicate and transact with the plurality of exchanges.

Referring to FIGS. 2H and 2I, these diagrams depict the different interfaces of bid requests and responses across a set of example embodiments of exchanges. FIG. 2H depicts generally a set of parameters that may be used in bid requests across a plurality of different exchanges (e.g., Exh A thru Exh N). FIG. 2I depicts generally a set of parameters that may be used in bid responses across a plurality of different exchanges (e.g., Exh A thru Exh N). Each of the exchange interfaces may be designed and constructed to handle the request parameters depicted in FIG. 2H for bid requests from a corresponding exchange and the response parameters depicted in FIG. 2I for bid responses from the corresponding exchange.

In FIG. 2H, a table of parameters P1-PN are identified across a plurality of exchanges Ech A-Ech N for bid requests. Each of the exchanges may have an API format or interface, such as a Jason (JSON) interface, HTTP Post interface or an HTTP Get Interface identified in parameter P1 in the table. Some of these API formats may use query string parameters in the Get or Post. Some of these API formats may be text based. Some of these API formats may be XML based. Some of these API formats may use Google protocol buffer. Protocol buffers is Google's language-neutral, platform-neutral, extensible mechanism for serializing structured data, similar to XML. One define how the data is to be structured once, then special generated source code is used to write and read the structured data to and from a variety of data streams and using a variety of languages, such Java, C++, or Python. Each of the exchanges pay have an identified, predetermined to expected response time, such as those identified by parameter P2 in the parameter table. In accordance with their identified API format, the exchanges pay receive and/or pass parameters via the request. Each of the exchanges may support some of the same parameters while some exchanges do not support the same parameters. Exchanges supporting the same parameters may use the same or different variable names or id for such parameters. An exchange may support or use other or additional parameters not used by another exchange.

Some of the exchanges may have an identified, predetermined or expected response time, such as those identified by parameter P2 in the parameter table. Each of the exchanges may use a differently named parameter or variable for a request identifier and user identifier, such as those identified in parameters P3 and P4. Each of the exchanges may use the named parameter or variable for a visitor or user's IP address, such as those identified in parameter P6. Each of the exchanges may use various variables for parameters identifying the size of the ad, such as ad width and height identified in parameters P26 and P27. Each of the exchanges may use various variables for browser or user agent identification such as parameter P9. Each of the exchanges may use various variables for identifying the page url for the bid request or impression such as parameter P11.

In some cases, some of the exchanges support a certain set of parameters while others do not. For example, in view of parameter table in FIG. 2H, not all the exchanges support or have variables for parameters P5, P7, P8, P10, P12-P25, and P28-P31. Some of these parameters include external user identification or id (P5), time zone identification (P6), language identification (P7) and identification of a site URL (P10). Parameters P12-P25 used by some of the exchanges may identify and use different variable for the following: Referrer (of Page URL), Cookie, Category, Publisher, Tagged, Sited, Age (of user), Gender (of user), Country (of user), Region (of user), DMA, City, Antitype (js,html) and AdType. Each of the exchanges may support or use other, additional or optional parameters, such as those identified in parameters PN.

In FIG. 2I, a table of parameters P1-PN are identified across a plurality of exchanges Ech A-Ech N for bid responses. Each of the exchanges may have an API format or interface, such as a Jason (JSON) interface, HTTP Post interface, text interface or an HTTP Get Interface identified in parameter P1 in the table. Some of these API formats may use Google protocol buffer. Each of the exchanges may support or identify variables for the creative such as those identified in parameter P6. Some of the exchanges may have an identified, predetermined or expected response size, such as those identified by parameter P2 in the parameter table. In some cases, some of the exchanges support a certain set of parameters while others do not. For example, in view of parameter table in FIG. 2I, not all the exchanges support or have variables for parameters P3-P5 and P7-P15. Parameters P3-P5 and P7-P15 used by some of the exchanges may identify and use different variable for the following: CPM, Creative, Creative ID, Creative Attribute, Click-thru URL, Request ID, Transaction ID, Brand Type, Notification URL, and Piggyback Cookie.

Referring back to FIG. 2H, the DSP normalizes the interfaces to each of the plurality of exchanges. As the DSP is aware of and understands the similarities and difference between each of the exchanges, the DSP can normalize these similarities and differences such that a single interface for establishing and executing a campaign across the exchanges. The normalization may occur in multiple ways, such as providing a data abstraction, data interface and/or data structures, such as a unified or normalized data interface, in the DSP that represents the common parameters across the exchanges. When the DSP interfaces with the exchange, the DSP may translate these normalized data structures to the parameters and variable names expected by the specific exchange. For those parameters not common across all the supported exchanges, the DSP may include logic, functions or operations to provide values for those parameters that are appropriate for the transaction when interacting with the exchange. The values for these parameters may be data tracked or managed by the DSP and stored in a DSP database, such as a user database or an exchange related database. Likewise, when receiving responses from the exchange, the DSP may translate the common exchange parameters into the unified or normalized data interface and non-common parameters are tracked and managed by the DSP, such as via a user or exchange database.

By normalizing the data for the exchanges and providing one interface to run a campaign that executes across the plurality of exchanges, the DSP platform provides a cross-exchange system with a single interface to trade demand for impression placement with supply of impression opportunities. From one or more campaigns of an advertiser, a first portion of the demand of the campaign to place advertisements may be traded with or matched to a first set or pool of impression opportunities of a first exchange, a second portion of demand of the campaign to place advertisements may be traded with or matched to a second set or pool of impression opportunities of second exchange, and so on. For example, a first advertisement of the advertiser for a first campaign may be delivered to a first impression opportunity of a first exchange while a second advertisement for the first campaign may be delivered to a second impression opportunity of a second exchange, and so on. As such, a single campaign may be executed across different exchanges and pools of impression opportunities.

An advertiser may run a plurality of campaigns that are executed across the same set or different set of multiple exchanges than previous campaigns of the advertiser or campaigns of other advertisers. As the DSP is a multi-user service or platform that supports a plurality of campaigns executing from the same advertise and different advertisers at the same time, the DSP provides a trading platform of matching a plurality of demand for advertisement placements of a plurality of advertisers to a plurality of pools of impression opportunities across a plurality of exchanges. As such, a plurality of campaigns may be executed across different exchanges and pools of impression opportunities.

One or more campaigns executed across the plurality of exchanges may be established, requested and/or executed via a common, unified or normalized user interface. Although the exchanges have different bid request and response parameters and different API formats and interfaces, the DSP platform provides a common or unified user interface, sometimes referred to a single interface, to the user to provide an efficient and easy input mechanism to setup and run campaigns for these different exchanges. The unified user interface removes these differences in the interface to the exchange so that the user can provide a campaign strategy via the unified interface that works across the exchanges without the user dealing with these differences. In one aspect, the unified user interface allows the user to setup and run a campaign agnostically to the pool of exchanges accessible via the DSP.

A user may establish a campaign and campaign strategy with specified goals and constraints. These goals and constraints are applied by the DSP to execution of the campaign across the plurality of exchanges. Although placements of impressions will be transacted with different exchanges for the campaign, the DSP applies the common or single set of goals and constraints specified for the campaign to the aggregated set of placements for the campaign across the different exchanges. For constraints, the DSP applies the specified constraints to bidding and placement of impressions on an exchange in the terms and format of the interface of the corresponding exchange. For a campaign, the DSP tracks and manages the plurality of bid transactions across the different exchanges. The DSP compares and tracks the campaign results in progress to the campaign goals. The DSP uses these comparisons and tracking as input and/or to adjust the remaining execution of the campaign.

The DSP, such as via bidder, may track statistics regarding number of available impression opportunities across the exchanges, number of bids and/or number of procured impression from the impression opportunities. Based on historical data and trends, the DSP may calculate and provide a daily estimate of a number of impression opportunities available in the aggregate across all available exchanges. Based on historical data and trends, the DSP may calculate and provide a daily estimate of a number of impression opportunities available across each of the exchanges. The DSP may provides an estimated number of impression opportunities for an exchange or aggregate of exchanges for any predetermined time period, such as impression opportunities expected for a week or month. Based on historical data and trends, the DSP may calculate and provide an estimated number of impression procurements over a predetermined time period for each of the exchanges and/or the aggregate of exchanges. Any of the estimated calculation of impression statistics, such as a daily impression calculation, may be published or posted via the user interface or may be queried via an API.

In some embodiments, the DSP calculates or determine a Daily Estimated Available Impressions for a campaign. The daily estimated available impressions is calculated to approximate the total pool of available number impressions, such as those available at the cost specified by a campaign. This may be based on the number of monthly unique users to the Advertiser Site. The Daily Estimated Available Impressions may be the total possible impressions, not the number of estimated impressions at the set price and frequency cap. The daily estimated available impressions may be calculated to approximate the total pool of available number impressions for the goal and constraints specified by the campaign.

Furthermore, the DSP may be configured to report information on operation and performance of the campaign across a plurality of exchanges to one or more Ad Servers identified by a user. As such, the execution of the campaign across exchanges may still be reported to a single identified Ad Server. This provides for a more efficient administrative and single interface point for reporting to an Ad Server the activity from a plurality of campaigns running through the DSP across a plurality of exchanges.

The DSP via the user interface may allow the user to setup campaigns, specify campaign goals and constraints. The DSP may support flighting, which comprises defining the goals and constraints via one or more flight configurations. A flight is period of time in which defined bid price, daily spend goal and frequency cap are defined. In some embodiments, to define a flight, the user enters an Advertiser IO Price. The Advertiser IO Price is the CPM (cost per impression, such as costs of advertising per thousand potential customers reached by a given advertisement) price agreement between your agency and your client advertiser for the remarketing portion of the campaign. This amount may be used to calculate the maximum bid allowed in the Bid Price. For the flight budget, the user may specify Price, Daily Spend and Frequency cap. Once a Bid Price is specified (the range of which is determined by the Advertiser IO Price specified), the Daily Estimated Available Impressions (At Cost) is calculated using a algorithm that approximates the total pool of available number impressions. This may be based on the number of monthly unique users to the Advertiser Site. The Daily Estimated Available Impressions may be the total possible impressions, not the number of estimated impressions at the set price and frequency cap. The user may specify a desired Daily Spend Goal which should be less than or equal to the Cost of the Daily Estimated Available Imps. Upon specifying a Daily Spend amount, the Flight Spend will be calculated by multiplying Daily Spend Goal by the number of days in the flight. The user may also set a Frequency Cap for the serving of ads. The user may have the option of choosing how often ads are served per number of Hours or Days. Also, the user may specify to have ads served ASAP or evenly throughout the chosen time measure. In some embodiments, the user may specify for the DSP to optimize Frequency Cap. In these embodiments, the DSP determines the frequency at which to increase the chances of meeting the flight spend goals (based on the bid price and daily spend goal). The Campaign Budget may be the sum of chosen Daily Spend of all flights in the campaign.

Figure 2J:
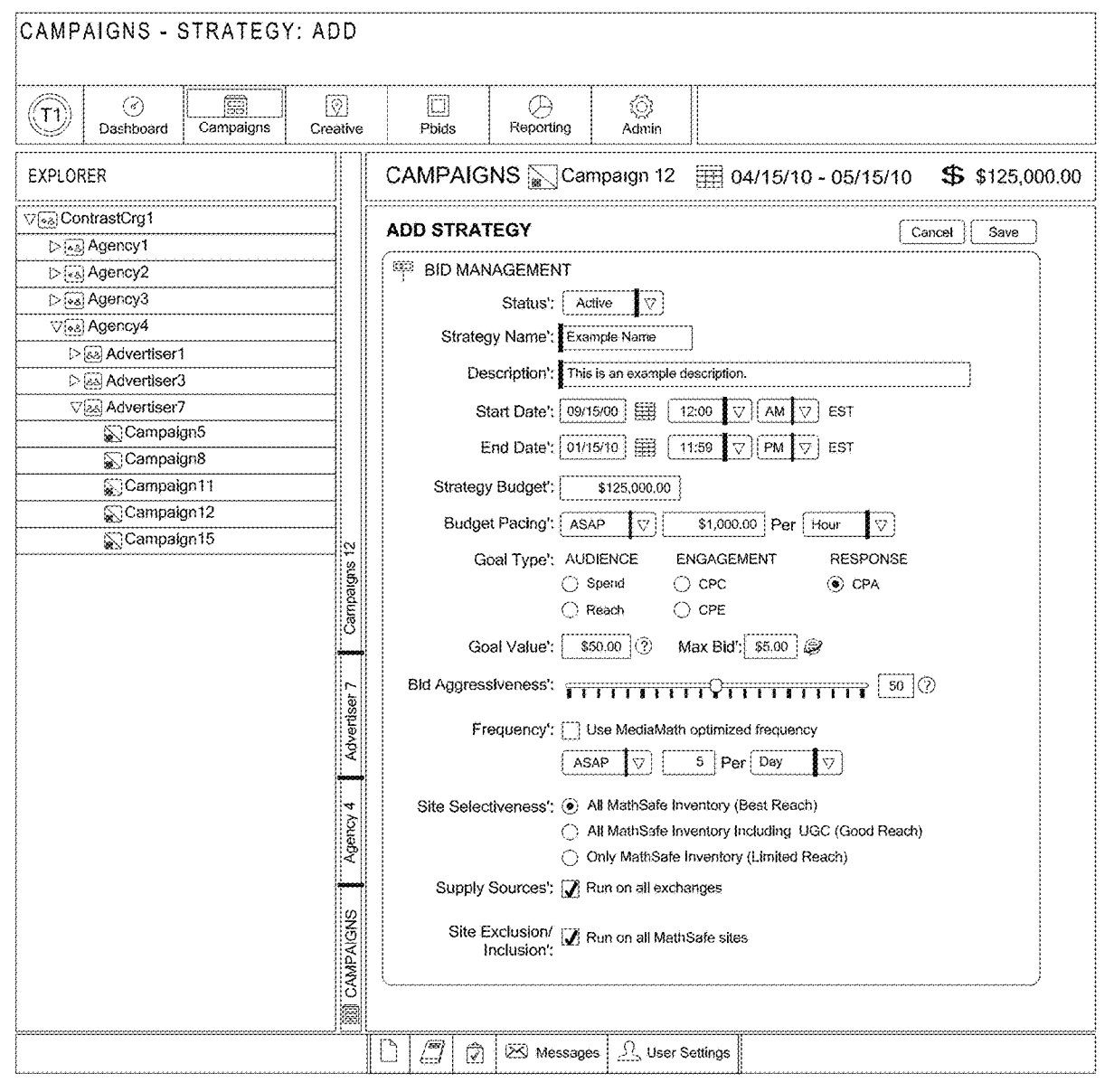

Referring now to FIG. 2J, an embodiment of a unified or common interface for setting up or establishing a campaign with goals and/or constraints to be executed across a plurality of exchanges is depicted. In brief overview, a user may add a campaign and strategy for the campaign via the user interface. The campaign strategy may define campaign goals and constraints for guiding, instructing or otherwise providing directives for bid management to the DSP and the bidder in executing the campaign. A user may specify a campaign strategy name, start and end dates and a budget in dollars for the campaign. The user may specify constraints in terms of budget pacing—how to spend the budget over a predetermined time period (e.g., spend per day). The user may specify a goal type based on audience, engagement or response. The user may specify a goal value for the specified goal type and a maximum bid. The user may specify a bid aggressiveness via a scale from less aggressive to more aggressive. The user may specify a frequency for the campaign such as how many placements per day and when those placements should occur. The user may specify the supply sources or exchanges to use for the campaign. The user may identify what type of sites to run or not run campaigns.

For a campaign, one or more goals may be specified by a user. The goals may include a total budget or spend for the campaign. A type of goal may be one of the following: audience, engagement or response. The audience goal type may be a focus on reaching a certain number or type of audience. For an audience goal type, the goal type may further include a spend or reach goal. A spend type of audience goal may be to spend a certain amount of dollars, such as to spend dollars more effectively when reaching an audience. A spend type of audience goal may be to reach a certain number and/or type of audience via the campaign at the expense of being less effective with campaign dollars. The engagement goal type may be based on the billing mechanism or revenue model for charging for an ad, such as cost per click (CPC) or cost per engagement (CPE) models for determined performance of your campaign. Engagement may be defined when a user response to the ad through the act of experiencing the features of the ad format. The response type goal may be based on a number of responses via the advertisement A response type goal may include a cost per acquisition (CPA), in which payment is based on leads generated for a site. Based on the goal type selected, the user may further specific a goal value and a maximum bid. The goal value and maximum bid may be based on the type of goal selected, for example, the value of a CPA goal may be the goal value and the advertisement is willing to spend a maximum bid per unit specified by the goal type.

The bid management of the campaign strategy may specify one or more constraints, which may include temporal constraints, frequency bidding constraints, and budget spend and per placement constraints. The bid management may include constraints on sites for placements and/or supply sources (e.g., exchanges) that may be used for bidding or placing ads. The user may specify a constraint of a budget pace in which a predetermined amount of dollars of the total budget may be spent on per hourly, daily, weekly or monthly basis and at certain time during the time period, such as soon as possible during the time period or spread evenly across the time period. The user may specify a constraint of a placement frequency or cap in which a predetermined amount of placements may be placed on a per hourly, daily, weekly or monthly basis and at certain time during the time period, such as soon as possible during the time period or spread evenly across the time period. The user may specify a constraint on which aggressive the bidder should be in placing bids for placement of an ad. The user may specify a constraint on any scale from being least aggressive to most aggressive. The user may specify a constraint of sites in which placements may occur, which may range from user selected sites to DSP selected sites and from less safe sites to more safe sites. The user may specify a constraint of exchanges in which placements may occur, such as only on user selected exchanges to all DSP supported exchanges.

Figure 2K:
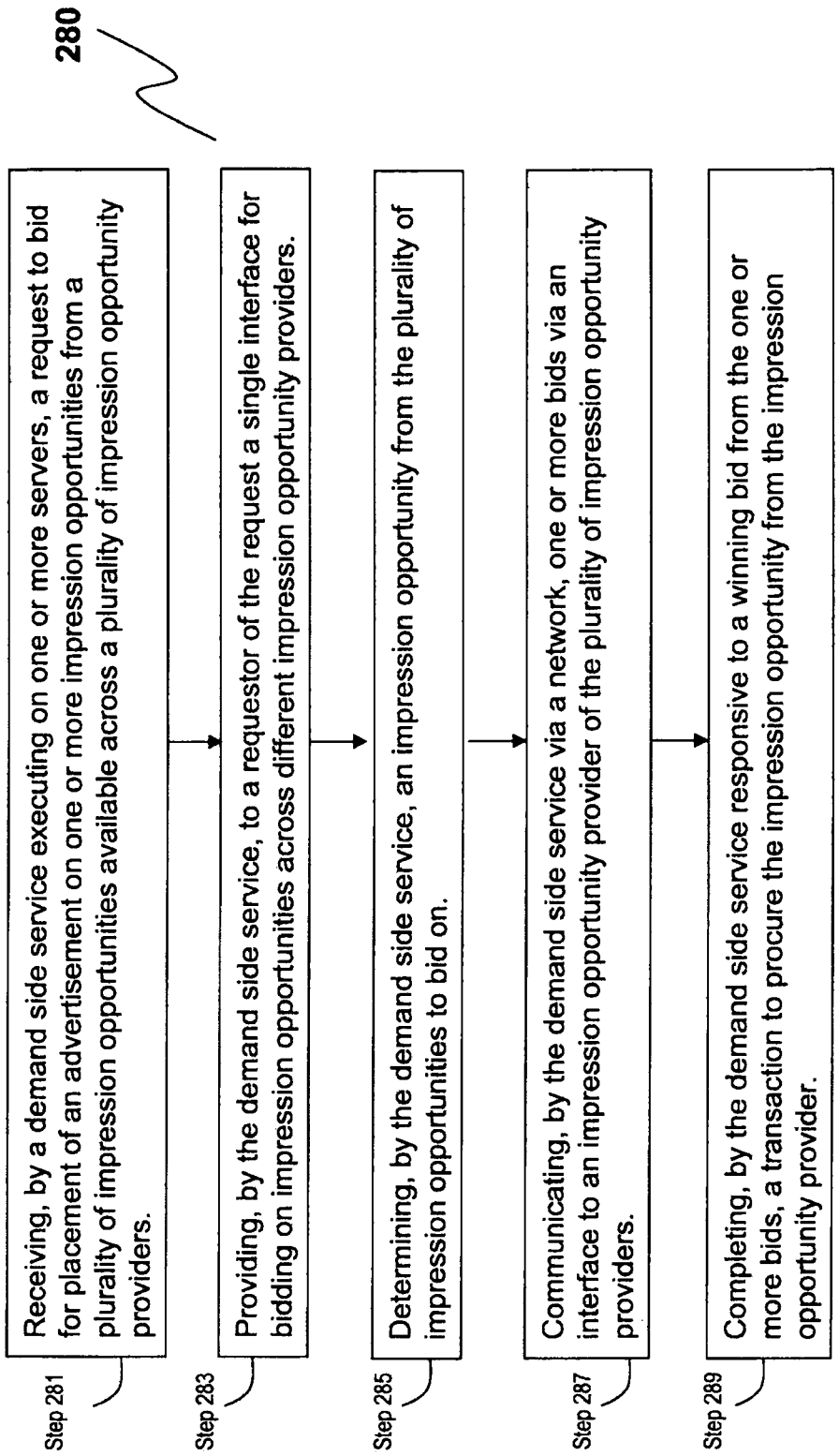
FIG. 2K is a flow diagram depicting an embodiment of a method for matching, by a demand side platform, an advertisement with an impression of a plurality of impressions available across a plurality of impression opportunity providers.

Referring now to FIG. 2K, a flow diagram depicts embodiments of steps taken in a method 280 for matching, by a demand side service, an advertisement with an impression of a plurality of impressions available across a plurality of impression opportunity providers. The method includes receiving, by a demand side service executing on one or more servers, a request to bid for placement of an advertisement on one or more impression opportunities from a plurality of impression opportunities available across a plurality of impression opportunity providers (281). The demand side service provides to a requestor of the request a single interface for bidding on impression opportunities across different impression opportunity providers (283). The demand side service determines an impression opportunity from the plurality of impression opportunities to bid on (285). The demand side service communicates, via a network, one or more bids via an interface to an impression opportunity provider of the plurality of impression opportunity providers (287). The demand side service completes a transaction to procure the impression opportunity from the impression opportunity provider responsive to a winning bid from the one or more bids (289).

Referring now to FIG. 2K, and in greater detail, the method includes receiving, by a demand side service executing on one or more servers, a request to bid for placement of an advertisement on one or more impression opportunities from a plurality of impression opportunities available across a plurality of impression opportunity providers (281). An advertiser or client may configure a bid, or request a bid for placement of an advertisement through the DSP. The advertiser or client may make a request for placement of an advertisement for an ad campaign. The advertiser or client may select or configure an ad campaign via the DSP user interface as described above in connection with FIGS. 2A-2C and 2J As discussed, the advertiser or client may provide one or more goals, constraints, ad pixels and/or ad tag creatives for populating, configuring and launching an ad campaign. Accordingly, the received request may include one or more goals for an ad campaign. The DSP may also receive the request including one or more constraints for placement of the advertisement or execution of the ad campaign The advertiser or client may, in some embodiments, send a request to configure or activate one or more flights for the ad campaign.

The DSP may provide access to impression opportunities from a plurality of impression opportunity providers such as ad exchanges. The advertiser or client may identify, select or place selection constraints on the DSP for selecting impression opportunity providers or placing bids with impression opportunity providers. The DSP may receive the request to bid for placement of an advertisement via an active ad campaign. The DSP may receive the request to bid for placement of an advertisement based on a pre-selected and/or configured flight.

The DSP may receive notification from one or more impression opportunity providers on the availability of one or more impression opportunities. In some embodiments, the DSP receives biddable request from an exchange. The DSP may process and/or convey the availability of the one or more impression opportunities to one or more ad campaigns, e.g., to solicit a request for a bid. In response to the availability of the one or more impression opportunities, a bidder on behalf of an ad campaign may request or issue a bid on at least one of the one or more impression opportunities. In some embodiments or situations, such as when available impression opportunities do not meet the constraint(s) and/or goal(s) of an ad campaign, the bidder may determine not to issue a request to bid. In certain embodiments, the DSP may receive more than one request to bid on an impression opportunity, for example, from multiple ad campaigns or advertisers. The bidder of the DSP may make a plurality of bids on an impression opportunity for a plurality of campaigns.

In further details of 283, the demand side service provides to a requestor of the request a common or unified interface referred to as a single interface for bidding on impression opportunities across multiple impression opportunity providers. The requestor may be an advertiser, client, ad campaign, flight, or a bidding engine operating on behalf of any of these entities. The DSP may provide an interface for configuring an ad campaign and one or more ad flights to access one or more impression opportunity providers. The DSP may provide an interface to an advertiser or client to receive or view any form or type of statistics, analytics, historical records, estimates and/or projections related to impression opportunities, bids and/or conversions. The DSP may provide any of these information via the interface to help an advertiser or client design or select an ad campaign. The DSP may provide any of these information via the interface to help the requestor make a particular bid, or execute a particular bidding strategy. The interface may incorporate any of the interface features described above in connection with FIGS. 2A-2C and 2J.

In some embodiments, the demand side service or DSP provides to a requestor of the request a single interface for bidding on impression opportunities across different data interfaces to the plurality of impression opportunity providers. The DSP may include one or more interfaces to the one or more impression opportunity providers. These interfaces may include one or more custom interfaces and incorporate any of the features described above in connection with FIGS. 2A-2D. In certain embodiments, some of these interfaces communicate with the respective providers using different protocols, standards, data format, and communication frequency (e.g., frequency of impression opportunity updates, bid submission, etc). The DSP may normalize the data received from each provider. The normalization process may incorporate any of the normalization features described above, such as in connection with FIGS. 2A-2G and method 250.

Referring now to 285, the demand side service determines an impression opportunity from the plurality of impression opportunities to bid on. The DSP may determine an impression opportunity to bid on via one or more of the following: a brain engine of the DSP, a bidding engine of the DSP, and an ad campaign. The DSP may determine an impression opportunity to bid on based on one or more of the following: an ad campaign, and the request for placement of the advertisement, historical records (e.g., prior success rate and client preferences). For example, the DSP may determine the impression opportunity to bid on based on a goal and/or constraint of an ad campaign. The DSP may determine an impression opportunity to bid on based on a goal and/or constraint specified by the request. Some of the various types of goals and constraints are described above in connection with FIGS. 2A-2F and 2J. For example, the DSP may select an impression opportunity from the plurality of impression opportunities based on demographics that may be exposed to the impression. The DSP may select an impression opportunity based on one or more of: a specified budget, spend rate, bid frequency, day part, week part, ad campaign progress, and number of available providers. The bidding engine may generate or provide bidding rules which correspond to the goals and/or constraints of a campaign and/or any flights of the campaign. The bidding engine may use these bidding rules in placing bids to exchanges.

The DSP may determine one or more impression opportunities to bid on based on an estimate of daily impression opportunities across the plurality of impression opportunity providers. An impression calculator of the DSP (e.g., residing in the bidding engine) may calculate, aggregate, estimate and/or project the number and types of daily impression opportunities across one or more impression opportunity providers. The DSP may determine whether to bid on an impression opportunity based on the provider of the impression opportunity, the frequency of availability of a type of impression, the total number of available impression opportunities, the type of impression opportunities (e.g., corresponding to a segment, channel, daypart, etc). In certain embodiments, the DSP may bid for an impression via different impression opportunities offered by different providers. The DSP may bid for an impression via one provider but not another provider, for example, based on constraints, historical data and/or client preferences configured in an ad campaign.

In further details of 287, the demand side service communicates one or more bids via an interface to an impression opportunity provider of the plurality of impression opportunity providers. The DSP or service may communicate a bid via a general or custom interface to one or more impression opportunity providers. The DSP may communicate the bid using any form or type of communication protocols. The protocols for communication may be standard, custom or proprietary. In some embodiments, the DSP communicates, via the interface, instructions for generating one or more bids to an intermediary. The intermediary may use the instructions to submit a bid on behalf of the DSP, e.g., in real time, or when an impression opportunity arises. The DSP may use any of the request and response parameters specified in FIGS. 2H and 2I corresponding to particular exchange.

The DSP may configure the communication or bid to address latency issues in the network(s). For example, the DSP may attempt to respond faster to an impression opportunity, compress the communication and/or direct the communication through preferred intermediaries to reduce communications latency. The DSP may address security and/or reliability issues when communicating a bid, for example, by using encryption, establishing a dedicated communications link and/or negotiating a preferred service level with a provider.

In certain embodiments, prior to submitting a bid, a bidding engine of the demand side service determines a price of a bid based on one or more bidding rules. The brain engine of the DSP may provide the one or more bidding rules to the bidding engine based on one or more of: a configuration of an ad campaign and flight. The brain engine of the DSP may generate and/or update the one or more bidding rules based on constraints and goals specified by the client or ad campaign. The brain engine of the DSP may generate and/or update the one or more bidding rules based on historical data, for example past successful bid prices and success rate. The brain engine of the DSP may generate and/or update the one or more bidding rules based on the spend rate, budget, and spending profile over one or more flights. In some embodiments, the bidding engine determines not to submit a bid to an impression opportunity based on any of the factors discussed above.

In some embodiments, the bidding engine matches a bid to a provider based on the impression opportunity selected for bidding. The bidding engine may match a bid to a specific interface provided for an impression opportunity provider, based on the impression opportunity selected for bidding. The bidding engine may direct a bid to an interface with the matching provider. In some embodiments, a routing agent of the DSP communicates a bid to the DSP interface of a matching provider.

A provider receiving a bid may respond to a bid, indicating whether the bid was successful. The provider may provide additional information about a failed bid, for example, the bid price of the winning bid. The provider may provide additional information about a winning bid, for example, transaction fees, the location of the impression relative to a webpage, and information about the layout of the webpage hosting the impression. The bidding engine may monitor the interface to each provider for a response to a submitted bid. The interface may convey the bid response to the bidding engine. In response to a failed bid, the brain engine may update the one or more rules provided to the bidding engine. The bidding engine may determine whether to submit another bid, if the target impression opportunity is not already won. The bidding engine may determine a new price for a follow-up bid to the same impression opportunity. The bidding engine may submit and monitor one or more bids through multiple providers for the same impression opportunity. The bidding engine may submit one or more successive bids for the same impression opportunity during an availability period for bidding. In some embodiment, a bidding engine may automatically and/or successively bid, starting from a floor price up to a ceiling price, in an attempt to get a winning bid.

Referring now to 289, the demand side service completes a transaction to procure the impression opportunity from the impression opportunity provider responsive to a winning bid from the one or more bids. The DSP may complete the transaction via the interface assigned to the impression opportunity provider. In some embodiments, the DSP may update the communications link or establish a new communications link with the provider to complete the transaction. For example, the DSP may establish a link to transmit payment information. The DSP may establish a link between an ad server and the provider (e.g., ad exchange) to deliver the advertisement. In certain embodiments, the DSP establishes a link between the ad server and the publisher to deliver the advertisement.

The DSP may automatically deliver an advertisement to the procured impression opportunity. In the request and response protocol with and/or interface to the exchange, the DSP may identify or provide information for the ad or the ad to the exchange for delivery or placement to the procured impression opportunity. The DSP may deliver a creative or identification of the creative (e.g., the advertisement) to the exchange for the procured impression opportunity. The DSP may deliver a pixel to the procured impression opportunity. The DSP may deliver an ad creative tag to the procured impression opportunity. The DSP may select one of a plurality of advertisements to the procured impression opportunity based on information received from the provider. For example, the DSP may select an advertisement based on the layout, style and/or color scheme of the webpage or site hosting or providing the impression. In some embodiments, the DSP directs the procured impression opportunity to access an ad server. The DSP may complete the transaction within a short timeframe to minimize latency for populating the impression with the advertisement. In certain embodiments, the DSP may provide an advertisement to a provider for local storage, prior to bidding. The provider may locally access the advertisement responsive to a winning bid.

C. Attribution of a Conversion to an Impression Opportunity

In another aspect, the present invention is related to methods and systems for attributing an user event to an impression opportunity. The impression opportunity may be procured through a DSP. The impression opportunity may be served and tracked via the DSP. The DSP may associate or track each impression opportunity with a creative tag. The DSP may associate or track each user event with an event tag. The DSP may associate or match an event tag with a creative tag based at least in part on proximity of an user event corresponding to the event tag to an availability of an impression opportunity corresponding to the creative tag. The DSP may attribute an user event to a viewing of an impression opportunity based on one or more event tags and creative tags. The DSP may attribute an user event to a click or other action to an impression opportunity based on one or more event tags and creative tags.

Attribution may be defined as a process to associate a conversion or user event to an impression opportunity or advertisement. A conversion or user event may be any event defined as a significant, desired and/or successful event as determined by an advertiser. A conversion or user event may include but is not limited to an order, a pre-order, a purchase, a registration, a newsletter sign-up, a credit card sign-up, a notification request, a request for more information, loading or saving an item into a user's shopping cart, responding to a survey, initiating an online or telephonic query to an operator, performing a price check, requesting and/or downloading informational material, and requesting and/or using a discount code or coupon. In some embodiments, events may be classified into different levels (e.g., of significance or importance). Pixels or tracking code may be used to track events and/or advertising activities. Accordingly, attribution may refer to a process to associate a pixeled conversion or user event to pixel activities (e.g., impression views, clicks, landing pages) from a campaign. Attribution may provide a mechanism for monitoring or determining campaign performance and/or for conducting analysis activities. Attribution may indicate causality between an advertisement and a purchase or other user event.

The systems and methods described herein can provide for various types of attribution, including post view attribution (PVA) and post click attribution (PCA). In some embodiments, PVA is the process of taking some or all event records and matching these event records by advertiser and unique user identifier (UUID) to impressions. In other words, an event record identifying an advertiser and a user can be matched with one or more impressions identifying the same advertiser and user. Event records spanning any period of time may be processed. In one embodiment, thirty (30) days of prior impressions (e.g., with respect to a user event) can be included in an attribution process. The process (e.g., performed by the brain engine) may identify matching event records corresponding to the same user and/or advertiser. In some embodiments, one event can be mapped to multiple impressions. The process may select the impression having a date-time stamp closest to and less than (e.g., occurs or stamped before) the event. Matched user events may be referred to as Post View (PV) Attributed Events. In some embodiments, the impression date-time is determined or subtracted from event date-time to yield a PV timelag. The attributed event may be logged in an event table (e.g., in the data warehouse) with the PV timelag. In certain embodiments, the attributed event may be logged in the event table without a PV timelag.

In some embodiments, PCA is a process of taking non-click PV Attributed Event records by advertiser and UUID, and matching these records to PV Attributed Events associated with a click. In some other embodiments, PCA is a process for taking some or all event records and matching these event records by advertiser and UUID to impressions accompanied by a click. A click may be a mouse-click or any other user action that triggers some response from an ad. A user action may comprise actuation of any input device or controller, such as a remote control, mouse, track ball, touch pad, touch screen, keyboard and joystick. Any time period, such as up to 30 days of prior click events, can be included in the attribution process. The process may identify record matches and may select the closest click event whose date time stamp is less than the event. This click event is sometimes referred to as a Post Click (PC) Attributed Event. The click event date-time may be subtracted from event date time to generate a PC timelag. Each attributed event may be logged in the event table with or without the PC timelag.

A conversion may be identified as a post view conversion. In one embodiment, a post view conversion is a campaign merit or success event that follows a user view of an impression within a defined period of time. An availability of the impression to a user may be considered a "user view"; the user may or may not have consciously or subconsciously viewed the impression advertisement. This period of time may be identified or defined at the campaign level. This period may set a window for which the DSP provider (e.g., MediaMath) or system can get 'credit' or be attributed for the conversion by facilitating the impression or advertisement.

In some embodiments, a conversion may be identified as a post click conversion. In certain embodiments, a post click conversion is a campaign merit or success event that follows a user click on an impression within a defined period of time. In at least some embodiments, click conversions are a subset of PV Conversions by definition as the user would have viewed the impression to click on it. This period of time may be identified at the campaign level. This period may define the window for which the DSP provider or system can assume 'credit' or be attributed for the conversion. The window for a post click may typically be longer than the window for post view. PV and PC conversions may be calculated and/or reported from the DSP system, independent of each other.

By way of illustration and not intended to be limiting, an attribution process may include any one or more of the following steps or stages: (i) process Event(s) to Impression(s) to calculate matches and PV timelag, (ii) process non-click Event(s) to click Event(s) to calculate matches and PC timelag, (iii) identify a 'Merit (event) Pixel' at the campaign level, (iii) identify the PC window and PV window for the 'Merit Pixel' at the campaign level, and (iv) where an Event Pixel identifier is matched with a Merit Event pixel identifier, PC and PV conversions may be counted within the respective windows.

Figure 3A:
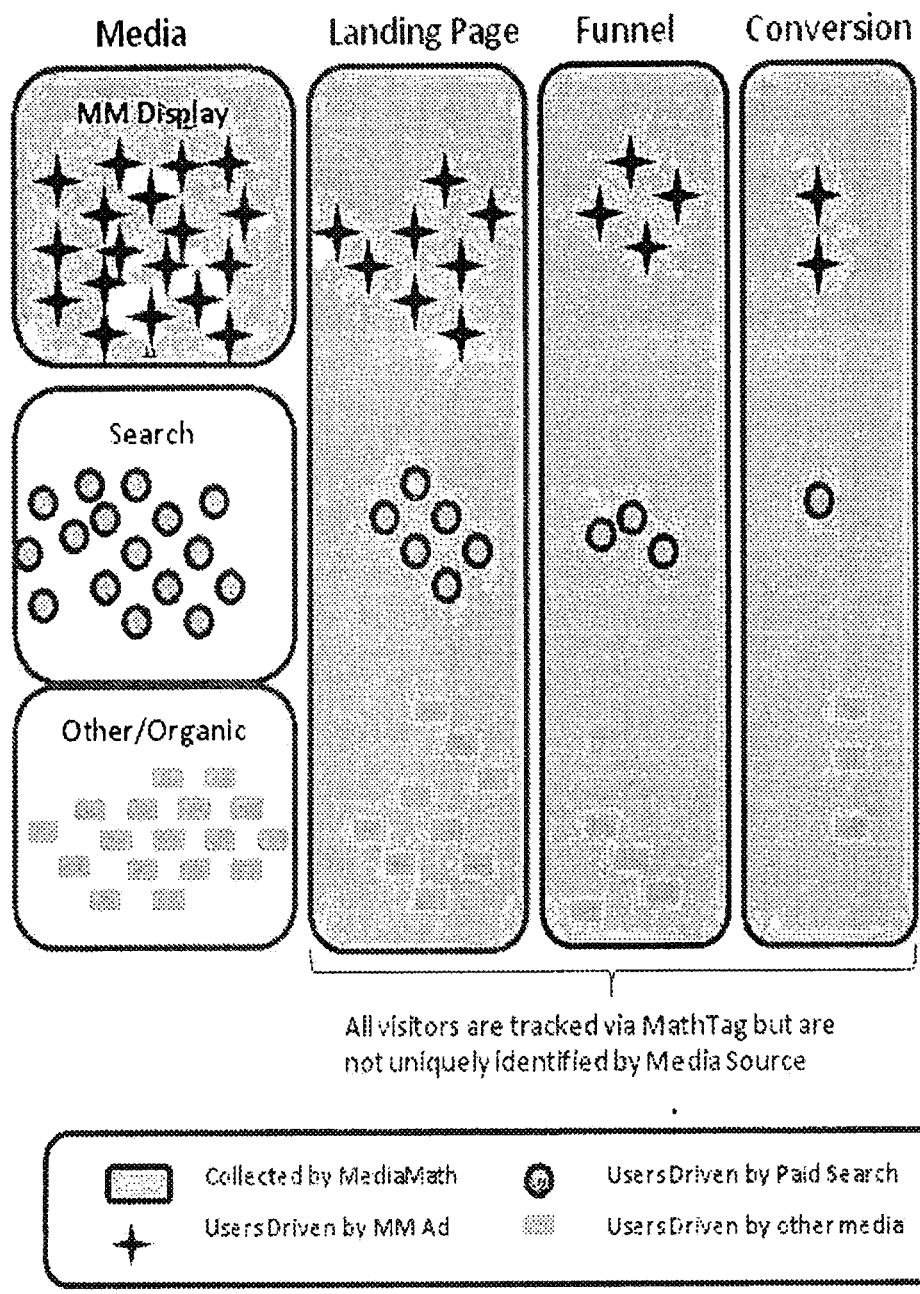
FIG. 3A is a block diagram depicting an embodiment of an attribution process.

Referring to FIG. 3A, a block diagram architectural overview of an attribution process is depicted. Various types of media may be categorized as display advertising, search-related, and others. These media categories may be associated with user actions resulting in, or progressing to a landing page, funnel, and/or conversion. In some embodiments, the goal of an attribution process includes accurately identifying which impression, landing page and funnel pages are associated on a one-to-one basis with a conversion. The brain engine may filter or remove non-DSP-generated events from the attribution process, e.g., to provide accurate attribution reports based on DSP-facilitated conversions. An advertiser using the DSP system can keep track of daily transactions by clients, ad campaigns, creatives, etc.

In some embodiments, pixels, tags, cookies or tracking code installed on an advertiser's site is activated and information (e.g., user information) is collected for some or all impressions (e.g., display events or search events). A PV window may be defined (e.g., a seven day period) for analysis by the attribution process. When a conversion transaction occurs for a UUID, the brain engine may scan the PV window for all impression events related to the UUID. The brain engine may then filter out impression events that are not associated with the corresponding advertiser identifier. In another embodiment, when a conversion transaction occurs for an advertiser, the brain engine may scan the PV window for all impression events related to the advertiser. The brain engine may then filter out impression events that are not associated with the corresponding UUID. In one embodiment, a non-filtered impression event most recent to the conversion may receive credit for the conversion (e.g., attributed to the conversion).

In some embodiments, creative tags (sometimes referred to as "creative MathTags") and/or (user event) event tags (sometimes referred to as "event MathTags") may be used in the attribution process. For example and in one embodiment, a creative MathTag may be, or provide at least some features of a pixel, cookie or tracking code. An event tag may be, or provide at least some features of an user event record. Thus, attribution may refer to a process of relating an event MathTag to a creative MathTag to link an impression seen by a user to an event completed by a user. An attribution window may refer to a time period during which an impression is served and during which an event can be attributed to the impression. In many campaigns, a post-view and post-click window can be defined (e.g., by the advertiser via the DSP interface).

The attribution process may include a number of rules and/or components. By way of illustration, each event MathTag or creative MathTag may be associated with a user. A user may be identified by a UUID which can be any type or form of identifier. For example, the UUID may be any alphanumeric string, such as 496ed7ef-0d3a-4aec-bf10-d45cfba39a9d. A user identified in the event MathTag data may be presented with one or more impressions (e.g., via the DSP). Each event MathTag or creative MathTag may have an associated timestamp. A user may see the one or more impressions before a user event occurs (e.g., Event Timestamp>impression Timestamp). A user may see one or more impressions after a user event occurs (Event Timestamp<impression Timestamp), which may or may not be significant. Each event MathTag or impression MathTag may be associated with an advertiser. A user may see one or more impressions from one or more advertisers. A user may perform an action (event) on one or more advertisers' websites. A timelag may refer to the difference between the event Timestamp and impression Timestamp. In some embodiments, a Timelag should be positive. After attribution, information about the impression can be attached to the attributed event's record. This information may be retrieved from creative MathTag fields associated with the impression and may be copied or processed into event MathTag fields associated with the event. Affected fields may include any one or more of, but is not limited to, source, campaign, creative_id, line_item_id, publisher_id, price and price_type.

In some embodiments, if a user sees an impression served via a DSP, a user event is attributed to the most recent impression presented before the user event. This aspect of the attribution may be illustrated, in an non-limiting embodiment, by the following pseudo code:

```
If
    Event Advertiser = IMP Advertiser AND
    Event User = IMP User AND
    Event Timestamp > IMP Timestamp
Then
    Event source = IMP source
    Event campaign = IMP campaign
    Event creative_id = IMP creative_id
    Event line_item_id = IMP line_item_id
    Event publisher_id = IMP publisher_id
    Event price = IMP price
    Event price_type = IMP price_type
    Timelag = Event Timestamp - IMP Timestamp (in seconds)
```

In some embodiments, attribution is a feature provided by an audience analysis module of the brain engine. The audience analysis module is sometimes referred to as an attribution module or component of the brain engine or DSP. Audience analysis, including attribution, may provide deeper insights into the user population exposed to online advertising. The goals of the audience analysis, including attribution, includes providing advertisers and interested parties with the ability to group audiences into segments based on intelligent analysis of available data in order to purchase media differently (bid or traditional buys) and/or provide advertiser insights acting as the agency advocate, for example. The audience analysis module may use MathTags to provide such user insights. For example, creative Math-Tags can be used to log geographic and other attributes for every exposure to a user. Event MathTags can be used to log attributes of a user performing an action on a client's advertising site. The DSP system may be configured to dynamically pass numeric and alphanumeric values via event MathTags and/or creative MathTags. In one embodiment, examples of dynamically-passed values includes Order Numbers, Cart Size and Revenue. DSP modules providing reporting and yield analysis features can access any of these Creative MathTag and event MathTag data for processing (e.g., client reporting and for decisioning).

MathTag values may be dynamically passed to the audience analysis module for processing. The audience analysis module may generate any type or form of data structure (e.g., table, lists, chart, database) that can be used for client reporting and for decisioning. For example and in one embodiment, an audience analysis table may be generated and maintained in the mm_reporting database. This table may include attribution data. In some embodiments, the output of an attribution process is directed into an audience analysis table.

In one embodiment, Table 1 shows MathTag fields that may be used in performing audience analysis. Table 1 also provides an example of valid dimension names and/or other field values. In another embodiment, these fields are the minimum required fields for audience analysis. In yet another embodiment, the shaded fields are the minimum required fields for audience analysis.

TABLE 1

Data Structure for audience analysis

| FIELD | DATA TYPE | NULLABLE | |
|---|---|---|---|
| interval | date | no | |
| source | char(3) | yes | |
| mm_advsym | char(4) | no | |
| mm_campaign | varchar(50) | yes | |
| mm_pixpgetyp | varchar(4) | no | |
| mm_pixshrtnme | varchar(50) | yes | (aka 'nm' in MathTag URI) |
| creative_id | int(11) | yes | (aka 'ci' in MathTag URI) |
| creative_name | varchar(255) | yes | |
| line_item_id | int(11) | yes | (aka 'li' in MathTag URI) |
| line_item_name | varchar(255) | yes | |
| publisher_id | int(11) | yes | (aka 'pi' in MathTag URI) |
| price | double | yes | (aka 'pe' in MathTag URI) |
| price_type | varchar(16) | yes | (aka 'pt' in MathTag URI) |
| browser | varchar(255) | yes | |
| timelag | varchar(255) | yes | |
| v0 | decimal(24) | yes | |
| v1 | decimal(24) | yes | |
| v2 | decimal(24) | yes | |
| s0 | varchar(50) | yes | |
| s1 | varchar(50) | yes | |
| s2 | varchar(50) | yes | |
| country | varchar(50) | yes | |
| region | varchar(50) | yes | (aka state) |
| city | varchar(50) | yes | |
| zipcode | varchar(9) | yes | |
| dma | varchar(16) | yes | |
| area code | varchar(50) | yes | |
| isp | varchar(50) | yes | |
| netspeed | varchar(50) | yes | |
| mt_count* | bigint(20) | default (0) | for mm_pixpgetyp = 'imp', count of cMTs for the key<br>for mm_pixpgetyp <> 'imp', count of eMTs for the key |

In some embodiments, the shaded fields in Table 2 are part of a primary key. Audience analysis data may be generated, presented or summarized for the primary key. In certain embodiments, granularity at the UUID level may not be needed for presenting audience analysis data. The asterixed field(s), e.g., mt_count, may refer to metrics. The other fields (e.g., non-shaded), may include user level data and/or dimension fields. In one illustrative embodiment, the audience analysis module receives, from application and data sources, six dynamic MathTag values, three numeric values (v0, v1, v2) and three string values 16 characters in length (s0, s1, s2). Passed values s0, s1 and s2 may be treated as dimensions. Passed values v0, v1, and v2 may be treated as metrics that can be aggregated. If the v0, v1, and v2 values cannot be aggregated or summed, the DSP may change the tag implementation and pass the values as s0, s1 or s2.

The audience analysis module or data structure may receive any type or form of data from creative MathTags. For each creative MathTag record, the values for audience analysis may be subject to the following illustrative rules:
the "primary key" fields are populated from creative MathTag log values
mm_pixpgetyp='imp'
timelag=NULL
v0=NULL
v1=NULL
v2=NULL
mt_count=NULL In some embodiments, for each unique primary key, the audience analysis module may insert a creative MathTag record in the audience analysis data structure with the following illustrative dimension and metric values:
dimension_name=NULL
dimension_value=NULL
mt_count=[COUNT OF cMTs FOR THE PRIMARY KEY]

In some embodiments, for each unique combination of primary key, dimension name and dimension value, the audience analysis module may insert a creative MathTag record in the audience analysis data structure with the following illustrative dimension and metric values:
dimension_name=[DIMENSION_NAME]
dimension_value=[DIMENSION_VALUE]
mt_count=[COUNT OF cMTs FOR THE COMBO OF PRIMARY KEY, DIMENSION NAME, DIMENSION VALUE]

In some embodiments, the audience analysis module may populate the audience analysis data structure with event MathTags. For each event MathTag record, the values for audience analysis may be subject to the following illustrative rules:
the eMT "primary key" fields may be populated from the attributed event MathTags log values
mm_pixpgetyp=[PIXEL PAGE TYPE] **may be treated as part of the primary key
timelag=[ATTRIBUTION TIMELAG] **may be treated as part of the primary key
mt_count=NULL In some embodiments, for each unique primary key, the audience analysis module may insert an event MathTag record in the audience analysis data structure with the following illustrative dimension and metric values:
dimension_name=NULL
dimension_value=NULL
v0=[SUM OF PASSED VALUES v0 FOR THE PRIMARY KEY]
v1=[SUM OF PASSED VALUES v0 FOR THE PRIMARY KEY]
v2=[SUM OF PASSED VALUES v0 FOR THE PRIMARY KEY]
mt_count=[COUNT OF eMTs FOR THE PRIMARY KEY]

In some embodiments, for each unique combination of primary key, dimension name and dimension value, the audience analysis module may insert an event MathTag record in the audience analysis data structure with the following illustrative dimension and metric values:
dimension_name=[DIMENSION_NAME]
dimension_value=[DIMENSION_VALUE]
v0=[SUM OF PASSED VALUES v0 FOR THE COMBO OF PRIMARY KEY, DIMENSION NAME, DIMENSION VALUE]
v1=[SUM OF PASSED VALUES v0 FOR THE COMBO OF PRIMARY KEY, DIMENSION NAME, DIMENSION VALUE]
v2=[SUM OF PASSED VALUES v0 FOR THE COMBO OF PRIMARY KEY, DIMENSION NAME, DIMENSION VALUE]
mt_count=[COUNT OF eMTs FOR THE COMBO OF PRIMARY KEY, DIMENSION NAME, DIMENSION VALUE]

In some embodiments, Table 2 provides an example of an embodiment of records for audience analysis

TABLE 2

Example of Records for audience analysis

| interval | source | mm_advsym | mm_campaign | mm_pixpgetyp | mm_pixshrtnme | creative_id | creative_name |
|---|---|---|---|---|---|---|---|
| Aug. 18, 2008 | RMX | PROA | C1_RMX | IMP | NULL | 123 | R,!PROA,!C108_RMX,!R.. |
| Aug. 18, 2008 | RMX | PROA | C1_RMX | IMP | NULL | 8950 | R,!PROA,!C108_RMX,!R.. |
| Aug. 18, 2008 | RMX | PROA | C1_RMX | MRT | TY | 123 | R,!PROA,!C108_RMX,!R.. |
| Aug. 18, 2008 | RMX | PROA | C1_RMX | MRT | TY | 123 | R,!PROA,!C108_RMX,!R.. |
| Aug. 18, 2008 | RMX | PROA | C1_RMX | MRT | TY | 123 | R,!PROA,!C108_RMX,!R.. |
| Aug. 18, 2008 | RMX | PROA | C1_RMX | MRT | TY | 123 | R,!PROA,!C108_RMX,!R.. |
| Aug. 18, 2008 | RMX | PROA | C1_RMX | LPG | PROA-HP | 8950 | R,!PROA,!C108_RMX,!R.. |
| Aug. 18, 2008 | RMX | PROA | C1_RMX | IMP | NULL | 123 | R,!PROA,!C108_RMX,!R.. |
| Aug. 18, 2008 | RMX | PROA | C1_RMX | IMP | NULL | 8950 | R,!PROA,!C108_RMX,!R.. |
| Aug. 18, 2008 | RMX | PROA | C1_RMX | MRT | TY | 123 | R,!PROA,!C108_RMX,!R.. |
| Aug. 18, 2008 | RMX | PROA | C1_RMX | MRT | TY | 123 | R,!PROA,!C108_RMX,!R.. |
| Aug. 18, 2008 | RMX | PROA | C1_RMX | MRT | TY | 123 | R,!PROA,!C108_RMX,!R.. |
| Aug. 18, 2008 | RMX | PROA | C1_RMX | MRT | TY | 123 | R,!PROA,!C108_RMX,!R.. |
| Aug. 18, 2008 | RMX | PROA | C1_RMX | LPG | PROA-HP | 8950 | R,!PROA,!C108_RMX,!R.. |
| Aug. 19, 2008 | RMX | PROA | C1_RMX | MRT | TY | 123 | R,!PROA,!C108_RMX,!R.. |
| Aug. 19, 2008 | RMX | PROA | C1_RMX | MRT | TY | 123 | R,!PROA,!C108_RMX,!R.. |

TABLE 2-continued

Example of Records for audience analysis

| | | | | | | | |
|---|---|---|---|---|---|---|---|
| Aug. 19, 2008 | RMX | PROA | C1_RMX | MRT | TY | 123 | R,!PROA,!C108_RMX,!R.. |
| Aug. 19, 2008 | RMX | PROA | C1_RMX | MRT | TY | 123 | R,!PROA,!C108_RMX,!R.. |
| Aug. 19, 2008 | RMX | PROA | C1_RMX | LPG | PROA-HP | 123 | R,!PROA,!C108_RMX,!R.. |
| Aug. 19, 2008 | RMX | PROA | C1_RMX | LPG | PROA-HP | 123 | R,!PROA,!C108_RMX,!R.. |
| Aug. 19, 2008 | RMX | PROA | C1_RMX | LPG | PROA-HP | 8950 | R,!PROA,!C108_RMX,!R.. |
| Aug. 19, 2008 | RMX | PROA | C1_RMX | LPG | PROA-HP | 123 | R,!PROA,!C108_RMX,!R.. |
| Aug. 19, 2008 | RMX | PROA | C1_RMX | LPG | PROA-HP | 123 | R,!PROA,!C108_RMX,!R.. |
| Aug. 19, 2008 | RMX | PROA | C1_RMX | LPG | PROA-HP | 8950 | R,!PROA,!C108_RMX,!R.. |

| interval | lineitem_id | lineitem_name | publisher_id | timelag | dimension_name |
|---|---|---|---|---|---|
| Aug. 18, 2008 | 1234 | PROA,!GRC,!C108 RMX,! | null | NULL | NULL |
| Aug. 18, 2008 | 1234 | PROA,!GRC,!C108 RMX,! | null | NULL | NULL |
| Aug. 18, 2008 | 1234 | PROA,!GRC,!C108 RMX,! | null | 60 | NULL |
| Aug. 18, 2008 | 1234 | PROA,!GRC,!C108 RMX,! | null | 60 | NULL |
| Aug. 18, 2008 | 1234 | PROA,!GRC,!C108 RMX,! | null | 120 | NULL |
| Aug. 18, 2008 | 1234 | PROA,!GRC,!C108 RMX,! | null | 65 | NULL |
| Aug. 18, 2008 | 1234 | PROA,!GRC,!C108 RMX,! | 123 | 60 | NULL |
| Aug. 18, 2008 | 1234 | PROA,!GRC,!C108 RMX,! | null | NULL | ISP |
| Aug. 18, 2008 | 1234 | PROA,!GRC,!C108 RMX,! | null | NULL | ISP |
| Aug. 18, 2008 | 1234 | PROA,!GRC,!C108 RMX,! | null | 5 | State |
| Aug. 18, 2008 | 1234 | PROA,!GRC,!C108 RMX,! | null | 60 | State |
| Aug. 18, 2008 | 1234 | PROA,!GRC,!C108 RMX,! | null | 60 | State |
| Aug. 18, 2008 | 1234 | PROA,!GRC,!C108 RMX,! | null | 60 | State |
| Aug. 18, 2008 | 1234 | PROA,!GRC,!C108 RMX,! | 456 | 60 | ISP |
| Aug. 19, 2008 | 1234 | PROA,!GRC,!C108 RMX,! | null | 60 | s0 |
| Aug. 19, 2008 | 1234 | PROA,!GRC,!C108 RMX,! | null | 60 | s0 |
| Aug. 19, 2008 | 1234 | PROA,!GRC,!C108 RMX,! | null | 120 | s0 |
| Aug. 19, 2008 | 1234 | PROA,!GRC,!C108 RMX,! | null | 65 | s0 |
| Aug. 19, 2008 | 1234 | PROA,!GRC,!C108 RMX,! | null | 60 | s0 |
| Aug. 19, 2008 | 1234 | PROA,!GRC,!C108 RMX,! | null | 60 | s1 |
| Aug. 19, 2008 | 1234 | PROA,!GRC,!C108 RMX,! | null | 30 | s1 |
| Aug. 19, 2008 | 1234 | PROA,!GRC,!C108 RMX,! | null | 5 | s1 |
| Aug. 19, 2008 | 1234 | PROA,!GRC,!C108 RMX,! | null | 60 | s1 |
| Aug. 19, 2008 | 1234 | PROA,!GRC,!C108 RMX,! | null | 60 | s1 |

| interval | dimension_value | v0 | v1 | v2 | mt_count |
|---|---|---|---|---|---|
| Aug. 18, 2008 | NULL | NULL | null | null | 868904 |
| Aug. 18, 2008 | NULL | NULL | null | null | 98562 |
| Aug. 18, 2008 | NULL | 25.96 | null | null | 1 |
| Aug. 18, 2008 | NULL | 57.69 | null | null | 1 |
| Aug. 18, 2008 | NULL | 23.96 | null | null | 1 |
| Aug. 18, 2008 | NULL | 97.96 | null | null | 1 |
| Aug. 18, 2008 | NULL | 65.56 | null | null | 1 |
| Aug. 18, 2008 | TWC | NULL | null | null | 134945 |
| Aug. 18, 2008 | PacBell | NULL | null | null | 1000 |
| Aug. 18, 2008 | NY | 25.96 | null | null | 1 |
| Aug. 18, 2008 | NY | 57.69 | null | null | 1 |
| Aug. 18, 2008 | NE | 23.96 | null | null | 1 |
| Aug. 18, 2008 | CA | 97.96 | null | null | 6 |
| Aug. 18, 2008 | Comcast | 65.56 | null | null | 3 |
| Aug. 19, 2008 | EAO2153 | 29.99 | null | null | 1 |
| Aug. 19, 2008 | EAO21459 | 24.99 | null | null | 1 |

TABLE 2-continued

Example of Records for audience analysis

| | | | | | |
|---|---|---|---|---|---|
| Aug. 19, 2008 | EAO8733 | 19.99 | null | null | 1 |
| Aug. 19, 2008 | EAO8793 | 12 | null | null | 1 |
| Aug. 19, 2008 | EAO9475 | 9.99 | null | null | 1 |
| Aug. 19, 2008 | NY | 8965.55 | null | null | 32 |
| Aug. 19, 2008 | NY | 489.65 | null | null | 8 |
| Aug. 19, 2008 | CA | 4567.71 | null | null | 25 |
| Aug. 19, 2008 | NY | 24.99 | null | null | 1 |
| Aug. 19, 2008 | TX | 1600.23 | null | null | 1 |

In some embodiments, the fields creative_name and lineitem_name in the audience analysis data structure may be populated from ad exchange source tables (e.g., rmx_pixel_daily and adx_table_1) via the DSP reporting interfaces and/or databases (e.g., mm_reporting database). In certain embodiments, the fields line_item_id and creative_id in audience_analysis are respectively matched with creative_id and lineitem_id fields in ad exchange source tables. In some embodiments, a mt_passed_values_reference table in the mm_reporting database may be generated or maintained to store the definitions or meanings of the value ids (v0, s0, etc.) for each campaign. Table 3 shows an example of one embodiment of a mt_passed_values_reference data structure. Table 4 shows an example of one embodiment of records for a mt_passed_values_reference data structure.

TABLE 3

Data Structure for mt_passed_values_reference

| FIELD | DATA TYPE | NULLABLE |
|---|---|---|
| mm_advsym | varchar(4) | no |
| mm_campaign | varchar(16) | yes |
| type | varchar(2) | no |
| reference | varchar(255) | no |

TABLE 4

Example Records for mt_passed_values_reference

| mm_advsym | mm_campaign | type | reference |
|---|---|---|---|
| AXPG | Aug-GftCrd | v0 | Cart Size |
| AXPG | Aug-GftCrd | v1 | Cart Value |
| AXPG | Aug-GftCrd | v2 | null |
| AXPG | Aug-GftCrd | s0 | Order Number |
| AXPG | Aug-GftCrd | s1 | State |
| AXPG | Aug-GftCrd | s2 | ISP |

In some embodiments, MathTags are structured to reference identifiers of certain information so a lookup based on identifiers may be required to fulfill reporting needs. In some embodiments, the audience analysis module can respond to any ad hoc or schedule queries. For ad hoc queries, the audience analysis module may be configured to respond within a set period of time, e.g., 15 minutes. Audience analysis data may be periodically generated. e.g., audience analysis data for the prior day may be available at daily intervals by 12:00 pm.

Figure 3B:
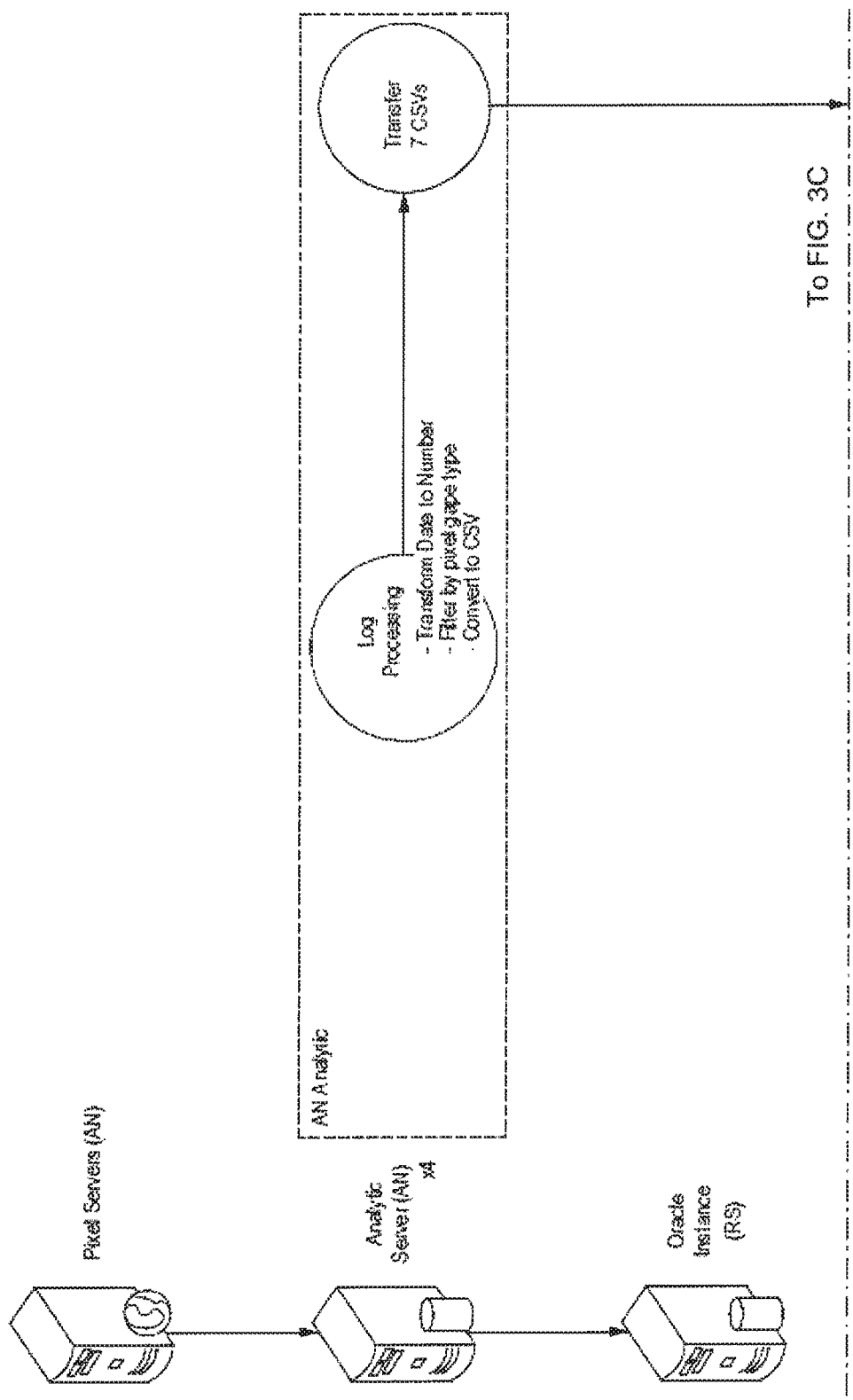
FIG. 3B-3D are block diagrams depicting an embodiment of a system and method for attribution processing.
Figure 3C:
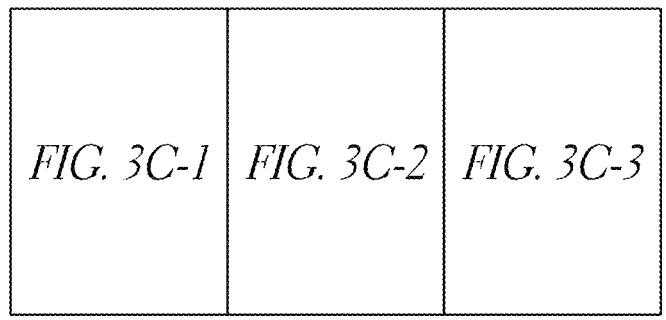
Figures 1, 3C:
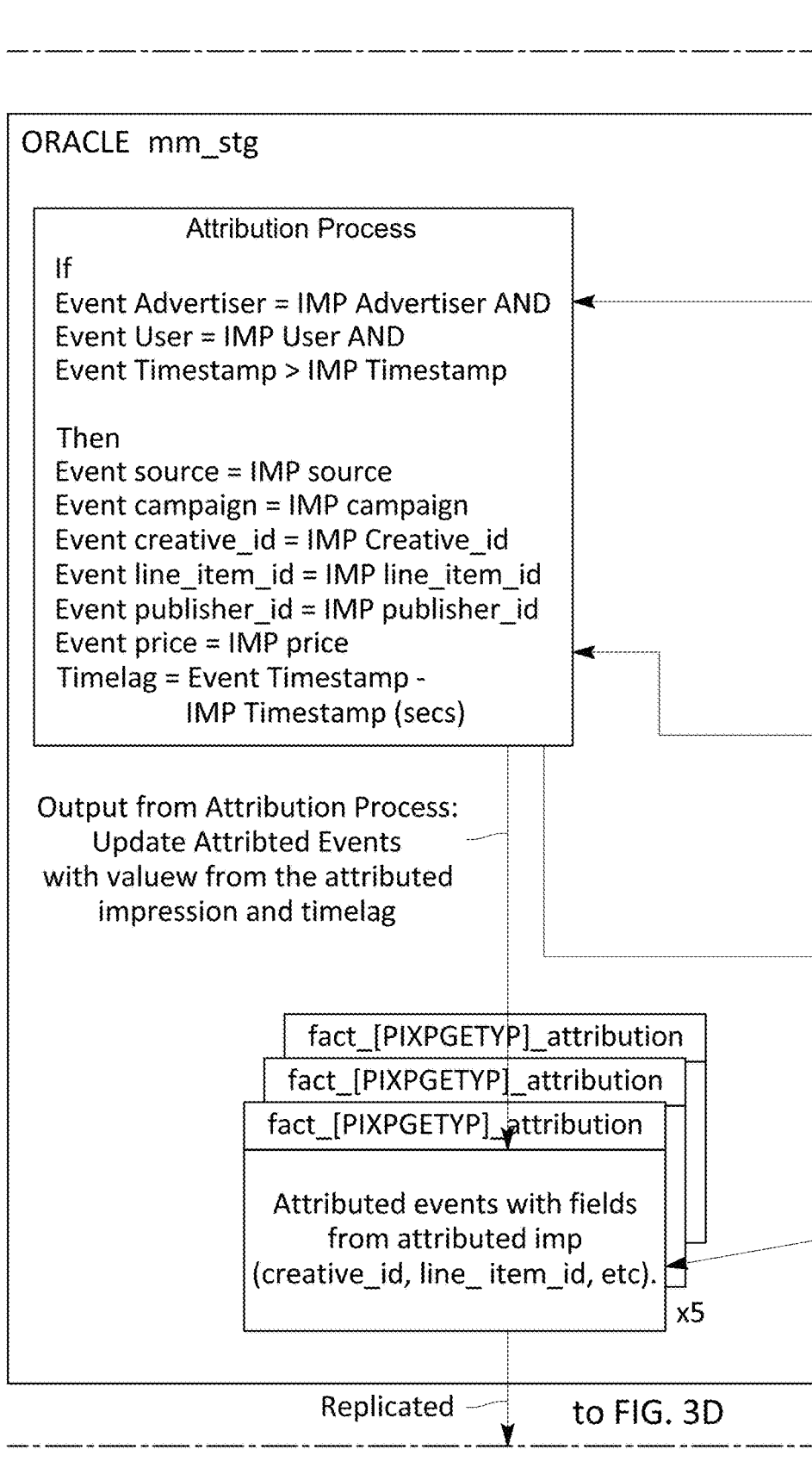
Figures 2, 3C:
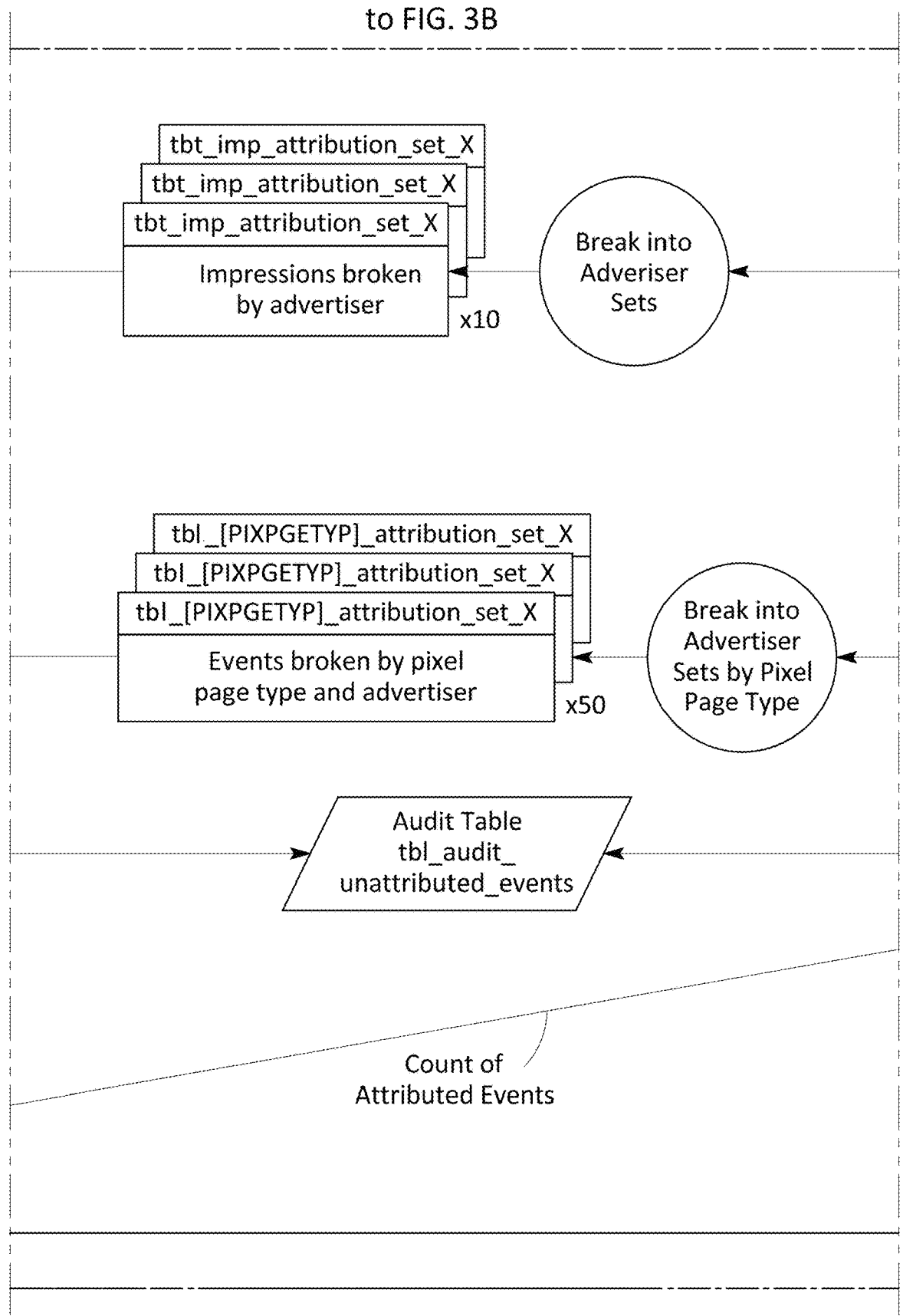
Figures 3, 3C:
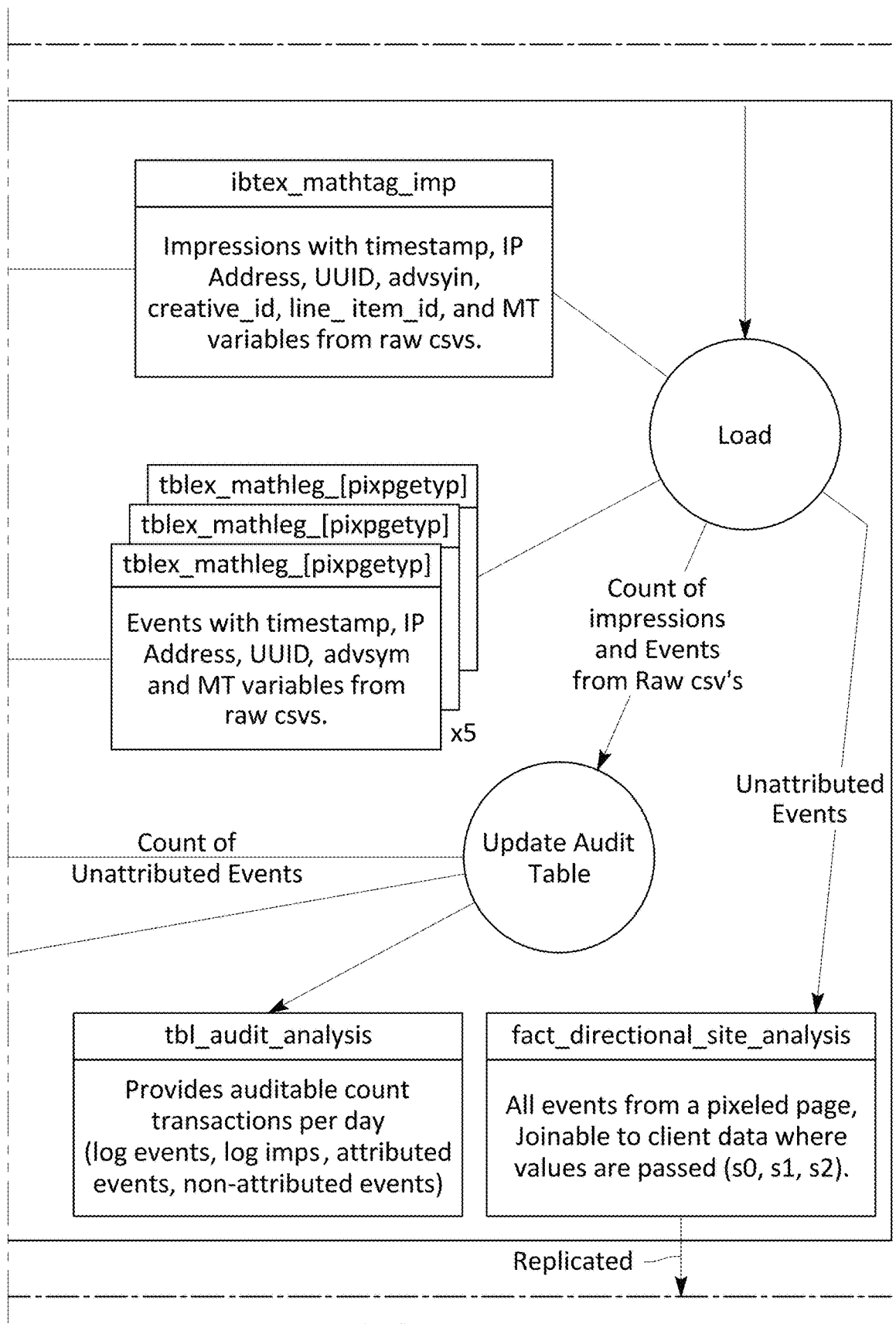
Figure 3D:
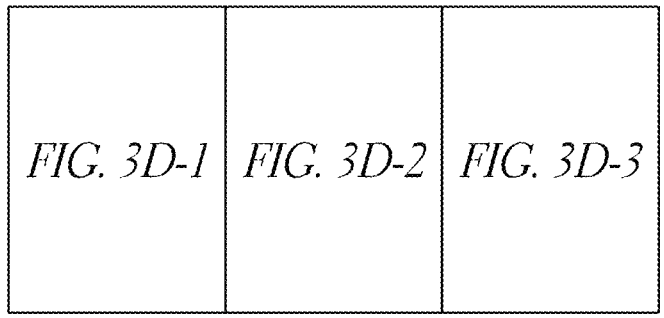
Figures 1, 3D:
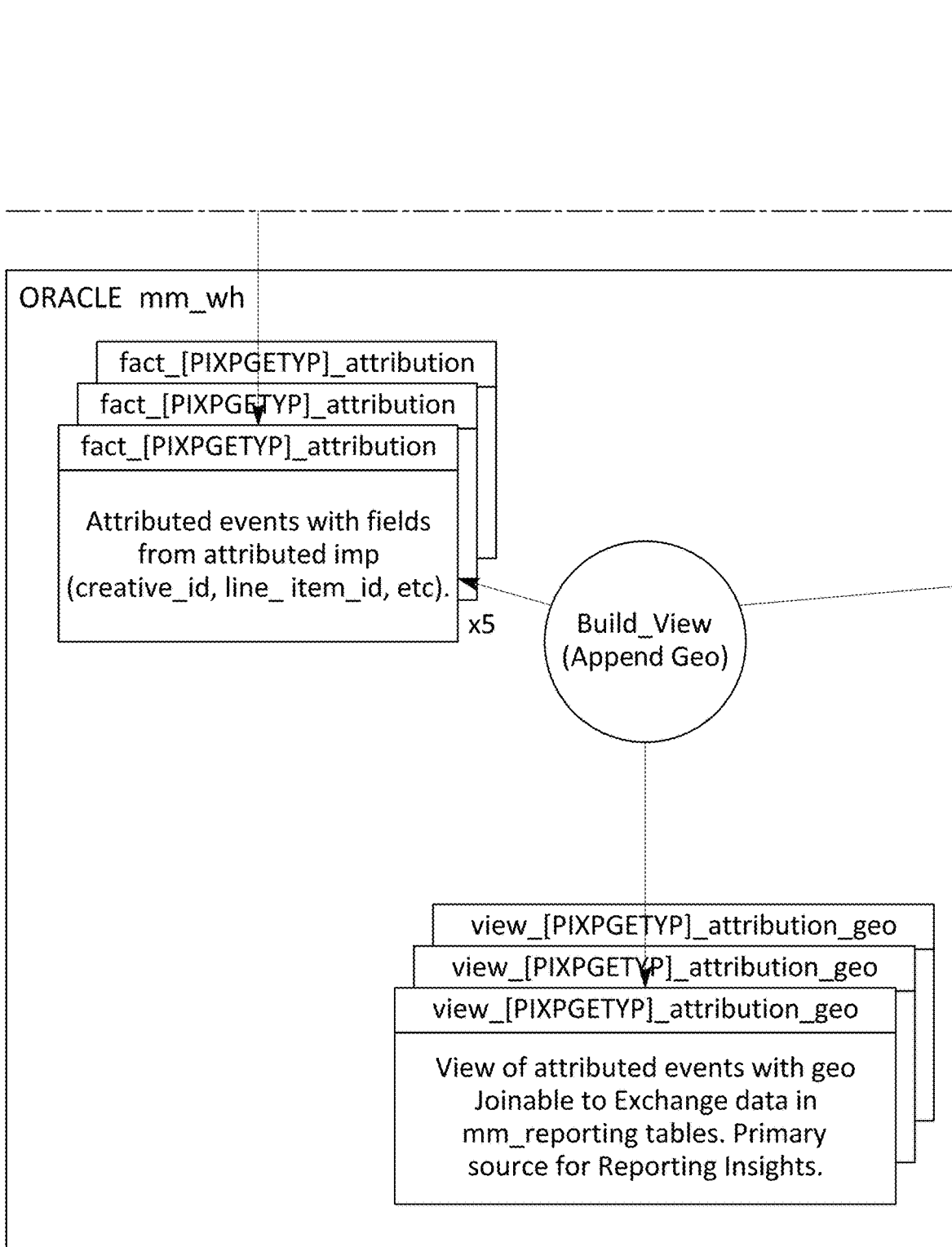
Figures 2, 3D:
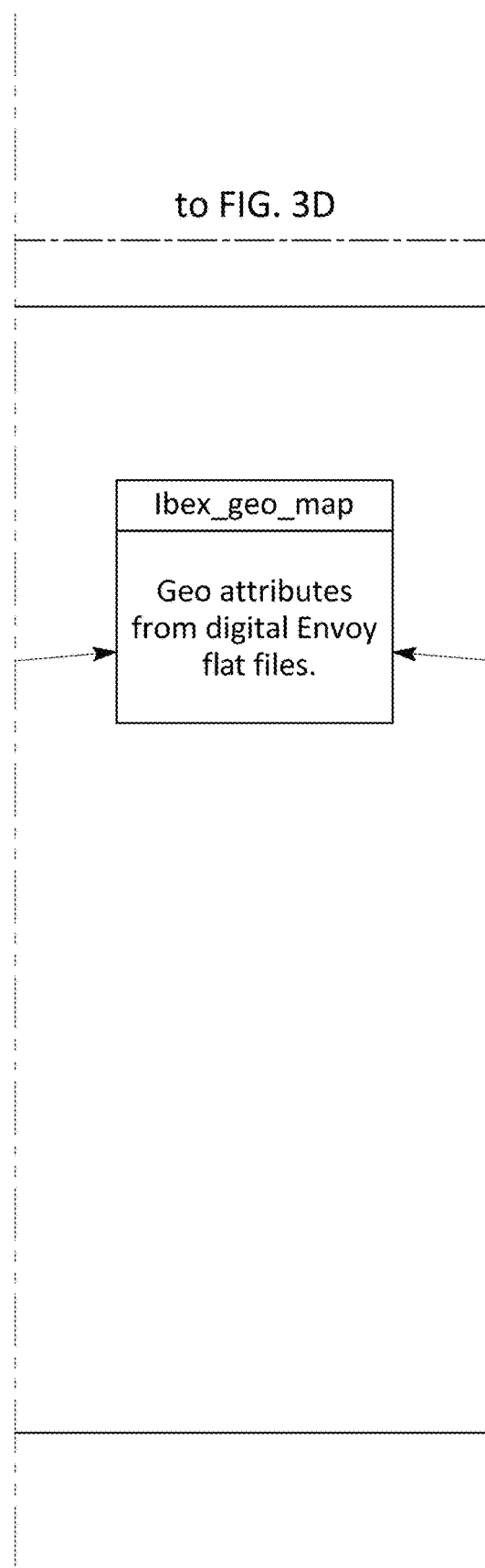
Figures 3, 3D:
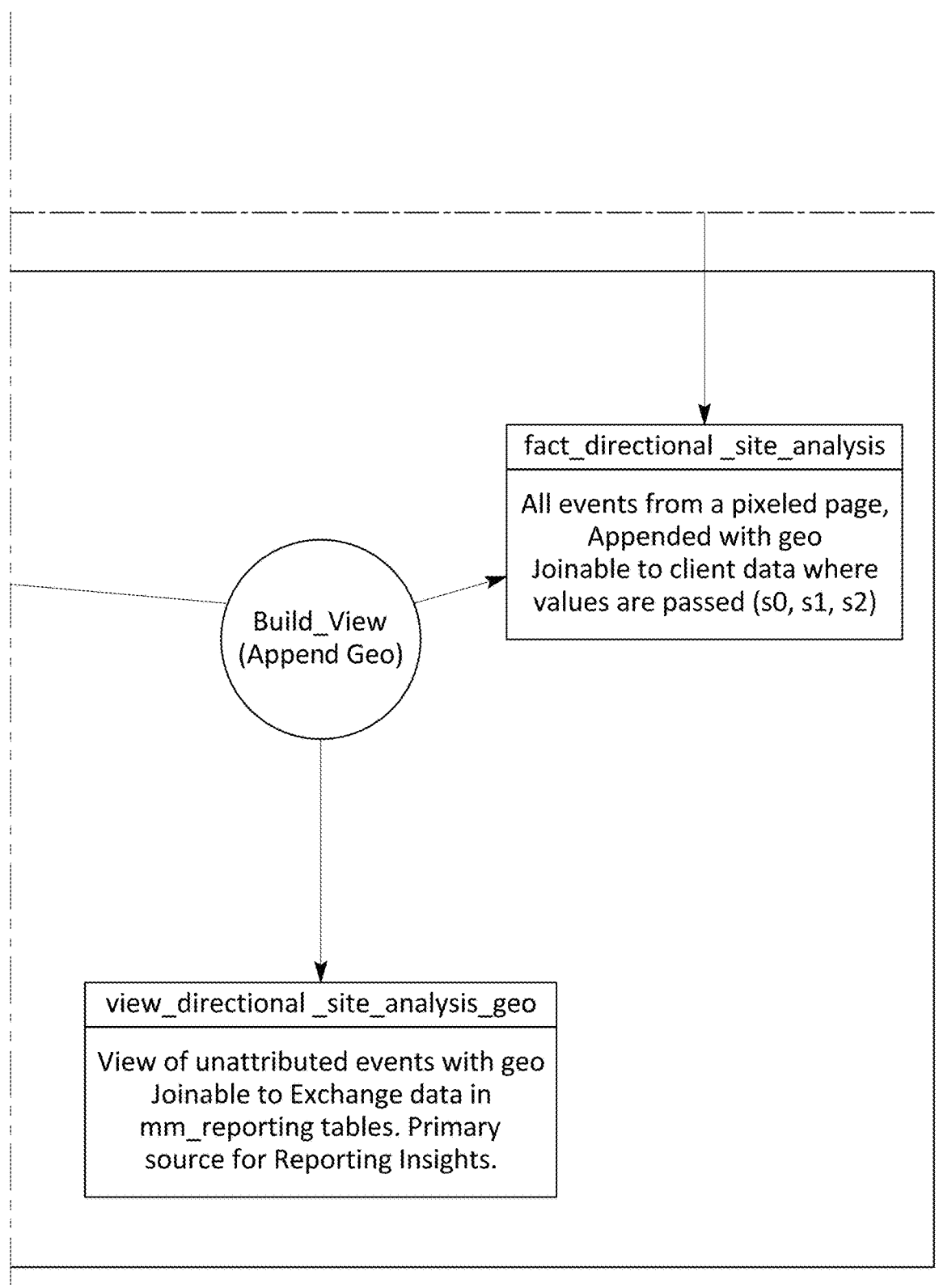
Figure 3E:
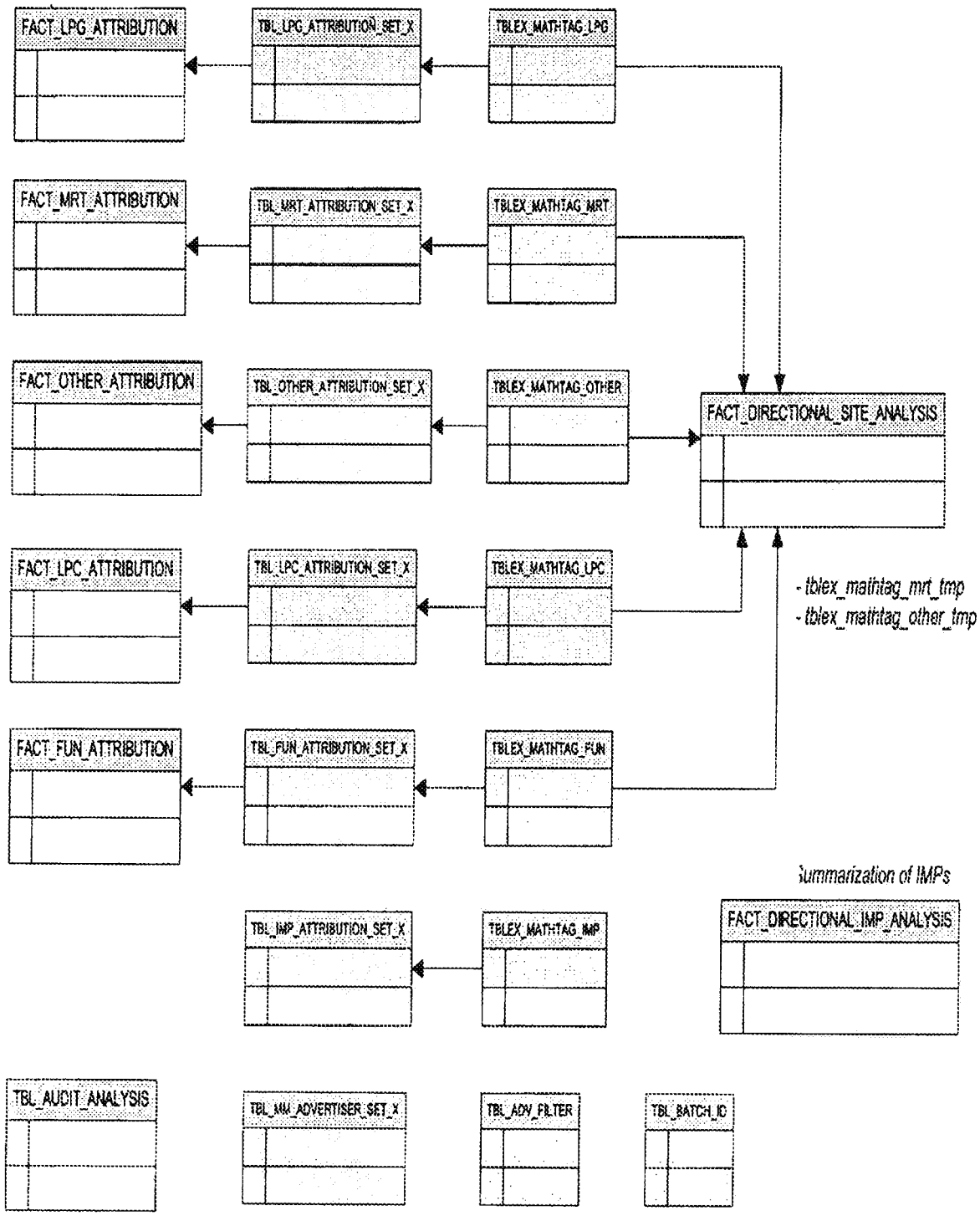
FIG. 3E is a block diagram depicting one embodiment of fact tables generated by an attribution process.

In some embodiments, at least part of the attribution process is performed by a database management and/or processing module, portions of which may be operating with the brain engine and/or residing in the brain engine. In some embodiments, functionality for the database management and/or processing module is provided by or configured from hardware and/or software provided by Oracle Systems. The database management and/or processing module may sometimes be referred to as oracle module. FIGS. 3B-3D show one embodiment of systems and methods for communicating MathTag data from log files to the oracle module for attribution processing. The oracle module may generate output fact tables which may include or be used to generate attribution reports. FIG. 3E shows one embodiment of fact tables generated by the attribution process.

The oracle module can receive MathTag data via any way, for example, via spreadsheet formats or data structures. In one illustrative embodiment, the DSP system parses MathTag log files into .csv format. These .csv files can be imported into the attribution process. In one embodiment, the DSP system generates one or more .csv files per day. The DSP system may create one or more .csv files for each pixel page type (e.g., mm_pixpgetyp). The DSP system may name the csv file in a certain convention for processing, e.g., mathtag_[pixgetyp].csv. Table 5 shows one embodiment of a parsed MathTag log file data structure in csv format. The data structure may include geo attributes for use in the attribution process. The geo attributes may be appended to each MathTag record based on IP address, for example. Table 6 shows one embodiment of valid mm_pixpgetyp values and filenames.

TABLE 5

Parsed MathTag Log File Structure (csv)

| FIELD | DATA TYPE | NULLABLE |
|---|---|---|
| timestamp | int(11) | no |
| ip_addr | varchar(15) | no |
| uuid | varchar(100) | no |
| source | varchar(3) | yes |
| mm_advsym | char(4) | no |
| mm_campaign_name | varchar(50) | yes |
| mm_pixpgetyp | char(3) | no |
| mm_pixshrtnme | varchar(50) | yes |
| creative_id | int(11) | yes |
| line_item_id | int(11) | yes |
| publisher_id | int(11) | yes |
| price | double | yes |
| price_type | varchar(16) | yes |
| v0 | double | yes |
| v1 | double | yes |
| v2 | double | yes |
| s0 | varchar(50) | yes |
| s1 | varchar(50) | yes |
| s2 | varchar(50) | yes |
| country | varchar(50) | yes |
| region | varchar(50) | yes |
| city | varchar(50) | yes |
| zipcode | varchar(9) | yes |
| dma | varchar(16) | yes |
| area_code | varchar(16) | yes |
| isp | varchar(50) | yes |
| netspeed | varchar(50) | yes |
| browser | varchar(255) | yes |

TABLE 6

Valid Pixel Types (mm_pixpgetyp) for MathTag Log Parsing

| PIXEL TYPES | FILENAME |
|---|---|
| imp | mathtag_imp.csv |
| lpg | mathtag_lpg.csv |
| lpc | mathtag_lpc.csv |
| mrt | mathtag_mrt.csv |
| fun (includes fun, fp0-fp9) | mathtag_fun.csv |
| red (includes red, rei) | mathtag_red.csv |
| other (includes mrd, mro, mrc, win) | mathtag_other.csv |
| junk (invalid pixels like 'inp') | mathtag_badpix.csv |

In some embodiments, prior to attribution, the oracle module may generate a fact_directional_site_analysis table to maintain and present all event MathTags and/or event MathTags data. This table can be used to show the geo data for some or all client site activities using unattributed and attributed pixel page types. Table 7 shows one embodiment of a structure for the fact_directional_site_analysis table. In some embodiments, valid pixel types include but are not limited to: MRT, LPG, LPC, FUN and OTHER. This directional table may include all or some of the pixel types.

TABLE 7 fact_directional_site_analysis

| FIELD | DATA TYPE | NULLABLE |
|---|---|---|
| timestamp | int(11) | no |
| datetime | datetime | default (0) |
| ip_addr | varchar(15) | no |
| uuid | varchar(255) | no |
| mm_advsym | char(4) | no |
| mm_pixpgetyp | varchar(4) | no |
| mm_pixshrtnme | varchar(50) | yes |
| v0 | decimal(24) | yes |
| v1 | decimal(24) | yes |
| v2 | decimal(24) | yes |
| s0 | varchar(50) | yes |
| s1 | varchar(50) | yes |
| s2 | varchar(50) | yes |
| ri | varchar(50) | yes |
| browser | varchar(255) | yes |
| other | varchar(255) | yes |
| batch_id | int(11) | no |

In some embodiments, the oracle module may populate a temporary unattributed event audit table, tbl_audit_unattributed_events. The oracle module may determine a count of unattributed events to update or generate a tbl_audit_unattributed_events table. This table may be used to validate attribution processes. Table 8 shows one embodiment of the structure of the tbl_audit_unattributed_events structure table. Event MathTag records may be inserted into the tbl_audit_unattributed_events table when the event cannot be attributed during processing. The tbl_audit_unattributed_events table may include records for each event MathTag pixel page type (MRT, LPG, LPC, etc). After validation of the attribution processes, the table may be discarded as it loses its value.

TABLE 8 tbl_audit_unattributed_events

| FIELD | DATA TYPE | NULLABLE |
|---|---|---|
| timestamp | int(11) | no |
| datetime | datetime | default (0) |
| ip_addr | varchar(15) | no |
| uuid | varchar(255) | no |
| mm_advsym | char(4) | no |
| mm_pixpgetyp | varchar(4) | no |
| mm_pixshrtnme | varchar(50) | yes |
| v0 | decimal(24) | yes |
| v1 | decimal(24) | yes |
| v2 | decimal(24) | yes |
| s0 | varchar(50) | yes |
| s1 | varchar(50) | yes |
| s2 | varchar(50) | yes |
| ri | varchar(50) | yes |
| browser | varchar(255) | yes |
| other | varchar(255) | yes |
| load_source | varchar(25) | yes |
| batch_id | int(11) | no |

In some embodiments, the oracle module generates one or more fact_[PIXPGETYP]_attribution tables after attribution. This table can maintain and present attributed event MathTags by pixel page type. One embodiment of a fact_[PIXPGETYP]_attribution structure is depicted in Table 9.

TABLE 9 fact_[PIXPGETYP]_attribution

| FIELD | DATA TYPE | NULLABLE |
|---|---|---|
| timestamp | int(11) | no |
| datetime | datetime | default (0) |
| ip_addr | varchar(15) | no |
| uuid | varchar(255) | no |
| mm_advsym | char(4) | no |
| mm_pixpgetyp | varchar(4) | no |
| mm_pixshrtnme | varchar(50) | yes |
| creative_id | int(11) | yes |
| creative_name | varchar(255) | yes |
| line_item_id | int(11) | yes |
| line_item_name | varchar(255) | yes |
| publisher_id | int(11) | yes |
| price | double | yes |
| price_type | varchar(16) | yes |
| timelag | int(11) | yes |
| v0 | decimal(24) | yes |
| v1 | decimal(24) | yes |
| v2 | decimal(24) | yes |
| s0 | varchar(50) | yes |
| s1 | varchar(50) | yes |
| s2 | varchar(50) | yes |
| ri | varchar(50) | yes |
| browser | varchar(255) | yes |
| other | varchar(255) | yes |
| batch_id | int(11) | no |

In some embodiments, the oracle module generates a fact_[PIXPGETYP]_attribution table for each valid event MathTag pixel page type. Valid pixel page types may include, but are not limited to: MRT, LPG, LPC, FUN and OTHER. The oracle module may determine a count of attributed events to update one or more fact_[PIXPGETYP]_attribution tables. After attribution, values from the attributed impression may be appended to the event MathTag records. In one embodiment, fields carried from the impression to the event MathTag record may include any one or more of: source, campaign_name, creative_id, line_item_id, publisher_id, price, and price_type. After attribution, the event MathTags may receive and incorporate a calculated timelag (timelag=event MathTag timestamp−attributed creative MathTag timestamp). In one embodiment, timelag values are positive values.

After attribution, the brain engine may perform creative name lookup using a creative_name lookup table. The DSP system may maintain and update a creative_name lookup table that includes distinct creative_ids, creative_name and unpacked fields. For each attributed event, the brain engine may update the creative_name field of the event into the fact_[PIXPGETYP]_attribution table by incorporating and/or joining the creative_id and mm_date field values between the fact table and the creative_name lookup table.

After attribution, the brain engine may perform line_item_name lookup using a line_item_name lookup table. The DSP system may maintain and update, e.g., on a daily basis, the line_item_name lookup table. This table may include distinct line_item_ids, line_item_name and unpacked fields. For each attributed event, the brain engine may populate the line_item_name field of the event into the fact_[PIXPGETYP]_attribution table by incorporating and/or joining the line_item_id and mm_date field values between the fact table and the line_item_name lookup table.

After attribution, the brain engine may replicate each fact_[PIXPGETYP]_attribution table from mm_stg to mm_wh. The brain engine may replicate the fact_directional_site_analysis table from mm_stg to mm_wh. After replication, the brain engine may generate views that join the Digital Envoy geoIP data to the fact tables. The brain engine may persist or update the Digital Envoy data in a tblex_geo_map data structure. In some embodiments, the output views may include the illustrative table structures shown in Table 10 and Table 11.

TABLE 10 view_[PIXPGETYP]_attribution_geo

| FIELD | DATA TYPE | NULLABLE |
|---|---|---|
| timestamp | int(110) | no |
| mm_date | datetime | no |
| ip_addr | varchar(15) | no |
| uuid | varchar(255) | no |
| mm_advsym | char(4) | no |
| mm_pixpgetyp | varchar(4) | no |
| mm_pixshrtnme | varchar(50) | yes |
| creative_id | int(11) | yes |
| creative_name | varchar(255) | yes |
| line_item_id | int(11) | yes |
| line_item_name | varchar(255) | yes |
| publisher_id | int(11) | yes |
| price | double | yes |
| price_type | varchar(16) | yes |
| timelag | int(11) | yes |
| timelag_bin | varchar(25) | yes |
| v0 | decimal(24) | yes |
| v1 | decimal(24) | yes |
| v2 | decimal(24) | yes |
| s0 | varchar(50) | yes |
| s1 | varchar(50) | yes |
| s2 | varchar(50) | yes |
| ri_imp | int(11) | yes |
| ri_event | int(11) | yes |
| time_of_day | varchar(25) | yes |
| browser | varchar(50) | yes |
| browser_version | varchar(50) | yes |
| browser_OS_CPU | varchar(50) | yes |
| browse_security | varchar(50) | yes |
| browser_other | varchar(50) | yes |
| other_event | varchar(255) | yes |
| other_imp | varchar(255) | yes |
| country | varchar(50) | yes |
| region | varchar(50) | yes |
| city | varchar(50) | yes |
| conn_speed | varchar(25) | yes |
| country_conf | int(11) | yes |
| region_conf | int(11) | yes |

TABLE 10-continued view_[PIXPGETYP]_attribution_geo

| FIELD | DATA TYPE | NULLABLE |
|---|---|---|
| city_conf | int(11) | yes |
| metro_code | int(11) | yes |
| latitude | int(11) | yes |
| longitude | int(11) | yes |
| country_code | int(11) | yes |
| region_code | int(11) | yes |
| city_code | int(11) | yes |
| continent_code | ber(3) | yes |
| two_letter_country | char(2) | yes |
| domain_name | varchar(100) | yes |
| area_code | int(11) | yes |
| zip_code | int(11) | yes |
| gmt_offset | int(11) | yes |
| in_dst | varchar(8) | yes |
| zip_code_text | varchar(15) | yes |
| zip_country | varchar(12) | yes |
| isp_name | varchar(100) | yes |
| homebiz_type | varchar(50) | yes |
| proxy_type | varchar(30) | yes |
| rank | int(11) | yes |
| households | int(11) | yes |
| women | int(11) | yes |
| w18_34 | int(11) | yes |
| w35_49 | int(11) | yes |
| men | int(11) | yes |
| m18_34 | int(11) | yes |
| m35_49 | int(11) | yes |
| teens | int(11) | yes |
| kids | int(11) | yes |
| naics_code | int(11) | yes |
| batch_id | int(11) | no |

TABLE 11 view_directional_site_analysis_geo

| FIELD | DATA TYPE | NULLABLE |
|---|---|---|
| timestamp | int(11) | no |
| mm_date | datetime | no |
| ip_addr | varchar(15) | no |
| uuid | varchar(255) | no |
| mm_advsym | char(4) | no |
| mm_pixpgetyp | varchar(4) | no |
| mm_pixshrtnme | varchar(50) | yes |
| v0 | decimal(24) | yes |
| v1 | decimal(24) | yes |
| v2 | decimal(24) | yes |
| s0 | varchar(50) | yes |
| s1 | varchar(50) | yes |
| s2 | varchar(50) | yes |
| ri | int(11) | yes |
| time_of_day | varchar(25) | yes |
| browser | varchar(50) | yes |
| browser_version | varchar(50) | yes |
| browser_OS_CPU | varchar(50) | yes |
| browser_security | varchar(50) | yes |
| browser_other | varchar(50) | yes |
| other | varchar(255) | yes |
| country | varchar(50) | yes |
| region | varchar(50) | yes |
| city | varchar(50) | yes |
| conn_speed | varchar(25) | yes |
| country_conf | int(11) | yes |
| region_conf | int(11) | yes |
| city_conf | int(11) | yes |
| metro_code | int(11) | yes |
| latitude | int(11) | yes |
| longitude | int(11) | yes |
| country_code | int(11) | yes |
| region_code | int(11) | yes |
| city_code | int(11) | yes |
| continent_code | ber(3) | yes |

TABLE 11-continued view_directional_site_analysis_geo

| FIELD | DATA TYPE | NULLABLE |
|---|---|---|
| two_letter_country | char(2) | yes |
| domain_name | varchar(100) | yes |
| area_code | int(11) | yes |
| zip_code | int(11) | yes |
| gmt_offset | int(11) | yes |
| in_dst | varchar(8) | yes |
| zip_code_text | varchar(15) | yes |
| zip_country | varchar(12) | yes |
| isp_name | varchar(100) | yes |
| homebiz_type | varchar(50) | yes |
| proxy_type | varchar(30) | yes |
| rank | int(11) | yes |
| households | int(11) | yes |
| women | int(11) | yes |
| w18_34 | int(11) | yes |
| w35_49 | int(11) | yes |
| men | int(11) | yes |
| m18_34 | int(11) | yes |
| m35_49 | int(11) | yes |
| teens | int(11) | yes |
| kids | int(11) | yes |
| naics_code | int(11) | yes |
| batch_id | int(11) | no |

The brain engine may generate an output tbl_audit_analysis and/or tbl_mathtag_audit tables to persist aggregated creative MathTag and event MathTag information for auditing. The oracle module may determine a count of impressions and/or events from the csv files to update one or both of these tables. Table 12 shows one embodiment of a data structure for the tbl_mathtag_audit table.

TABLE 12

Data Structure for tbl_mathtag_audit

| FIELD | DATA TYPE | NULLABLE |
|---|---|---|
| mm_date | date | no |
| mm_exchange | char(3) | yes |
| mm_advertiser | char(4) | no |
| mm_campaign | varchar(50) | yes |
| mm_pagetype | char(3) | no |
| mt_count_prestage | int(11) | default (0) |
| mt_count_preattribution | int(11) | default (0) |
| mt_count_attributed | int(11) | default (0) |
| mt_count_directional | int(11) | default (0) |

In some embodiments, the tbl_mathtag_audit and/or tbl_audit_analysis table summarizes creative MathTag and event MathTag record counts (e.g., pre-attribution and post-attribution) for audit purposes. The brain engine may populate the mt_daily_analysis_attribution table following completed attribution processes. The primary key of this table may be a combination of the mm_date, mm_advertiser, and mm_pagetype field values. The mm_exchange field may be required for creative MathTag records and 'null' for event MathTag records. The mm_campaign field may be required for creative MathTag records and 'null' for event MathTag records. The brain engine may populate the mt_count_prestage field with counts from tblex_mathtag_[PAGETYPE]. Values in the mt_count_prestage field may match the counts in the mysql.mm_reporting.mt_daily_analysis table, when compared by key fields (interval, source, etc).

The brain engine may populate the mt_count_preattribution field with counts from a tbl_[PAGETYPE]_attribution_set_X_Y data structure. Values in the mt_count_preattribution data structure should exactly match the counts in the mt_count_prestage column. The brain engine may populate mt_count_attributed with counts from fact_[PAGETYPE]_attribution tables for event MathTag records. The brain engine may use 'null' for creative MathTag records. Values in mt_count_attributed may be compared to PC and PV numbers in the mm_reporting database's ad exchange data. When compared across key fields, the event MathTag counts could be greater than the exchange data. The brain engine may populate mt_count_directional with counts from fact_directional_imp_analysis for creative MathTag records and fact_directional_site_analysis for event MathTag records. Values in mt_count_directional may exactly match values in the mt_count_prestage and mt_count_preattribution columns.

Figure 3F:
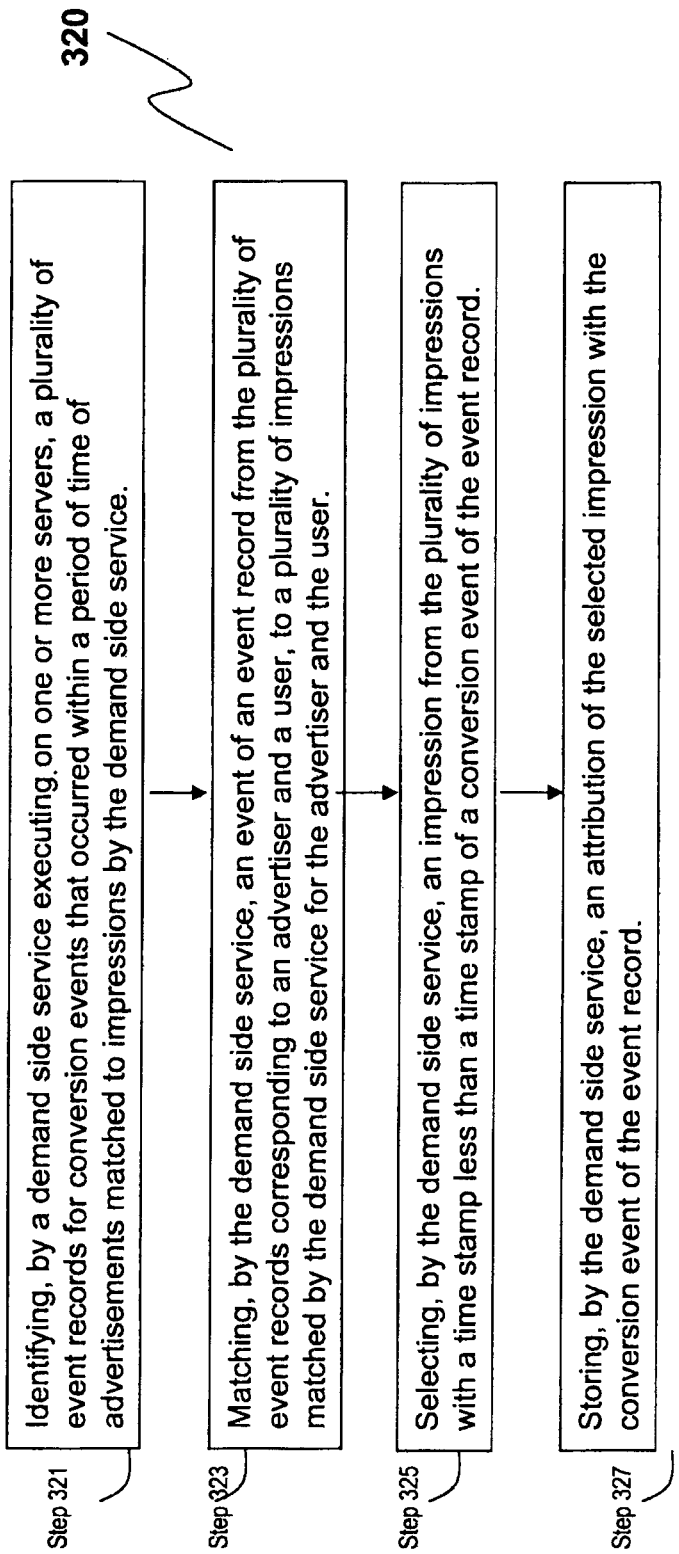
FIG. 3F is a flow diagram depicting an embodiment of a method for attributing a conversion event to an impression via a demand side service.

Referring now to FIG. 3F, one embodiment of a method for attribution of a conversion event to an impression via a demand side service is depicted. In brief overview, a demand side service, executing on one or more servers, may match conversion events that occurred within a period of time of advertisements, to impressions corresponding to the advertisements. The method includes identifying, by the demand side service, a plurality of event records for the conversion events matched to the impressions (321). The demand side service matches an event of an event record from the plurality of event records corresponding to an advertiser and a user, to a plurality of impressions matched by the demand side service for the advertiser and the user (323). The demand side service selects an impression from the plurality of impressions with a time stamp less than a time stamp of a conversion event of the event record (325). The demand side service stores an attribution of the selected impression with the conversion event of the event record (327).

In further details of (321), the demand side service identifies a plurality of event records for the conversion events matched to the impressions. A demand side service is sometimes referred to as a demand side platform (DSP). In some embodiments, a DSP provide features and processes which constitute the demand side service. The demand side service may execute on one or more servers. For example, the demand side service may include one or more modules (e.g., attribution component, bidding engine, ad exchange interfaces, and brain engine) distributed across one or more servers over a network. A demand side service may identify one or more conversion or user events. The demand side service may be notified of a user event by one or more entities, such as publishers, ad exchanges, ad servers, advertisers, clients or impression opportunity providers. For example, a user event, such as a completed sale of an advertised product, may be consummated at a client or advertiser's website. The client or advertiser may notify the demand side service in response to the user event.

In some embodiments, each user event triggers a notification back to the demand side service. The notification may be sent to the demand side service in real time, e.g., as each user event occurs. In certain embodiments, the notification may be sent in batch, e.g., as a consolidated log of one or more events, which may be sent periodically or upon request by the demand side service. In some embodiments, one particular type of user event may be tracked, satisfied and/or reported by a particular entity, while another entity may track, satisfy and/or report another type of user event. For example and in one embodiment, a client website may complete and report a sale while an ad server may respond to and report a user's request for more information. The demand side service may receive a logfile, update or other report of one or more user events. The demand side service may provide one or more interfaces for receiving notifications from the one or more entities. The demand side service may use the one or more interfaces to process, normalize and/or consolidate notifications of various types of user events from the one or more entities. The demand side service may describe and/or store each user or conversion event in a record. The demand side service may organize and/or store a plurality of records in any type or form of format or data structure, e.g., in a spreadsheet format. In some embodiments, an events database stores and/or maintains one or more records. The events database may reside in the demand side service or reside externally in communication with the demand side service.

In some embodiments, the demand side service matches conversion events to impressions. Although described generally and illustratively in terms of the demand side service, the demand side service may include an attribution component for performing some of the steps in an attribution process. The demand side service may match one or more impressions to conversion events that occurred within a period of time of advertisements corresponding to the one or more impressions. The period of time may be predetermined by the demand side service, a user or an administrator of the demand side service. The period of time may be determined, for example, to be a certain number of days, weeks, hours or minutes relative to the first appearance of the impression. In one embodiment, the demand side service may determine the period of time as a predetermined number of days, for example, two days.

In some embodiments, the demand side service may identify and/or monitor event records that correspond to one or more types of user actions (e.g., a click). The demand side service may identify and/or monitor event records that correspond to a user click occurring within the determined period of time. The demand side service may identify event records of events that occur within the determined time period from a user click or other user action. In certain embodiments, the demand side service identifies event records that correspond to a user view of the impression or advertiser. The demand side service may identify event records corresponding to a user view occurring within the determined period of time. The demand side service may determine a user view as any appearance of an impression to a user. In one embodiment, the demand side service determines that a user view occurred upon loading of the advertisement. In another embodiment, the demand side service assumes that a user view occurred if a user is potentially exposed to the impression for at least a certain period of time. In still another embodiment, the demand side service assumes that a user view occurred if the user's cursor had moved over the advertisement. Tin certain embodiments, the demand side service may determine that a user view occurred regardless of whether the user actually viewed the corresponding advertisement.

Referring to (323), the demand side service matches an event of an event record from the plurality of event records corresponding to an advertiser and a user, to a plurality of impressions matched by the demand side service for the advertiser and the user. The demand side service may match a user event to one or more impressions identified with an advertiser. The demand side service may identify the advertiser from a tag (e.g., a creative MathTag) of the impression, advertisement or creative. The demand side service may incorporate or associate the tag with each advertisement or creative sent to populate an impression. The tag may include an identifier of the advertisement. The tag may further include an identifier of the user being presented with the impression or advertisement. For example, the publisher of the impression may update the received tag with user information, including a user identifier (e.g., UUID). In another embodiment, the demand side service receives user information (e.g., from the corresponding publisher or ad exchange) and updates the tag with a user identifier prior to sending to the publisher.

In some embodiments, the demand side service identifies a user event or conversion event with a tag (e.g., an event MathTag). The tag may be incorporated into the event record of the user event. The demand side service may identify a corresponding advertiser for the user event. The demand side service may match an impression with a user event responsive to both identifying a common user, e.g., via the respective event and creative tags. The demand side service may match an impression with a user event responsive to both identifying a common advertiser, e.g., via the respective event and creative tags. The demand side service may match an event record having an advertiser identifier and a user identifier matching the advertiser identifier and the user identifier of an impression. The demand side service may match an event record with a plurality of impressions if the advertiser identifier and the user identifier of the record and these impressions match.

In some embodiments, the demand side service matches the event of a post view conversion to a plurality of impressions. In some other embodiments, the demand side service matches the event of a post click conversion to the plurality of impressions. The demand side service may use any type or form of algorithm or method for the matching, including the use of regular expression matching, direct matching of identifiers, and keying into a hash record of the user events. In some embodiments, the demand side service only matches the event of a post view conversion to an impression. In certain embodiments, the demand side service only matches the event of a post click conversion to an impression.

In further details of (325), the demand side service selects an impression from the plurality of impressions with a time stamp less than a time stamp of a conversion event of the event record. The demand side service may attribute the conversion event to the selected impression. The demand side service may select an impression from one or more impressions matched to a user event from (323). The demand side service may select the impression if the impression's time stamp is less than a time stamp of a conversion event of the event record. In some embodiments, the demand side service may select more than one impressions, and attribute the selected impressions to the user event. In certain embodiments, the demand side service selects an impression from the plurality of matched impressions with a time stamp closest to the time stamp of the event record.

Referring to (327), the demand side service stores an attribution of the selected impression with the conversion event of the event record. The demand side service may calculate a time lag for attribution by subtracting the time stamp of the impression from the event time stamp. The demand side service may calculate a time lag for attribution by subtracting the time stamp of each matched impression from the event time stamp. The demand side service may determine that the impression with the shortest or smallest time lag caused or lead to the conversion event. The demand side service may determine that multiple impressions with the shortest or smallest time lag(s) caused or led to the conversion event.

The demand side service may determine, from an ad campaign corresponding to the attributed impression, an attribution window. In certain embodiments, the attribution window differs from (e.g., is smaller than) the period of time referenced in (321). In other embodiments, the attribution window and the period of time referenced in (321) are the same. In some embodiments, the demand side service determines if the time lag for attribution is within an attribution window for a campaign of the advertiser corresponding to the impression. Where multiple time lags for attribution are calculated, the demand side service may determine whether each time lag (or the longest time lag) for attribution is within the attribution window. The demand side service may determine that a conversion event is attributed to one or more impressions with a time lag within the attribution window.

The demand side service may store an attribution of the selected impression with the conversion event of the event record. The demand side service may store the attribution in the conversion event's event record. In some embodiments, the demand side service may store the attribution of each conversion event in a fact table. The demand side service may use the attribution information to assess the effectiveness of an advertisement in a particular channel, segment, publisher, daypart, weekpart, user, etc. In some embodiments, the demand side service uses the attribution information to update one or more rules for bidding on impression opportunities. The demand side service may use the attribution information to update an ad campaign, and/or to design a new campaign.

D. Use of Server Side Cookies for User Identification and User Data Collection

Fragments of data for a unique user may be gathered at different times, from different ad sites, and/or via different ad exchanges and sources. These data may be useful when combined for evaluating and/or executing ad campaigns. A DSP may provide or use cookies or other tracking agents to track user behavior and action across one or more ad exchanges. The DSP may track the user in relation to one or more impression opportunities provided across one or more ad exchanges. The DSP may gather information about user behavior and action from the cookies or tracking agents. Using this information, the DSP may generate a log of actions by each unique user across all ad exchanges. The DSP may use the unique user information in a number of ways, such as attributing a user action to an impression opportunity served via the DSP.

The DSP may provide and maintain a user database (hereafter sometimes referred to as "UDB") for storing user information, including information obtained from cookies and other tracking agents. The DSP data warehouse may incorporate the UDB in some embodiments. In other embodiments, the DSP may provide separate storage elements for the UDB, such as using storage area networks (SAN) and any embodiment of the storage elements 122, 128, 140 described above in connection with FIGS. 1B and 1C. The UDB may be configured or structured for storing any type or form of user data, such as user profiles and preferences, logs of user actions, geo information, as well as user information from third-party providers such as BlueKai. The UDB may stores any user data (including fourth-party data) under the DSP UUID. In some embodiments, the UDB stores and/or maintains User-ID Mapping information between each exchange and the DSP.

In some embodiments, a creative pixel referred to as a MathTag Pixel is used to perform ID mapping between an ad exchange and a DSP. A bidder may insert a query string parameter into a creative MathTag that is embedded into a response to a requesting ad exchange:

mm_mop=base64(exchangeId:exchangeUserId)

If the ad exchange does not pass a user ID in the bid request, the bidder may not insert a mm_map key into the pixel tag. The user ID may be encoded, e.g., using Base-64 encoding. Upon receiving the pixel request, the pixel server may look for the mm_map name-value pair from the request's query string. If the mm_map name-value pair is found, the value may be decoded, and the Exchange-ID and Exchange-UserID values retrieved. The DSP may check a cookie mapping to see if a user ID mapping between the ad exchange (defined by the Exchange-ID) and the DSP is already established. In one embodiment, a mapping cookie has the following illustrative format, where timestamp is the value of the time when the mapping was created:

mm_mop=<exchange-id-1>:<timestamp-1>[|<exchange-id-2>:<timestamp-2>[ . . . ]]

If the Exchange-ID is not found in the cookie, the mapping is inserted into the UDB:

```
udb_prod.Mapping_E<Exchange-ID>_MM.insert(
    { "_id": <Exchange-UserID>, "mm" : <MM-UserID> } );
```

In some embodiments, the naming convention of mapping table (collection) is: "Mapping_E<Exchange-ID>MM". For example and in one embodiment, if the ad exchange's ID is 2 in the DSP system, then the mapping collection for the exchange user-ID to DSP user-ID is "Mapping_E2_MM". If the Exchange-ID is not found in the cookie, "<Exchange-ID>:<current-time>" is added into the mapping cookie. In some embodiments, if the Exchange-ID is found in the cookie, but the timestamp is very old (such as over 30 days), the DSP may want to update or refresh the mapping:

```
udb_prod.Mapping_E<Exchange-ID>_MM.update(
    { "_id": <Exchange-UserID> },
    { $set: { { "mm" : <MM-UserID> } },
    true );
```

The UDB may be designed and constructed based on various assumptions and/or facts. For example and in one embodiment, user profile data may be relatively static. Since user profile data may not be updated frequently, they may be highly cacheable. The brain engine may analyze user profile data to make better real-time decisions on optimizing the bidding strategy for a biddable impression. However, the brain engine may optionally elect to ignore some or all user data in making decisions depending on the volume of processing and/or the time for making a bid. User traffic may show high level of repeatability. For example, a user may generate multiple (sometimes many) ad requests within a certain (e.g., short) time frame. In some embodiments, user data may be generated primarily from one bidding module and/or ad exchange due to a matching of various ad exchange and user characteristics. In some embodiments, the DSP may provide a user-aware load balancer that directs requests from a user to a bidding module or ad exchange.

By way of illustration, the following describes one embodiment of a method for collecting and/or processing user data. An event MathTag may be used to assign user data into a user record in the UDB. The DSP's pixel server may add a user to a list of monitored users. For example and in one embodiment, an advertiser may insert or locate a MathTag (e.g., event MathTag) on the advertiser's Thank-you page (or other web page). A user may make a purchase on advertiser's site traverse to the Thank-you page of the advertiser site. The user's browser may send a pixel request (e.g., MathTag message) to the pixel server (e.g., of the DSP). The pixel server may decide to add the user to a list, such as a list of users that purchased a certain item. The list-id may be 12345. The pixel server may send an update to the UDB including the updated list. The pixel server may send an update to the UDB responsive to the updated list. The UDB may incorporate the list or any portion of the list into the UDB database. The pixel server may send an identifier of the user, as referenced by the ad exchange (e.g., ECUID) in the ad exchange's domain space, to the UDB. The UDB may process each user according to each specific case. For example, a user may not have been previously identified in the UDB. The UDB may determine not to create a new record into the database if the user does not accept cookies that track the user.

By way of illustration, the following describes another embodiment of a method for collecting and/or processing user data. The UDB may attempt to map the user, as identified by an ad exchange (e.g., ECUID), with the UUID of the DSP. The ad exchange may pass a biddable request to a bidder. An ECUID may be included in the request, identifying a user. The bidder may check the bidder's cache (either internal (in-memory) or external (mem-cached)) to see if mapping between the ECUID and an MMUID exists. If so, the bidder may use this mapping. If otherwise, the bidder may query the UDB for user-ID mapping information, such as from a "UID_Mapping<ExchangeName>" collection data structure. In some embodiments, if the UDB does not respond within a predefined time window, the bidder may timeout. The bidder may continue to process the request without a MMUID. If a mapping is found, the bidder may use the mapping as well as store the mapping in cache. If mapping is not found, the bidder may store an indication in cache that mapping between ECUID and MMUID does not exist (e.g., to prevent repeated lookup from UDB).

If a bidder decides to bid for an impression, the bidder may transmit a pixel with the bid response (including a creative). The pixel may communicate with the pixel server. The bidder may include the user's ECUID in a URL of the pixel. The pixel may include a validation mechanism (e.g., CRC16 check-sum) to prevent the URL from being altered. In some embodiments, upon receiving a build-mapping pixel call, the pixel server may insert a (ECUID, MMUID) mapping into the "UID_Mapping<ExchangeName>" collection data structure. The UDB may process each user according to each specific case. For example, the UDB may determine not to create a new record into the database if the user does not accept cookies that track the user.

By way of illustration, the following describes still another embodiment of a method for collecting and/or processing user data. The UDB may attempt to use user data that are in the DSP's namespace. An ad exchange may pass a biddable request (including a ECUID) to a bidder. The bidder may successfully retrieve a UUID using ECUID, from either the bidder's cache or from the UDB. The bidder may check its cache (either internal (in-memory) or external (memcached)) for the user data via the MMUID. If user data can be found from cache, the bidder will use the user data. Otherwise, the bidder may query the UDB for the user data, by using the MMUID. If user data can be found in UDB, the bidder may use the user data. The bidder may cache any response from UBD. In some embodiments, if the UDB does not respond within a predefined time window, the bidder may timeout. The bidder may continue to process the request without using user data.

By way of illustration, the following describes yet another embodiment of a method for collecting and/or processing user data. The UDB may attempt to use fourth party data. The UDB may import or incorporate fourth party data into the UDB. This can occur, for example, via by a backend process (e.g., batch update) or by bidder initiation (e.g., real-time update). In the case of a real-time update, the bidder may request for user data via a background thread. If the bidder does not find fourth party data in the user record received from UDB, the bidder may send a (real-time) query request to the fourth party provider, identifying the user using the UUID or an ID assigned by the provider. Responsive to receiving a response from the provider, the bidder may save the fourth party data into the UDB. The bidder may save the fourth party data into the UDB under the provider's namespace. In some embodiments, the bidder may use the fourth party data as follows. If fourth party data is present in a user record (under each provider's namespace), the bidder may use the user data in the bidder's bid selection process.

In some embodiments, a bidder may query the UDB in an asynchronous manner. The bidder may do a very aggressive timeout on the queries it makes. The UDB may be locates in one data-center only. Caching may prevent excessive network latencies and timeouts. In some embodiments, a request may be served without using user profile data. In certain embodiments, if a response from the UBD is received, the bidder may put the user date from the response into its cache. In some embodiments, the bidder may assume that user profile data are quite static. In some embodiments, a user appearing via an ad exchange may continue to make himself/herself available to the ad exchange for a certain time window. Therefore, although the bidder may have timed-out on the user's first request, the bidder may likely have the user data available (via cache) by the 2nd or 3rd request.

In some embodiments, since user data are quite static, the DSP system may perform data replication, e.g., replicate the UDB at data centers to reduce network latency. A Master-Slave system of UDB is one embodiment of such a setup. The DSP system may provide proper levels of memory for caching user data to improve performance. For example, 1 GB memory for caching user data of about 1 million unique users should be large enough to provide a good cache hit ratio. In some embodiments, a memcached instance located between the bidder and the UDB can supply a large cache. The memcached may reside in the same subnetwork that one or more bidders reside.

In some embodiments, the DSP system may pre-populate a Bidder's cache, e.g., to ensure that a bidder does not timeout and miss any impressions from users that are in an important list (e.g., a very narrowly targeted remarketing campaign). A program can be configured to schedule and initiate the pre-population. A bidder may be configured to cache a user record in for a longer time span (e.g., 24 hours).

In some embodiments, the UDB is designed and configured as a high performance, document-oriented, schema-free distributed database. The UDB may be designed and configured for storing high volume, low-value but high query performance data (e.g., cookie data). In some embodiments, UDB is implemented using MongoDB. For example and in certain embodiments, communication between DSP modules such as bidders and pixel server(s)) can be implemented using a MongoDB C++ driver. Query/insert may be implemented using JSON objects. The MongoDB C++ driver can perform translation between c++ (JSON) object and the BSON (binary-encoded serialization of JSON-like documents) data used in MongoDB.

By way of illustration, one embodiment of the data structures for an UDB is:

```
struct ListEntry {
unsigned int __id : 20; // list-ID
unsigned int __day : 12; // day-stamp when user was added to the list
};
struct ListData {
char __provider[8]; // fixed size buffer! e.g., "mm", "bk" (blue kai), etc
vector<ListEntry> __lists;
};
struct User {
string __id; // MM's UUID, 128-bit binary data
int __ver; // version of the data fmt
time_t __lmt; // last modification time.
vector<ListData> __data; // list data
};
BSON Data Structure in Mongo:
{
"_id": String, // MM's UUID, 16-byte (128-bit), binary.
"v": int, // version # of the format
"lmt": int, // last modify time of this user record. 32-bit time_t value.
"mm": [int] // namespace of MM user data, an array of integer.
// 4th-party data can be added under their own namespace.
}
```

By way of illustration, one embodiment of a method of implementing and administering a UDB using MonDB is shown below. An administrator account may be created for the UDB:

```
> use admin
> db.addUser("mmadmin", "M3d1@m@7hR0ckz!")
Create udb_prod:
    > use udb_prod;
    > db.createCollection('Users', { size:
    2000000000, autoIndexId: true});
    > db.Users.getIndexes( ); // make sure index is created
Create regular user accounts for udb_prod:
    > use udb_prod;
    > db.addUser("bidder", "udBB1dD3rc00L"); //for bidder
    > db.addUser("mt2", "udBmTtw0f1y$"); //
    for pixel-server (aka MT2)
Create udb_test:
    > use udb_test;
    > db.createCollection('Users');
Create a user account for setup replication on master and slave DBs:
    > use local
    > db.addUser('repl', 'm3d1!m@7hr3pl');
Create both udb_prod and udb_test into the slave.
Update the "udb_local" script to start mongo as a slave:
    extra_opts="--slave --source
    ewr-udb-n1.mediamath.com:$bind_port --only udb_prod"
Mongo command line arguments for replication:
    --master master mode
    --slave slave mode
    --source arg when slave: specify master as <server:port>
    --only arg when slave: specify a single database to replicate
    --pairwith arg address of server to pair with
    --arbiter arg address of arbiter server
    --autoresync automatically resync if slave data is stale
    --oplogSize arg size limit (in MB) for op log
    --opIdMem arg size limit (in bytes) for in memory storage of op ids
Stop UDB from mongo shell:
    $ /opt/mongodb/bin/mongo --port 27172
    > db.shutdownServer( )
Repair UDB (e.g., in the event of a crash or abruptive termination
of the mongod process):
From mongo shell (to repair a specific database - referenced by db):
    > db.repairDatabase( );
From command line (to repair all databases):
    $ /opt/mongodb/bin/mongod --repair
```

-continued

```
Report server status:
    > db.serverStatus( )
    {
        "uptime" : 6239,
        "globalLock" : {
            "totalTime" : 6239264837,
            "lockTime" : 11279716,
            "ratio" : 0.0018078597871193395
        },
        "mem" : {
            "resident" : 917,
            "virtual" : 65295,
            "mapped" : 34832
        },
        "connections" : {
            "current" : 2999,
            "available" : 17001
        },
        "ok": 1
    }
```

Figure 4A:
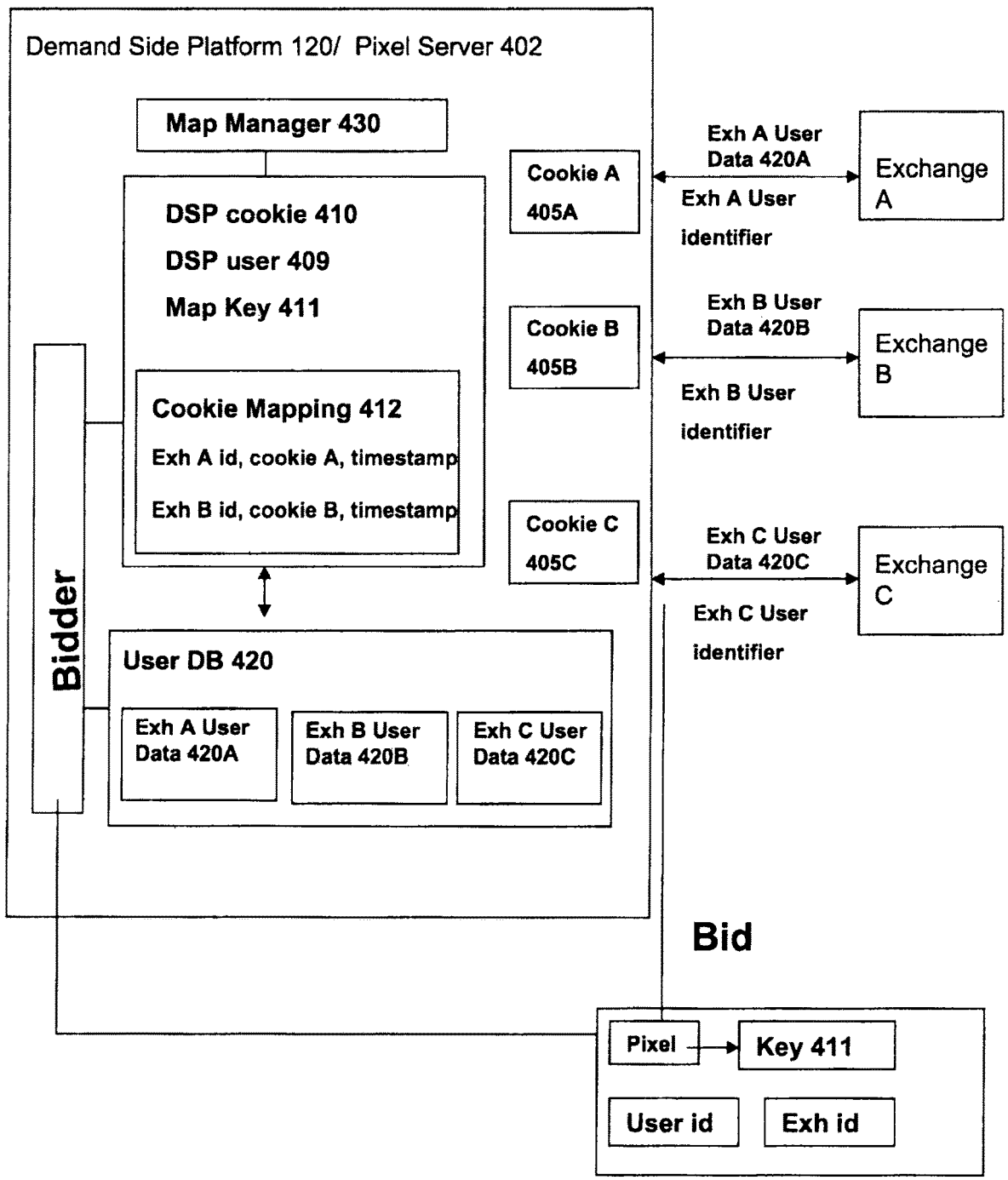
FIG. 4A is a block diagram depicting an embodiment of a system for using server-side cookies.

Referring now to FIG. 4A, an embodiment of a demand side platform (DSP) for using server-side cookies to identify and integrate user data across exchanges for use by the DSP in bidding and operation of the platform. In brief overview, the DSP of FIG. 4A includes a pixel server, a bidder and interfaces in communication with a plurality of exchanges, such as Exchange A thru Exchange C (e.g., Exh A-Exh C). Each of the exchanges may use their own user identifiers that are valid only in the domain space of the exchange. Each of the exchanges may provide user data to the DSP, such as user data 420A from exchange A, user data 420B from exchange B and user data 420C from exchange C. Each exchange may provide cookies or cookies information to identify the user and/or user data of the exchange, such as cookie A 405A for exchange A, cookie B 405B for exchange B and cookie C 405C for exchange C. The DSP may create and establish a user and user identifier 409 for a user valid in the DSP domain space. The DSP may create a DSP cookie 411 to identify and track this user. A map manager 430 of the DSP may establish a cookie mapping 412 to map the DSP cookie and user to the user id and cookies of each of the exchanges. The DSP may store user data from each of the exchanges to a user database 420 that can be queried by the DSP using the cookie mapping 412. The DSP may establish a map key 411 as a reference to the user's cookie mapping maintained by the DSP, such as via Pixel Server 402. The bidder may place this key in a pixel in a bidding communication with an exchange. The communication may include the user id and exchange id for the exchange.

The DSP may include a pixel server 402 for management or processing of pixels. The pixel server may include any type and form of executable instructions that execute on a device. The pixel server may operate within the DSP or external to the DSP. The pixel server may generate or provides any type and form of pixel. The pixel server may recognize or process any type and form of pixel. The pixel server may receive pixel calls from activated or triggered pixels. The pixel server may comprise logic, operations or functions to process the pixel calls and store, track and manage information tracked via the processed pixel. In some embodiments, the pixel server may establish, track and managing the cookie mappings described herein. In some embodiments, the pixel server may include the map manager. In some embodiments, the pixel server may store user data or data provided via a pixel to the user database 420.

Each of the exchanges may establish, maintain, process and track a user in the exchange via a user identifier. A user identifier for an exchange is unique to that exchange. For example, exchange A may have user identifier A for a user while exchange B and C have user identifiers B and C for the same user. The user identifier for an exchange may be accepted, authenticated or is otherwise valid in the domain of the exchange issuing or providing the user identifier. For example, only servers and services of exchange A will accept, authenticate, recognize or find valid user identifier A for the user for exchange A.

Each of the exchanges may establish and provide a cookie 405 for identifying, tracking and managing user identifiers and user data for the exchange. Each of the exchanges may provide a cookie unique to that exchange or containing information unique to that exchange. For example, exchange A may issue cookie A 405A for a user while exchanges B and C issue cookies B 405B and 405C for the same user. The cookies, generally referred to as cookie 405, may include exchange identifier, user identifier and user data 420A-C.

User data 420A-420C from an exchange may comprise any information received, tracked or provided to, from or via the exchange. User data may include information identifying characteristics of the user, such as age, gender, geographical data, categories of interest, user actions, user purchases, etc. The user data may include any data identified via the request and response parameters described in connection with FIGS. 2H and 2I above. Each of the exchanges may provide different user data for the same user than other exchanges.

The DSP may collect, store, track and manage the plurality of user data 420A-420C for a user received from the plurality of exchanges to a user database 420. As such, in some embodiments, the user database 420 represents a set of data for the user from different exchanges. In some aspects, the user database provides an aggregated view of the user from the collection of user data across the plurality of exchanges. The user database 420 may comprise a collection of data representing or provide a user profile. The user database 420 may be used by the bidder in making bidding rules, determining bids or otherwise for executing a campaign. Upon facing or receiving an impression opportunity for a user from an exchange, the bidder may use the collective or aggregative information of the user from user database to determine for what, if any, campaign of the DSP to make a bid on the impression opportunity.

The cross-exchange user database 420 allows the bidder to use data from one exchange to make bids on another exchange. For example, although a second exchange does not support or provide a certain piece or type of user data, the bidder may be influenced in the bidder's bidding with the second exchange by the certain piece or type of user data provided by the first exchange for the user. The cross-exchange user database 420 allows the bidder to use data from a plurality of exchanges to make bids on any one exchange. The bidder may obtain user data from the user database received for the user from a plurality of exchanges. Any data in the user database may used by the bidder to make bidding decisions on any one of the exchanges.

A map manager 430 may create, establish and maintain a DSP cookie and cookie mapping for each user. The map manager may comprise any type and form of executable instructions executing or executable on a device. The map manager may be part of any component of the DSP. The map manager may be part of the pixel server or otherwise executed by the pixel server.

The map manager 430 may map the plurality of cookies from an exchange for a particular user to a DSP user identifier 409, referred to sometimes as MMUID, for the user. The DSP cookie 409 may be referred to as the mapping cookie which includes the cookie mapping. The cookie mapping 412 may comprise any data arranged in any manner that identifies an exchange id, a cookie id for the exchange represented by the exchange id and a timestamp of when the cookie was received. The cookie mapping may include a user identifier for the particular user on the exchange. For a user, the cookie mapping may identify the plurality of exchanges for which the DSP has established a mapping for the user. As such, the cookie mapping 412 may map an exchange id, exchange user id, cookie and timestamp for a plurality of exchanges identifying the user. In some embodiments, the cookie mapping or portions thereof are stored in the user database 420.

The DSP cookie 410 may map the DSP user 409 to the plurality of exchange user ids and cookies for each of the exchanges applicable to the user. The DSP cookie map the DSP user to any third party data separate from an exchange and stored in the user database. The map manager may provide a unique key referred to as map key 411 as a reference or handle to an instance of the DSP cookie and cookie mapping for a particular user. The map manager may use the timestamp value to identify when a mapping may be stale, old or expired.

When an exchange passes a biddable request to the bidder, the exchange includes a an exchange user id in the request. The bidder checks to see if the mapping between the exchange user id and DSP user id exists. If the bidder does not find the mapping, the bidder includes a pixel into the bid response (e.g., creative) when bidding on the impression. The pixel is to the pixel server and the exchange user id is included in the pixel url. The pixel is a build-mapping pixel call to the pixels server. Upon receiving the build-mapping pixel call, the pixel server inserts the exchange user id and DSP user id combination into the cookie mapping. If the bidder finds the mapping between the exchange user id and DSP user id, the bidder queries the user database using the DSP user id. If the user database does not return a result in a predefined time window, the bidder will timeout and continue processing the request without using user data. If the user database returns a result in the predefined time window, the user uses the user data in bidding. If the bidder queries the user database for fourth party (4p) data (data passed from a third-party to other companies (fourth-parties) and does not find such data, the bidder may send a query request to the 4P provider by user id (DSP user id or provider's user id). After receiving a response from the 4P provider, the data is stored into the user database under the provider's namespace. If the bidder find 4P data in the user database, the bidder will such data in the bidder's bid selection process.

Figure 4B:
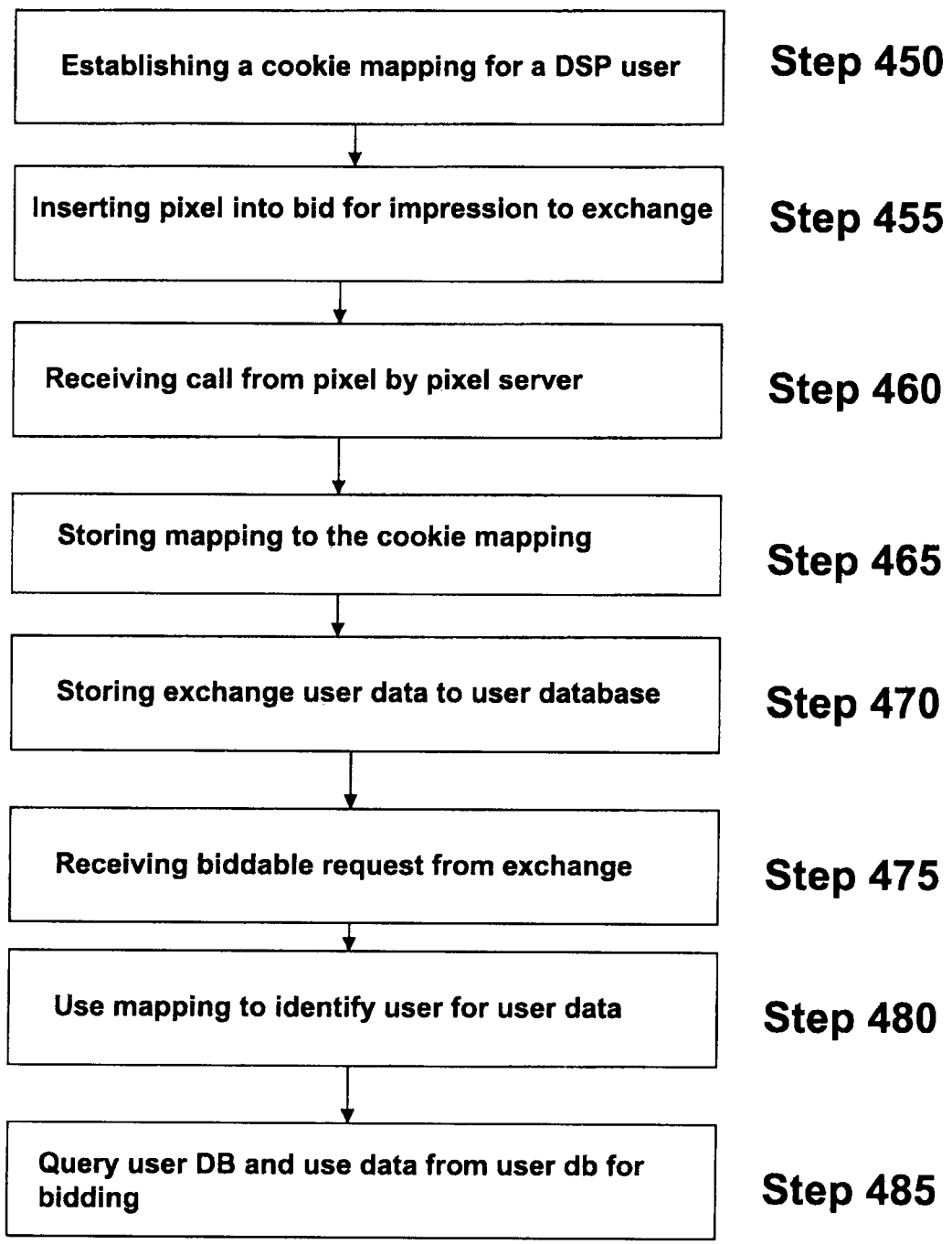
FIG. 4B is a flow diagram depicting an embodiment of a method for using server-side cookies.

Referring now to FIG. 4B, embodiments of steps of a method for using server-side cookies in DSP operations is depicted. In brief overview, at step 450, the DSP establishes a cookie mapping for a DSP user. At step 455, the DSP inserts a build-mapping pixel into bid for impression to exchange. At step 460, the pixel server received the build-mapping pixel call from the activated pixel. At step 465, the pixel server stores mapping to the cookie mapping. At step 460, the DSP stores user data from the exchange to the user database. At step 475, the bidder receives biddable request from exchange. At step 480, the bidder uses cookie mapping to identify DSP user and corresponding user data. At step 485, the bidder queries the user database to use user data for bid selection process.

In further details, at step 450, the DSP, such as via bidder, pixel server or any other component, may establish a DSP cookie for a DSP user. The DSP may identify a user and establish a DSP user identifier unique to the user within the DSP or otherwise valid in the namespace of the DSP. The DSP may store the DSP cookie in the user database. The DSP may establish a user namespace within the user database. Under the user namespace, user data from an exchange, from third party data providers and from fourth party data providers may be stored in associated with the user. The DSP cookie may be provided to the user via the exchange if the user accepts such cookies. The DSP may not establish the DSP user id until the DSP cookie is accepted by the user or the user' device.

In some embodiments, a user is added to the DSP responsive to the pixel server. For example, an advertiser places a DSP pixel or tag on a web page related to a conversion event or a predetermined user activity. The user visits the advertiser's web page or otherwise takes the predetermined user activity. The pixel or tag is activated and makes a pixel call or sends a pixel request to the pixel server. Response to the pixel call or request, the pixel server decides to add the user to the user list of the DSP. The pixel server may send an update to the user database to add the user by DSP user id to the user database. In some embodiments, the pixel server may send a request to the user database to add a new user. Response to the request, the user database creates a DSP user id for the user and may pass the DSP user id back to the pixel server. Responsive to a new user, the DSP such as via user database, may establish a DSP and a cookie mapping in which maps can added.

At step 455, the bidder may place a map-building pixel into a bid request for an impression to an exchange. The bidder may received a biddable request from an exchange. The request may include a user identifier for the exchange. The bidder may checks a cache to see if mapping between exchange user id and DSP user id exists. If yes, then the bidder uses the DSP user id. If not, the bidder queries the user database for the mapping. If the user database does not return a result in a predefined time window, the bidder will timeout and continue processing without the DSP user id. If a mapping id returned within the predetermined time window, bidder uses the mapping. The bidder may store the mapping to the cache. If the mapping is not found in the user database, the bidder places a mark or indicator in the cache that the mapping does not exist.

If the bidder devices to bid for an impression, the bidder places or includes a pixel in the bid response, such as part of or included in the ad or creative. The bidder may piggyback a pixel or pixel tag into the bid response. The pixel url may encode the exchange user id. The bidder may insert a query string parameter into the DSP tag that is embedded into the response to the requesting exchange. The data for the query string parameter may be encoded using base-64 encoding. The data may include encoded exchange identifier and corresponding exchange user identifier. If the exchange does not pass an exchange user identifier into a biddable request, the bidder does not insert the map key into the pixel tag. Otherwise, the bidder includes the map key with the response, such as part of the query string parameters of the request. When the advertised or creative is delivered via the impression, the pixel may be activated or triggered resulting in a call to the pixel server.

At step 460, the pixel server may receive a call from the DSP pixel or tag. The pixel server may receive the pixel request comprising the pixel url and/or the query string parameters. The pixel server may look for the map key in the request's query string, such as via a name-value pair designated or intended to carry the map key. If the map key is found in the request, the pixel server may decode the encoded data values from the pixel request. The pixel server may use base 64 decoding to decode the base 64 encoded data. The pixel server checks the cookie mapping to see if the mapping for the exchange to the DSP has already been established (e.g., is the exchange id found in the user's cookie mapping). The mapping cookie corresponding to the user may include a list of exchange id and timestamps of when the mapping was created. If the mapping exists, then the pixel server checks the timestamp to determine if the mapping is stale, obsolete or expired in accordance with any policies of the DSP or corresponding exchange. If so, the pixel server may update or re-establish the mapping between the exchange and DSP and use an updated timestamp. Otherwise, the pixel server may maintain the cookie mapping as is.

At step 465, if the exchange id is not found in the cookie mapping, the pixel server may create a mapping entry in the cookie mapping to map the exchange to the DSP for the user. The pixel server may send a request to the user database to add the mapping to the user cookie. The request may include the exchange id and current time. The request may provide the DSP user id or MMUID of the corresponding user. The request may identify the exchange user id corresponding to the user for the exchange identified by the exchange id. In some embodiments, the pixel server may update the cookie mapping in cache. In some embodiments, the pixel server may send database inserts/updates to the user database to update or create the cookie mapping.

At step 470, any user data from an exchange, third party and/or from a fourth party may be stored in the user database and associated with the DSP user id and corresponding cookie mapping. The user data may be received by the DSP via any DSP cookie or exchange cookie, such as via name-value data in such cookies. The user data may be received by the DSP via any biddable request from an exchange. The user data may be received by DSP or exchange pixel calls to the pixel server. The pixel calls may pass or identify any user data. The user data may be received by an online or offline attribution process, such as those described herein. The user data may be queried and received via any database external to the DSP, such as by a query via an API to an exchange, third-party or fourth-party service or data provider. The query may be a real-time query.

At step 475, the bidder may receive a biddable request from any one of the exchanges. The bidder may receive the biddable request from the exchange responsive to a request from the DSP or bidder for such biddable requests. The bidder may receive a biddable request for a user currently identified by the DSP via a DSP user id. The bidder may receive a biddable request for which there is an existing and corresponding cookie mapping. The bidder may receive a biddable request for an exchange having an exchange id mapped to the DSP via a cookie mapping. The bidder may receive a request including any of those embodiments described in connection with FIGS. 2H and 2I.

At step 480, upon receipt of the biddable request, the bidder may use the cookie mapping to find the DSP user id corresponding to this user from this exchange request. The bidder may perform a lookup via the cookie mapping. The cookie mapping may be stored in the cache and/or user database. The bidder may query for the cookie mapping responsive to determining the bidder may or will bid on the biddable request. The bidder may retrieve the DSP user id by exchange user id from a cookie mapping either in the cache or the user database. With an exchange id and exchange user id, the bidder may identify the DSP user id for the user via the cookie mapping, The bidder may query the cookie mapping or query the user database for the DSP user id with a defined timeout period. If the DSP user id is not found or determined within the defined timeout period, the bidder may not use the user data in the bidding selection process.

At step 485, with the DSP user id, the bidder may query the cache to determine if the cache hold users data corresponding to the DSP user id. If the cache does have the corresponding user data, the bidder may use the cached user data. If the cache does not have the user data, the bidder may query the user database using the DSP user id to obtain corresponding user data. The bidder may query for certain portions of user data by parameter or attribute name. For example, the bidder may query the user profile for certain user attributes that are useful, applicable or desirable for bidding on the exchange in which the bidder will bid.

E. Integration and Anonymization of Supplier Data

A DSP can support a number of process flows for evaluating and/or executing an ad campaign. In some embodiments, some of the process flows integrate third party provider information (e.g., insights and analytics) for segment targeting. A target segment may feature a set of characteristics. These characteristics may include user characteristics, such as user profile, preferences, behavior, and history. The characteristics may include site characteristics, such as ad network, publisher, content, etc. The characteristics may include impression characteristics, such as channel, dayparts, weekparts, REM or prospecting classifications, and ad size information. As discussed, third party providers can include suppliers such as BlueKai, Exelate, etc.

Third party providers (hereafter sometimes generally referred to as "suppliers" or "partner") may limit access to the data that they provide (e.g., segment data) via any means. For example, suppliers can implement authenticated access, limited-access windows, data encryption, dynamically-updated mapping dictionaries to match third-party data with data derived from ad server and other sources, etc. In certain embodiments, certain aspects of segment information may be closely-guarded and may be provided in a fragmented but coordinated way. Some suppliers may identify one or more segment candidates (e.g., impression opportunities) from a plurality of segments to a DSP for tracking without identifying the corresponding segment of each candidate. The suppliers may provide identifiers and/or segment mapping dictionaries to match tracked data with supplier data. Some or all of these measures may be referred to as anonymizing supplier data. In some embodiments, some suppliers may require anonymization to share data with a DSP or other partner.

In some embodiments, anonymization involves merging closely-guarded supplier data with DSP-collected data, to generate segment-specific profiles or reports, but not disclosing the supplier data separately. Anonymization may include disclosing segments covered by a plurality of impressions, but not segments covered by individual impressions. Anonymization may include disclosing segment data generated for a plurality of impressions, but not segment data specific to any individual impression. In certain embodiments, anonymization may include identifying segments covered by a plurality of impressions and users, but not segments associated with an individual user. In another embodiment, anonymization may include reporting segment profiles or reports for a plurality of users but not disclosing segment data pertaining to any particular user. In yet another embodiments, anonymization may include providing a DSP with anonymous segment identifiers which are not descriptive of the segments themselves. Anonymization may sometimes refer to the use of one or more mapping dictionaries to associate data collected by the DSP with segment data from a supplier. In some embodiments, anonymization is a means for a supplier to protect its detailed delineation or definition of a particular segment. In some of these embodiments, ad campaign results from the various available segments are, however, available for comparison to identify effective segments to pursue.

Figure 5A:
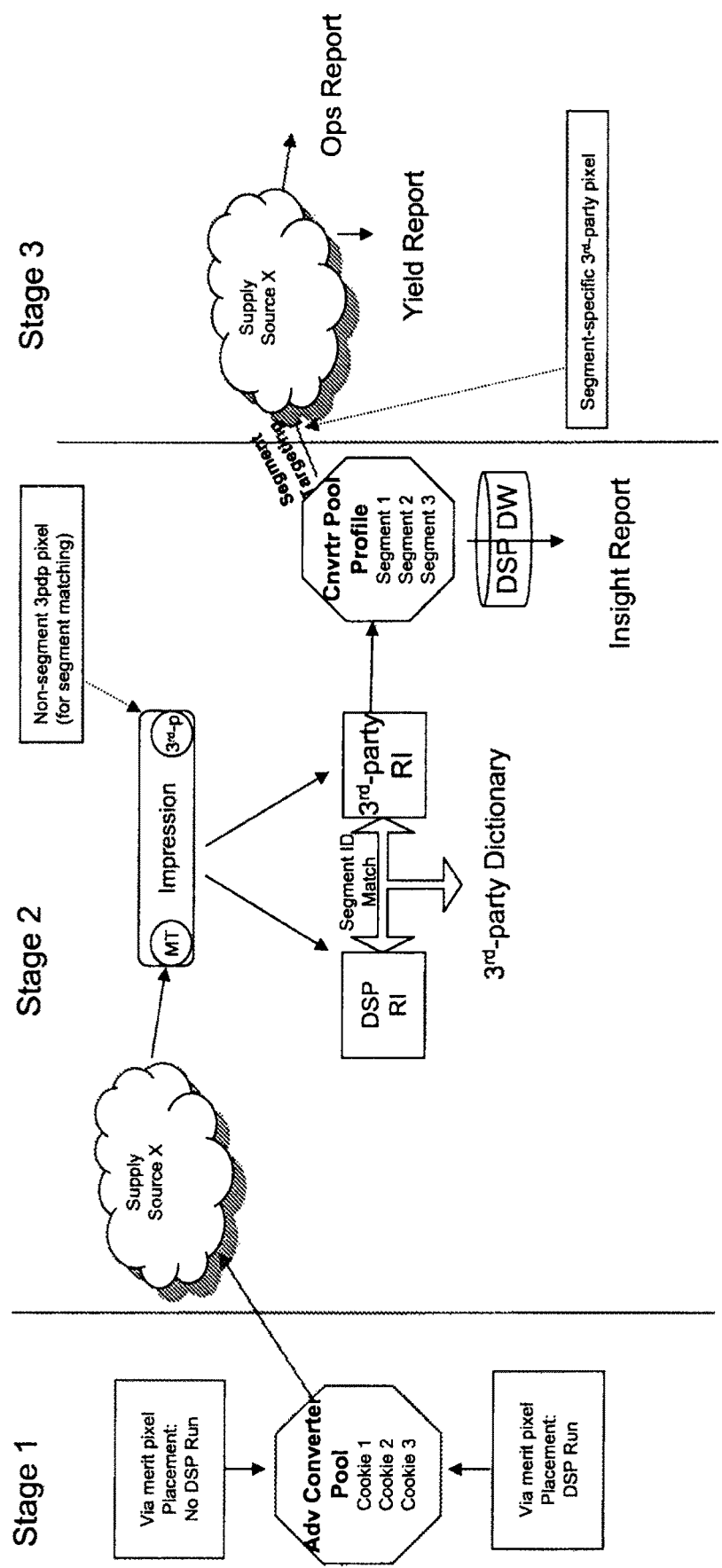
FIG. 5A is a block diagram depicting one embodiment of a system for evaluating and executing an ad campaign.

Referring to FIG. 5A, one embodiment of a system for evaluating and executing an ad campaign is depicted. In brief summary, the system shows three stages, two of these stages involving integration of supplier data. In a first stage, a DSP may create a cookie pool for running an unrestricted, untargeted campaign. In some embodiments, the cookie pool is segment-agnostic. No information specific to any segments are collected in these embodiments. The untargeted campaign may be used to determine metrics and measures for use as a baseline against targeted segments. The untargeted campaign may be used to assess certain campaign settings or parameters. The untargeted campaign may be used to assess the supply of available or projected impression opportunities.

One embodiment of anonymizing supplier data is shown within stage 2, sometimes referred to as a segment backtesting process. In some embodiments, a segment backtesting process incorporates data collected via DSP MathTags, pixels and/or cookies, as well as supplier data. The DSP system integrates data collected via these sources to provide a more thorough and in-depth analysis of the market dynamics related to any particular impression opportunity.

In some embodiments, a supplier may provide pixels or cookies for use by the DSP. The DSP may associate or incorporate these pixels or cookies with MathTags to collect data from pools of impression opportunities. These pixels or cookies may associate data collected from a site via the DSP with a segment identifier. In some embodiments, the supplier may identify a pixel or cookie as belonging to a particular segment. This segment information may not be directly disclosed to or available to the DSP. In some embodiments, the segment identifier is a random integer (RI) uniquely assigned to a specific segment and is referred to as a DSP RI. The suppliers may provide third-party segment-specific data. The suppliers may identify the segment-specific data with a supplier segment identifier. In some embodiments, the supplier segment identifier is a random integer uniquely assigned to a specific segment, and is referred to as a third-party RI. The suppliers may generate and/or provide mapping dictionaries. A mapping dictionary may associate or match a DSP RI with a third-party RI corresponding to the same segment. A DSP may associate, consolidate or process the collected data with supplier data using a mapping dictionary to produce segment-specific insights and analytics.

By separating or profiling a converter pool into segments (e.g., using the dictionary), a DSP can determine performing segments for targeting in an ad campaign. In some embodiments, a DSP may execute a campaign using a stage 3 process, also known as segment targeting process. In the segment targeting process, the supplier may provide the DSP with segment-specific pixels or cookies. The supplier may identify impression opportunities from the targeted segment to the DSP for bidding.

Figure 5B:
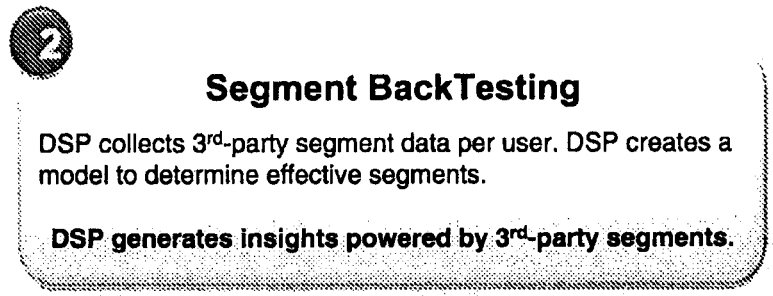
FIG. 5B is a block diagram depicting one embodiment of a segment backtesting process.
Figure 5B:
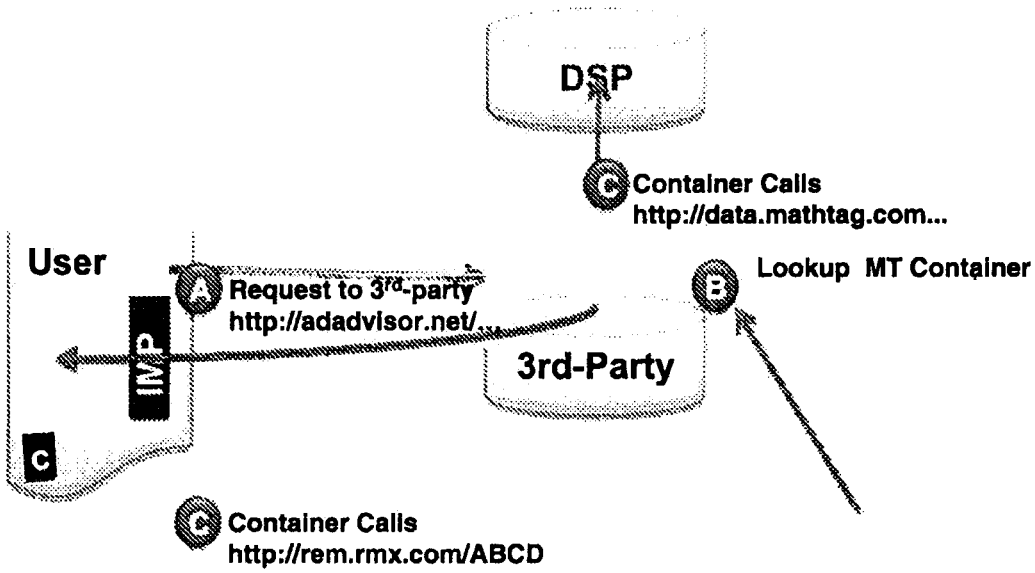

Referring now to FIG. 5B, an embodiment of a segment backtesting process is depicted. A user action may activate a pixel associated with an impression. In some embodiments, the pixel is a supplier-provided tag. The pixel may communicate with a pixel server via a URL. The pixel server may be provided by the supplier. In some embodiments, the pixel is attached to or included in a DSP MathTag. A generic tag or pixel not targeting any segments may be used across one or more campaigns. The generic tag or pixel may provide a means to join or associate a corresponding impression with segment-related data from the supplier. In some embodiments, when an impression is served, loaded or displayed, the pixel communicates with the pixel server. The DSP may generate or provide a placement identifier for the impression or advertisement. The pixel may identify the impression or advertisement to the pixel server using a placement identifier of the impression or advertisement. Upon activation, the tag or pixel may request segment-related data from the supplier for the corresponding impression by providing site and/or placement information of the impression. The supplier may determine that the corresponding impression is associated with one or more segments.

In some embodiments, the DSP identifies each user, e.g., via a UUID. The pixel may identify the user to the pixel server, for example, upon activation of the pixel. The supplier or pixel server may determine if data pertaining to the user is available. The supplier or pixel server may determine if the user has been previously identified by the supplier, e.g., in a cookie pool maintained by the supplier. The supplier or pixel server may determine if segment data corresponding to the user is available. The supplier may provide data from the one or more segments to the DSP in response to the request. Activation of a supplier tag or pixel may be represented in one embodiment as a URL connection to:

---
http://adadvisor.net/adscores/g.pixel?sid=<site value>&_ri=<mm placement id>&_cx=<mm context flag>
--- where:

<site value> is a static value assigned by the supplier to identify each customer.

<mm placement id> is a dynamic value populated by the DSP per placement. This is a random, unique number used to join segment data with the DSP placement data.

<mm context flag> is a static value assigned by the DSP to identify the context of the supplier tag.

001 may indicate a supplier tag in media
 002 may indicate a supplier tag on a page The supplier may identify a segment based on information collected (e.g., about the advertiser site and/or user) by the pixel. The supplier may provide a dictionary to map a corresponding DSP tag, cookie or MathTag to the pixel. The supplier may provide a dictionary to map a corresponding DSP tag, cookie or MathTag to the segment of the pixel. In some embodiments, the supplier may provide segment information, such as the types of segments to the DSP. The supplier may provide the available types of segments to the DSP in the form of a dictionary of segment identifiers. In some embodiments, the DSP may determine that an impression and/or user corresponds to a particular segment identified by a DSP segment identifier. The DSP may identify the segment of an impression to the supplier, e.g., via the supplier pixel. The DSP may identify the segment to the supplier in order to procure data corresponding to the identified segment.

In some embodiments, the dictionary may associate data collected by the MathTag, pixel or cookie with the identified segment. The pixel server and/or the supplier may communicate with the ad server for additional information. The supplier may identify the segment based on the additional information. In some embodiments, the pixel server and/or the supplier may associate the additional information with the identified segment. The supplier may provide the collected information and/or additional information of the identified segment to the DSP. The supplier can provide a look-up file or mapping dictionary (e.g., in .txt or .csv format) that maps the DSP segment identifier with a segment name (e.g., "Leisure Travel") provided by the supplier.

In some embodiments, the DSP collects segment data from supplier. In some embodiments, activation of a creative MathTag, attached to the same advertisement as the pixel, also activates the pixel. The DSP may collect segment data from the supplier on a per user basis. The supplier may match one or more segments to the impression. The supplier may identify the one or more matched segments based on one or more of: an identifier of the user, information about the impression, information about the advertisement site; information about the context (e.g., webpage or media) of the impression, and identification of one or more segments by the DSP. The DSP can receive segment data in real-time, responsive to pixel activation (or firing), and/or via offline data sharing processes. In one embodiment, the latter may include maintaining a log of tag activation and transferring the log to the DSP in an offline process. In some embodiments, the DSP receives real-time matched segments responsive to an activated tag. The tag activation may be represented in one embodiment as a URL connection to:

---
http://data.mathtag.eom/dp/dps/TARG/<mm context flag>/imp?
px=%{score}!%{zip}!%{indiv1.age}!%{indiv1.gender}!%{indiv1.timestamp}
!%{indiv2.age}!%{indiv2.gender}!%{indiv2.timestamp}&ri=<mm placement id>
--- where

<mm context flag> may be a static value assigned by the DSP to identify the context of the supplier tag. This value may be sent on the supplier request tag.

%{score}!%{indiv1.age}!% . . . may be a bang delimited (!) list of supplier values.

<mm placement id> may be a dynamic value populated by the DSP per placement. This value may be sent on the supplier request tag.

A supplier can perform an infrastructure test, e.g., check that the supplier's setup can properly operate with the DSP in any of the steps described.

The DSP may generate a model based on the consolidated segment data. The DSP may generate insights specific to segments. The DSP may determine the performance of one or more identified segments. In some embodiments, the DSP collects segment data on a per user basis. Accordingly, the DSP can generate a model and/or insights for a specific user. Responsive to the model and/or insights, the DSP may target one or more segments to bid on.

Figure 5C:
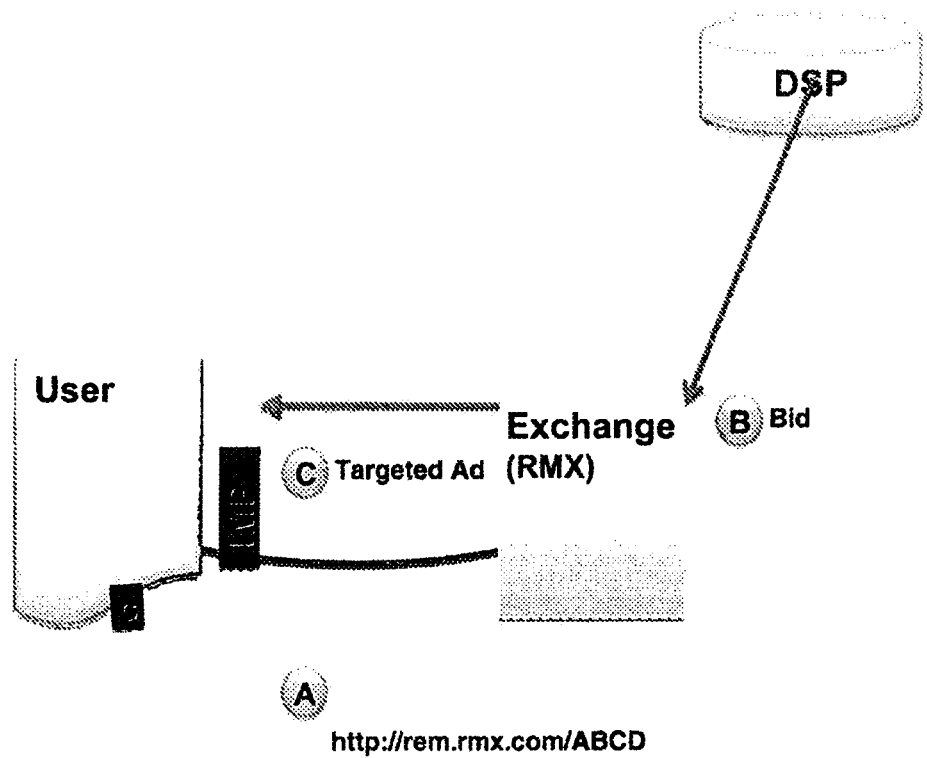
FIG. 5C is a block diagram depicting one embodiment of a segment targeting process.

Referring now to FIG. 5C in conjunction with FIG. 5A, an embodiment of a segment targeting process is depicted. A DSP may use or provide MathTags or pixels, or specify cookies provided by an ad exchange, to target a specific segment. In some embodiments, one MathTag is assigned per segment per ad exchange. In some embodiments, these MathTags are REM pixels. In certain embodiments, when an impression is served, the DSP generates a request to a supplier to provide segment data corresponding to the REM pixel. The DSP or the supplier may provide a lookup or dictionary between a REM pixel or REM pixel URL and a segment. One embodiment of a lookup data structure or table is shown below:

| Segment | Remarketing Pixel |
|---|---|
| 001 | http://action.mathtag.com/cnt?id=ti_001 |
| 002 | http://action.mathtag.com/cnt?id=ti_002 |
| 003 | http://action.mathtag.com/cnt?id=ti_003 |
| 004 | http://action.mathtag.com/cnt?id=ti_004 |
| 005 | http://action.mathtag.com/cnt?id=ti_005 |
| 006 | http://action.mathtag.com/cnt?id=ti_006 |
| 007 | http://action.mathtag.com/cnt?id=ti_007 |
| 008 | http://action.mathtag.com/cnt?id=ti_008 |
| 009 | http://action.mathtag.com/cnt?id=ti_009 |
| 010 | http://action.mathtag.com/cnt?id=ti_010 |

By way of illustration, stages 2 and 3 of the process is described below with respect to a user cookie, although any user tracking agent, tag or pixel is similarly applicable. A user may trigger a MathTag at a site. In some embodiments, a MathTag corresponding to an impression is triggered when the impression is served. A user cookie, in some embodiments, may be set with a REM pixel (e.g., segment-specific) when the MathTag is triggered. Responsive to triggering the MathTag (e.g., in stage 2), the MathTag may request the supplier to identify one or more segments associated with the impression, site and/or user. Based on the identification, the DSP may identify, provide or generate a REM pixel to attach to the user cookie. The DSP and/or supplier may use a lookup table that maps each segment to an appropriate REM pixel. The DSP and/or supplier may use a lookup table that maps each segment to a URL. In some embodiments, the supplier makes a container call to the DSP to select or generate the REM pixel. The DSP may select or generate a REM pixel that triggers a remarketing action using a URL mapped to the identified segment. In some embodiments, the DSP provides the REM pixel to the supplier. The DSP or supplier may attach the REM pixel to the user's cookie. The DSP may ensure that the corresponding ad exchange recognizes or tracks the REM pixel.

In certain embodiments, the ad exchange may identify the user navigating to various sites or webpages, e.g., in stage 3. The ad exchange may trigger the REM pixel when it detects the user cookie, for example, at another site monitored by the ad exchange. The site may be associated with the particular segment identified earlier. The REM pixel may trigger a remarketing action with the DSP via a URL configured in the REM pixel. The ad exchange may offer an impression opportunity at the site. In some embodiments, the DSP determines, via the triggering REM pixel, to bid on the impression opportunity. The DSP determines, via the triggering REM pixel, to identify or provide a target advertisement in connection with the bid. The DSP may send a bid to the ad exchange for the impression opportunity. If the ad exchange accepts the bid, the ad exchange conveys the ad from the DSP to the user site.

In some embodiments, the DSP runs a multi-exchange campaign targeting one or more segments. The DSP may determine that certain segments are effective and target these segments at higher volume.

One embodiment of variable declarations describing a REM pixel includes the following:

```
var mm_context_flag = %{context flag};
var mm_ri2 = %{mm placement id};
var targ_score = %{score};
var targ_zip = %{zip};
var targ_indiv1_age = %{indiv1.age};
var targ_indiv1_gender = %{indiv1.gender};
var targ_indiv1_timestamp = %{indiv1.timestamp};
var targ_indiv2_age = %{indiv2.age};
var targ_indiv2_gender = %{indiv2.gender};
var targ_indiv2_timestamp = %{indiv2.timestamp};
```

Figure 5D:
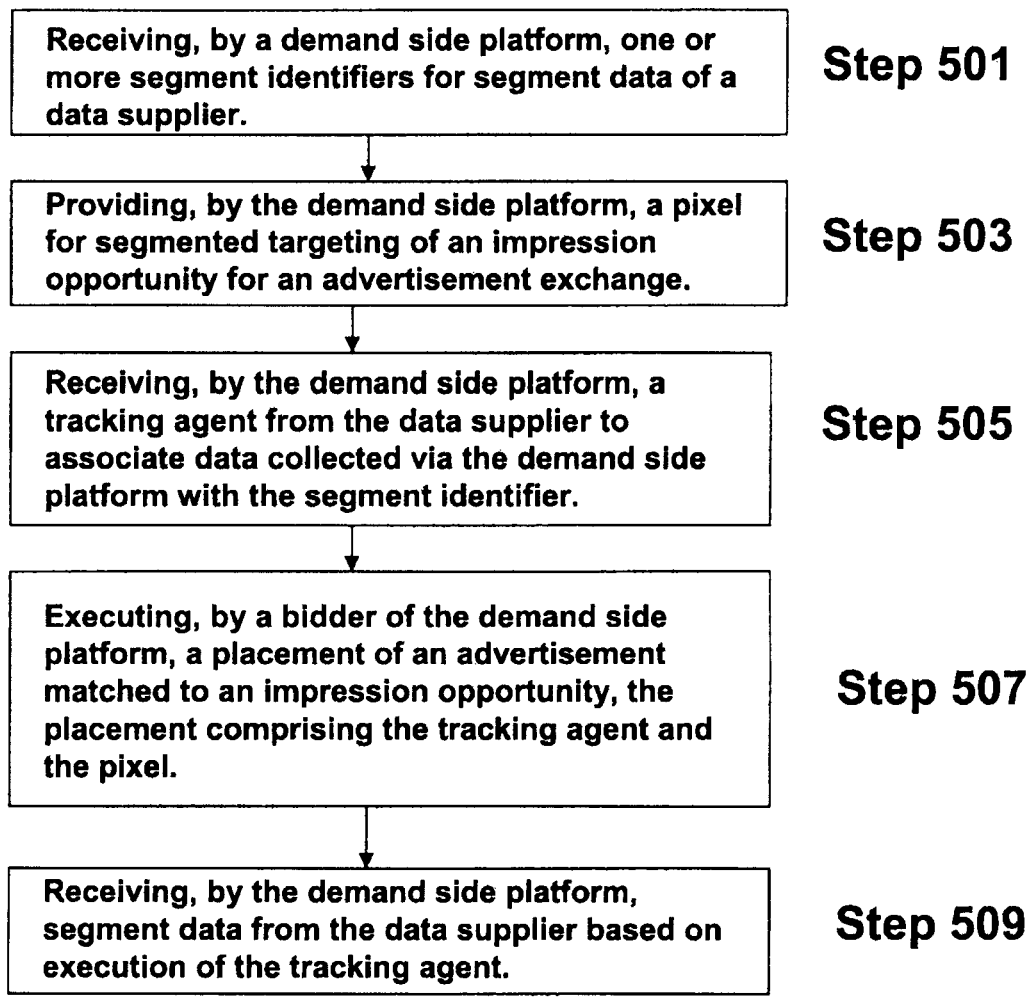
FIG. 5D is a flow diagram depicting an embodiment of a method maintaining anonymity of segment data from a third party provider while performing segment targeting via a demand side platform.

Referring now to FIG. 5D, one embodiment of a method for maintaining anonymity of segment data from a third party provider while performing segment targeting via a demand side platform is depicted. In brief overview, a demand side platform executing on one or more servers receives one or more segment identifiers for segment data of a data supplier (501). Each of the one or more segment identifiers includes a random integer uniquely assigned to a specific segment of the segment data. The demand side platform provides a pixel for segmented targeting of an impression opportunity for an advertisement exchange (503). The demand side platform receives a tracking agent from the data supplier to associate data collected via the demand side platform with the segment identifier (505). A bidder of the demand side platform executes a placement of an advertisement matched to an impression opportunity, the placement comprising the tracking agent and the pixel (507). The demand side platform receives segment data from the data supplier based on execution of the tracking agent (509). The segment data corresponds to the segment identifier for the placement.

In further details of (501), a demand side platform executing on one or more servers receives one or more segment identifiers for segment data of a data supplier. In some embodiments, the DSP receives a segment identifier from a plurality of data suppliers. Each data supplier may provide third-party data specific to one or more segments. In some embodiments, the data supplier may alternatively or additionally provide non-segment-specific data. In some embodiments, the DSP collects segment data from each data supplier. The DSP may collect segment data from the supplier on a per user basis. The DSP can receive segment data in real-time, responsive to pixel or MathTag activation (or firing), and/or via offline data sharing processes. In one embodiment, the latter may include maintaining a log of tag activation and transferring the log to the DSP in an offline process. In some embodiments, the DSP receives matched segments in real-time responsive to an activated pixel or tag (e.g., MathTag). A pixel or tag may be activated when an impression is served. A pixel or tag may be activated responsive to a user action.

In some embodiments, the data supplier identifies segment-specific data with a supplier-specific segment identifier. Each of the one or more segment identifiers may include a random integer uniquely assigned to a specific segment of the segment data. In various embodiments, a segment identifier may include any type or form of identifiers including alphanumeric names, strings or values. Each segment may be assigned a unique segment identifier. In some embodiments, one or more data suppliers may use the same segment identifier for data associated with a specific segment.

The DSP may identify data that the DSP collected (in association with an impression) with a DSP-specific segment identifier, e.g., to be matched against a segment of the supplier. The DSP may collect data using a pixel or creative MathTag attached to an impression. For example, a creative MathTags can be used to log geographic and other attributes for every exposure to a user. Event MathTags can be used to log attributes of a user performing an action on a client's advertising site. The DSP system may be configured to dynamically receive numeric and alphanumeric values from event MathTags and/or creative MathTags. In one embodiment, examples of dynamically-passed values includes Order Numbers, Cart Size and Revenue. In some embodiments, such as with anonymization, the DSP-specific segment identifier is different from a segment identifier provided by a data supplier. In yet other embodiments, the DSP-specific segment identifier is the same as a corresponding supplier-specific segment identifier. A data supplier may generate a segment mapping dictionary based on the segments from which the data supplier supplies data. The data supplier may generate the segment mapping dictionary based in part from segment-related information (i.e., DSP segment identifiers) provided by the DSP. The DSP may receive a segment mapping dictionary from each data supplier.

In some embodiments, the dictionary includes a mapping of a DSP-specific segment identifier to a supplier-specific segment identifier. In one embodiment, the dictionary includes a mapping of a DSP-specific and/or supplier-specific segment identifiers to the corresponding segments. The segment mapping dictionary may include a mapping of the one or more segment identifiers to a corresponding segment of the segment data. The DSP may associate DSP-collected data with supplier-provided data using the mapping dictionary. The DSP may produce segment-specific insights and analytics from the association. The supplier can provide the dictionary in the form of a look-up file or mapping dictionary (e.g., in .txt or .csv format) that maps a DSP segment identifier with a segment name (e.g., "Leisure Travel") provided by the data supplier. In some embodiments, the dictionary maps each segment identifier to a URL provided by the DSP.

Referring to (503), the demand side platform provides a pixel for segmented targeting of an impression opportunity for an advertisement exchange. The pixel may be any form or type of cookie or tag, or include features of cookies or tags. In certain embodiments, the pixel is a MathTag. The DSP may attach one or more pixels for attaching or incorporating into an impression. The DSP may use the pixel to collect data from an impression, site and/or user. A pixel may communicate with a pixel server via a URL for example.

The DSP may serve, to a publisher or site, an impression embedded with a supplier-provided pixel, tag or cookie for collecting data. The pixel may execute when an impression is loaded, e.g., to a web page. In some embodiments, activation of a pixel includes a URL connection to a pixel server. The pixel may send collected data to the DSP via a destination identified by the URL. The DSP and/or supplier may identify one or more segments for association with the user, impression and/or site based on information collected by the pixel. The DSP and/or supplier may identify one or more segments using the dictionary described above.

In further details of (505), the demand side platform receives a tracking agent from the data supplier to associate data collected via the demand side platform with the segment identifier. The tracking agent may be any type or form of tag, cookie or pixel. The DSP may receive from the data supplier the tracking agent responsive to serving an impression. In another embodiment, the DSP receives from the data supplier the tracking agent before placing a bid on an impression opportunity. In some embodiments, the DSP attaches or incorporates the supplier pixel to the tracking agent. In certain embodiments, the tracking agent provides features different from that of a pixel or cookie. In some embodiments, the tracking agent is associated with a segment identifier.

In some embodiments, the data supplier provides as the tracking agent a segment-generic pixel for attaching or incorporating into an impression. The data supplier or DSP may use a generic tag or pixel that is not targeting any segments, across one or more impressions and/or campaigns.

The supplier may use the pixel for collecting and/or matching information related to the impression to one or more segments. In some embodiments, the supplier may identify each pixel as belonging to a particular segment. The DSP may associate, attach or incorporate the pixel to the advertisement or impression. In certain embodiments, the DSP may associate, attach or incorporate the pixel to a creative MathTag provided by the DSP Referring to (507), a bidder of the demand side platform executes a placement of an advertisement matched to an impression opportunity. A publisher may offer an impression opportunity for bid, e.g., as a user is navigating to a webpage. The ad exchange may accept a bid from the DSP for the impression opportunity. The DSP may convey an advertisement to populate the impression opportunity. This is sometimes referred to as placing an ad. The placement of the advertisement may include the tracking agent and the pixel. The bidder may attach the tracking agent and/or the supplier pixel with the advertisement. In some embodiments, the DSP generates a placement identifier for the placement. The DSP may generate the placement identifier as a random and/or unique number. The placement identifier may be used to associate segment data (e.g., provided by the supplier) with the placement and/or impression.

In further details of (509), the demand side platform receives segment data from the data supplier based on execution of the tracking agent. The segment data may correspond to the segment identifier for the placement. The data supplier may determine what data to send to the DSP upon execution of the tracking agent. The data supplier may determine which segment(s) the corresponding user, impression and/or site is associated with. The data supplier may determine the segments based on information collected by the tracking agent regarding the user, impression, site, etc. Responsive to the determination, the data supplier may send or provide corresponding segment data to the DSP.

In some embodiments, the DSP receives segment data on a per user basis. The DSP may receive segment data on a real-time or substantially real time basis via an interface to the data supplier. In some embodiments, the DSP receives segment data on a real-time basis or substantially real time basis responsive to activation of the tracking agent. The tracking agent may, for example, be activated by a user action such as a click or mouse over. The tracking agent may, in some embodiments, be activated responsive to the display of the advertisement. In some embodiments, the DSP receives segment data on an offline basis via import of a file of a predetermined type, e.g., a logfile or spreadsheet. The DSP may make a request for the file import on a periodic basis, for example.

The DSP may generate a model based on the consolidated segment data. The DSP may generate insights specific to segments. The DSP may determine the performance of one or more identified segments across one or more ad campaigns. In some embodiments, the DSP runs a multi-exchange campaign across one or more segments. The DSP may determine that certain segments are effective and may target these segments at a higher volume.

Figure 5E:
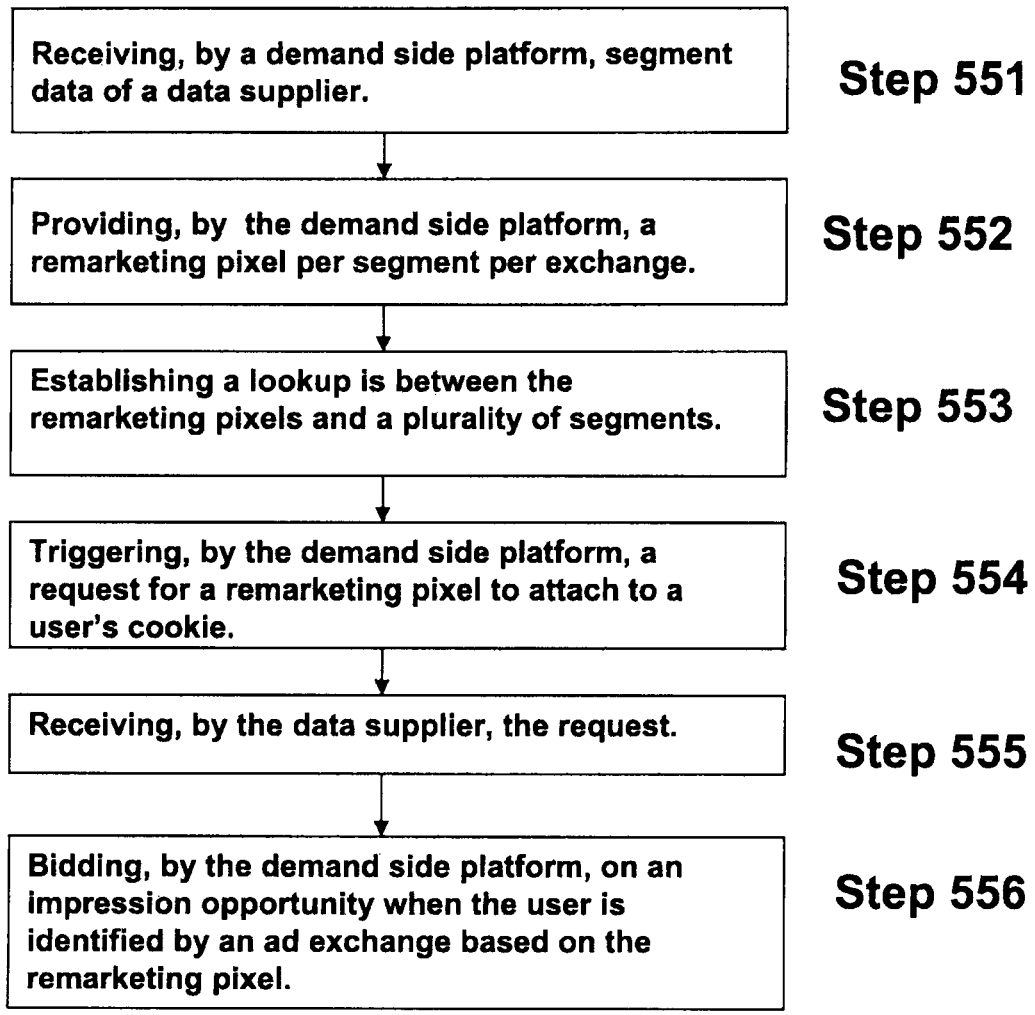
FIG. 5E is a flow diagram depicting an embodiment of a method for segment targeting by a demand side platform.

Referring now to FIG. 5E, an embodiment of steps of a method for segment targeting by the DSP is depicted. In brief overview, at step 551, the DSP receives segment data of a data supplier such as via a segment mapping dictionary, corresponding to a user. The DSP may create a model based on the segment data to determine one or more segments to target. At step 552, the DSP provides one tag or pixel per segment per exchange, each referred to as a remarketing pixel. At step 553, a lookup is established between the remarketing pixels and a plurality of segments. Each of the segments may be mapped to a unique remarketing pixel. At step 554, the DSP triggers a request for a remarketing pixel to attach to a cookie of the user. At step 555, the data supplier receives the request and selects a remarketing pixel based on the lookup. At step 556, the DSP bids on an impression opportunity when the user is identified by an ad exchange based on the remarketing pixel.

At step 551, the DSP may receive segment data of a data supplier. The data supplier may determine what segment data to send to the DSP using a segment mapping dictionary from the data supplier. The dictionary may comprise any embodiments of the dictionary described above in connection with FIGS. 5A-5D. The received segment data may correspond to a single user. The dictionary may be updated on a periodic basis by the data supplier. Each of the one or more segment identifiers may comprise a random integer uniquely assigned to a specific segment of the segment data. A segment mapping dictionary may include a mapping of the one or more segment identifiers to a corresponding segment of the segment data. The DSP may receive or obtain the segment data online or in real-time via an API call, pixel call or tag request. The data supplier may push or trigger an event to the DSP for updates or changes to the segment data. The DSP may receive or obtain the segment data via an upload, download or another file transfer method. The DSP may create a model based on the segment data to determine one or more segments to target. The DSP may determine, based on the model, that one or more segments are expected to be more successful than the others, for example.

At step 552, the DSP provides one tag or pixel per segment per exchange, each referred to as a remarketing pixel. The DSP may provide a remarketing pixel for each targeted segment. The DSP may provide the remarketing pixel on a per exchange basis for each segment. For example, exchange 1 may have a first remarketing pixel for segment id 1, a second remarketing pixel for segment id 2 and a third remarketing pixel for segment id 3, while exchange 2 has its own set of remarketing pixels for each of the same segment ids. Each remarketing pixel may identify or include a call to a URL provided by the DSP. The URL may include one or more query parameters. A call to the URL may initiate one or more actions by the DSP. In one embodiment, a call to the URL may initiate a bid for an available impression opportunity.

At step 553, a lookup is established between the remarketing pixels and a plurality of segments. Each of the segments may be mapped to a remarketing pixel. The lookup may comprise any form or data structure, such as a table, file or other object. In some embodiments, the DSP establishes the lookup. The DSP may send the lookup to the data supplier or advertiser, which may further update the lookup. In some embodiments, the data supplier or advertiser establishes the lookup. The data supplier or advertiser may send the lookup to the DSP. In some embodiments, the DSP maintains the lookup. In some embodiments, the data supplier or advertise maintains the lookup.

In some embodiment, the lookup maps each segment to information for configuring a remarketing pixel. The information may include a segment-specific URL for including in each remarketing pixel. The data supplier may use the lookup to create a remarketing pixel specific to each segment. In some embodiments, each URL may be linked to particular instructions or executing modules in the DSP.

At step 554, the DSP triggers a request for a remarketing pixel to attach to a user's cookie. The DSP may request the supplier to determine whether to attach a remarketing pixel to a user's cookie. The DSP may trigger the request responsive to an available impression opportunity. The DSP may trigger the request responsive to serving an impression. The DSP may trigger the request responsive to an activation of a MathTag of the DSP. The DSP may request the supplier to determine whether a particular user belongs to a target segment. The DSP may request the supplier to determine whether a particular user belongs to a target segment responsive to serving an impression to the user. The DSP may make the one or more remarketing pixels available to the supplier to attach to the user's cookie.

The DSP may determine if the user has one or more cookies for hosting the remarketing pixel. In some embodiments, the DSP may create a cookie for the user to host a remarketing pixel. In one embodiment, the DSP may request the data supplier or ad exchange to create a cookie for the user to host a remarketing pixel. In some embodiments, a particular cookie is created, or a new cookie created, specifically for hosting the remarketing pixel.

At step 555, the data supplier receives the request. The data supplier may select a remarketing pixel based on the lookup. When the data supplier or advertiser receives a pixel request, such as from delivering an impression to a user, the data supplier or advertiser may perform a lookup of the remarketing pixel based on the applicable segment. The data supplier may collect data related to the impression, user and/or the corresponding site. The data supplier may determine that the impression and/or user corresponds to one or more segments. The data supplier may determine that the one or more segments includes a segment targeted by the DSP. The data supplier may perform a lookup of the remarketing pixel corresponding to the targeted segment. The data supplier may set the user's cookie(s) with the corresponding remarketing pixel. The data supplier may insert or provide information corresponding to the remarketing pixel in the user's cookies. In some embodiments, the user's cookie may identify segment identifiers and/or segment data.

The DSP may ensure that the ad exchange can detect or recognize the remarketing pixel in the user's cookie. The DSP may provide the ad exchange with a list of the remarketing pixel to monitor. In some embodiments, the DSP may inform the ad exchange to track one or more active remarketing pixels. In some embodiments, no other ad exchange may detect or recognize the remarketing pixel. In other embodiments, some other exchanges may detect or recognize the remarketing pixel. For example, the DSP may convey the remarketing pixel to a plurality of ad exchanges. When an impression opportunity is available, one the plurality of ad exchanges may communicate to the DSP that the impression opportunity is directed to a user identified by a remarketing pixel. In some embodiments, one the plurality of ad exchanges may inform the DSP when the remarketing pixel is detected.

At step 556, the DSP bids on an impression opportunity when the user is identified by an ad exchange based on the remarketing pixel. The user may navigate to another site or webpage. In some embodiments, the user may disappear from the domains monitored by the ad exchange, e.g., by moving into a domain not monitored by the exchange, or by signing out from the web. The ad exchange may monitor one or more sites for the presence of the user via the user's cookie(s). The ad exchange may monitor one or more sites for the presence of the remarketing pixel by monitoring all user cookies identified at the one or more sites.

Responsive to an identification of the remarketing pixel, the ad exchange may communicate this to the DSP. In some embodiments, the ad exchange may activate the remarketing pixel. In other embodiments, the DSP may activate the remarketing pixel. The DSP may verify that the remarketing pixel belongs to an active campaign before activating the remarketing pixel. The DSP may verify that the remarketing pixel corresponds to a targeted segment before activating the remarketing pixel. In certain embodiments, upon identification and/or verification of the remarketing pixel, the DSP may trigger one or more operations. The one or more operations may be triggered according to a URL included in the remarketing pixel, for example. Accessing the URL may execute one or more instructions at the DSP.

The DSP may, for example, initiate a bidding process based on the remarketing pixel. The DSP may determine that an impression opportunity is available (e.g., to the user), corresponding to the detection of the remarketing pixel. The DSP may determine that the impression opportunity warrants a higher bid due to its association with a targeted segment. In some embodiments, the remarketing pixel may trigger the data supplier to provide additional information (e.g., segment data) to the DSP for determining how and whether to bid. The remarketing pixel may identify to the DSP, e.g., via the URL, information for influencing the bidding process. In some embodiments, the remarketing pixel may collect data associated with the user (e.g., user preference, history, transactions), and may provide this data to the DSP. Responsive to the remarketing pixel, the DSP may determine a price to bid for the impression opportunity. The DSP may send one or more bids for the impression opportunity responsive to the remarketing pixel.

F. Use of Packed Names in Third-Party Data Interfaces

Each ad exchanges may provide one or more interfaces for specifying, defining, displaying, retrieving or reporting data related to impression opportunities, user data, third-party-provided information, ad campaigns and/or ad transactions. The interfaces provided by one ad exchange may have fields, parameters or dimensions (hereafter sometimes generally referred to as "dimensions") that may be different from interfaces of another ad exchange. Some ad exchange interfaces may support custom dimensions. A DSP, or an advertiser using such an interface may define, specify or configure the interface to provide and/or receive additional dimensions.

A custom dimension may be useful to complement the standard dimensions provided by an interface. As described above in connection with FIGS. 2A-2E, it is useful to normalize the data received across one or more ad exchanges. Data sent to a plurality of ad exchanges may also be normalized or standardized across the plurality of ad exchanges, e.g., to include a standard set of parameters and/or instructions. Custom dimensions can be defined and added to default or standard interfaces of specific ad exchanges so that the interfaces across ad exchanges can appear or operate more uniformly from a DSP or advertiser's point of view. In some embodiments, reporting tools, provided by an ad exchange or a third-party provider (e.g., Exelate) have interfaces that are non-uniform relative to another provider. As a way for clients or partners of such reporting tools to customize data retrieval and/or reporting, these providers may offer custom dimensions.

In some embodiments, a custom dimension may be added to currently available dimensions. In certain embodiments, currently available dimensions may be customized. To normalize interfaces and/or data across a plurality of ad exchanges and/or reporting tools (hereafter sometimes generally referred to as "third-party interfaces"), a DSP provider may configure and/or add custom dimensions to certain interfaces. Each DSP interface (e.g., bidding modules) may include additional translational and/or mapping elements to operate with the custom dimensions.

In some embodiments, managing a large number of custom dimensions may be relatively complex and/or inefficient. Some third-party interfaces may support a limited number of custom dimensions. Some third-party interfaces may charge more or demand more profit-sharing in providing additional custom dimensions. In certain embodiments, third-party interfaces may be prone to over-loading and/or interface problems (e.g., missing/incomplete/corrupted data, data misdirection, and increased latency in reporting, data transfer or data retrieval) as the number of custom dimensions increases. In some embodiments, it is important, necessary, beneficial or crucial to perform transactions with third-party interfaces efficiently, e.g., real-time bidding of impression opportunities.

A method for using packed names in each custom dimension is disclosed herein. One or more dimensions may be packed or incorporated into a single dimension. One or more dimension names may be incorporated into a name for a custom dimension. One or more parameters, fields, values, configuration, settings or commands may be incorporated into a custom dimension for reporting, retrieval, execution and/or transmission. For example and in one embodiment, a custom dimension incorporating a collection of data can be pulled for reporting any subset of the incorporated data. Each third-party interface may be configured or programmed to parse and/or separate a plurality of dimensions embedded into a custom dimension. In some embodiments, a hierarchy of dimensions may be incorporated into a single dimension. The method of packing a plurality of dimensions into one dimension may be referred to as "packed names"

In some embodiments, packed names can be applied across a plurality of third-party interfaces. In some of these embodiments, shared keys and/or identifiers may be used to access similar dimensions across interfaces. A plurality of dimensions may be incorporated, concatenated, consolidated, or grouped into one dimension using any type or form of encoding and/or text-string manipulation techniques. In some embodiments, each custom dimension may include human-readable textual strings of any type or form (e.g., alpha-numeric and/or special characters). Some dimensions (e.g., of media management user interfaces) may be configured for human input, modification and/or comprehension.

In some embodiments, a plurality of dimensions may be concatenated together into a single string using any type or form of string delimiter or dimension separator (hereafter sometimes generally referred to as "delimiter"). A delimiter can be any one or more characters of any type (e.g., alpha-numeric and/or special characters). A delimiter may be selected or configured such that the delimiter can be clearly distinguished from dimensions. A delimiter may be selected or configured such that the delimiter is not likely to be confused with any portion of a dimension during parsing or processing. Some third-part interfaces (e.g., ad exchanges) may share a delimiter or use different delimiters.

A concatenated string of dimensions separated by delimiters may be referred to as a packed name. A DSP may configure or require a packed name to be machine or database parseable. For example and in one embodiments, when a packed name reported as one attribute (e.g., one dimension) is loaded into the DSP interface, the packed name can be parsed to show multiple dimensions in an internal reporting system of the DSP. In some embodiments, a plurality of campaigns can be implemented by sharing limited interface resources (e.g., dimensions). Additional and/or customized hierarchies and organization of campaigns can be configured for on an existing interface. For example and in one embodiment, dimensions of three campaigns can be concatenated and executed concurrently as a single object (e.g., campaign). Therefore, a single "campaign" external object may represent multiple real life campaigns.

The DSP and third-party interfaces may be configured with a plurality of types of packed names. Types of packed names or dimensions may include, but is not limited to: line item or placement, creative and pixel. A line item packed name may include any type or form of information related to an ad campaign, flight, or ad bidding configuration. For example and in one embodiment, a line item packed name includes the following string:

Advertiser,!Agent,!Campaign,!CreationGroup,!PubRestr, !Bid_Descrp,!Bid_Strategy,!Bid_Dim, !Targ1,!Targ2, !PH1,!PH2,!PriceMeth A creative packed name may include any type or form of information related to a creative, including concept, design, use and deployment. For example and in one embodiment, a creative packed name includes the following string:

Exchange,!advertiser,!campaign,!concept1,!concept2,!concept3,!productsym,!responsecateg,!fil etype,!dimension, !creativetargeting1,!creativetargeting2,!ch1,!ch2, !3P_join!

A pixel packed name may include any type or form of information related to a pixel, including pixel design, use and deployment. For example and in one embodiment, a pixel packed name includes the following string:

advertiser,!sequence,!pagetype,!pixeltype,!timelag-window, !subtractionID,!friendly page name,!security,!tag-type, !agency_pixel_name_in_atlasorDFA In some embodiments, packed names are configured for at least some portion of third-party interfaces in a uniform or substantially uniform way. For example and in one embodiment, custom interfaces using standard packed names may be applied across third-party interfaces so that DSP interfaces can be configured and operate uniformly (e.g., instead of using custom bidding modules). In some embodiments, a single DSP interface can communicate with a plurality of third-party interfaces using standard packed names. Packed name conventions can be used or extended to other interfaces. For example and in one embodiment, when a DSP receives reports from a third-party ad server, the e-mail subject line may follow packed name conventions in order to match the DSP's reporting interface.

By way of illustration and not intended to be limiting in any way, Table 13 shows one embodiment of attributes and other details related to a number of packed names. As an example, two ad exchanges or interfaces (RMX and ADX) are referenced. The RMX interface uses ",!" as a delimiter. The ADX interface uses ":!" as a delimiter. Among the attributes, Field name may refer to each custom dimension. The Friendly name attribute may refer to a shortened name, identifier or alias of the packed name and/or the field name. The Max size attribute may refer to the size of the packed name or dimension and may be in any unit (e.g., bytes, characters). The Packed Name ID attributed may refer to the type of packed name. The Position may refer to a position of the packed name relative to another packed name. For example, the packed names may be processed in sequence according to the position indicator. The packing Convention attribute may refer to how dimensions are arranged in the packed name. The Inputs attribute may refer to source(s) that provides the dimension information.

| Field Name | Friendly Name | Max Size | Packed Name ID | Position | Packing Convention | Inputs | Notes for standard usage, abbreviations, formats, etc |
|---|---|---|---|---|---|---|---|
| | | | For RMX SLI/ADX Placement Packed Names | | | | |
| mm_advsym | Advertiser | 4 | Line item | 1 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | Pre-defined - e.g. TRST, VIRM, COFX | Unique 4 character symbol for Advertiser - created in Packed Name Symbol Registration form |
| mm_agentsym | Agent | 3 | Line item | 2 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | Pre-defined - e.g. DIG, AVE, COP | Unique 3 character symbol for Agency representing Advertiser - created in Packed Name Symbol Registration form |
| mm_campaign | Campaign | 12 | Line item | 3 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | User defined - e.g. March-April, Flight 1 Pop-Pix | Identifies campaign |
| mm_grouping | CreationGroup | 2 | Line item | 4 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | User defined - 1 for initial line item, add 1 every time a change is made | Instance of line item, increments by one for each iteration of line item - '1' for initial LI, '2' if targeting is changed, '3' if FC is then changed, etc |

-continued

| Field Name | Friendly Name | Max Size | Packed Name ID | Position | Packing Convention | Inputs | Notes for standard usage, abbreviations, formats, etc |
|---|---|---|---|---|---|---|---|
| mm_pubrestr | Publisher Restriction | 12 | Line item | 5 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | Pre-defined - e.g. Global, SBP, ex[BlgPub Name(s)]+, in[BigPub Name(s)]+ | Global (no restr), SBP (RMX Sandbox Pub), ex (exclude) in (include). Generally only name big pubs, but add a '+' to indicate other, smaller pubs. E.G. 'exAdtegrity+' Think about introducing symbols for pubs |
| mm_biddescrp | Bid Description | 32 | Line item | 6 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | User defined - e.g. LaunchofCPC, EBM Discovery | Describes status of line item - 'QA', 'Launch', 'Discovery' - if introducing a change describe e.g. 'LaunchofCPAon3-15' or 'Daypart 4-15' |
| mm_bidstrat | Bid Strategy | 3 | Line item | 7 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | Pre-defined - EBM, REM, CTX | 'EBM' for Exchange Bid Management, 'REM' for Re-Marketing, 'CTX' for Contextual |
| mm_biddim | Bid Dimension | 9 | Line item | 8 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | Pred-defined - All, 120 × 600, 160 × 600, 300 × 250, 468 × 60, 728 × 90 | One RMX SLI applies to 'All' sizes - One ADX placement needs to be created per size |
| mm_targ1 | Target 1 | 12 | Line item | 9 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | User defined - e.g. fc = 4, NYC-only | Describes targeting rule e.g. 'NYC-only', 'fc = 4' (freq cap of 4 × 24) |
| mm_targ2 | Target 2 | 12 | Line item | 10 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | User defined - e.g. 2-7am | Describes add'l targeting rule |
| mm_targroi | Target ROI | 32 | Line item | 11 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | Pre-defined - as input in ADX/RMX - e.g. gCTR .2, gCPC .5, gCPA 10 | Describes target metrics for bid, as defined in ADX/RMX - e.g. CPC target in RMX requires goal input for CPC (gCPC) and CTR (gCTR), or gCPA. |
| mm_priceval | Price/Bid Amount | 32 | Line item | 12 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | Pre-defined - as input in ADX/RMX | Bid amount for line item - e.g. '4' for a $4 dCPM bid in RMX, '2' for a max CPM bid in ADX |
| mm_pricemeth | Pricing Methodology | 4 | Line item | 13 | Advertiser,!Agent,!Campaign, !CreationGroup,!PubRestr, !Bid_Descrp,!Bid_Strategy, !Bid_Dim,!Targ1,!Targ2,!PH1, !PH2,!PriceMeth | Pre-defined - RMX: CPA, CPC, CPM, dCPM | ADX: bCPM, aCPM, cCPM, iCPM, mCPM | Describes the Pricing Methology set in RMX or ADX (bCPM = budget goal via CPM bids. aCPM = tries to reach CPA goal with CPM bid, using CPA target and budget. cCPM = tries to reach CPC goal with CPM bid, using CPC target and budget. iCPM = tries for impression goal with CPM, using bid and budget) |
| For Creative Packed Names | | | | | | | |
| mm_exch | Exchange | 2 | Creative Name | 1 | Exchange,!advertiser,!campaign, !concept1,!concept2,!concept3, !productsym,!responsecateg,!filetype, !dimension,!creativetargeting1, !creativetargeting2,!ch1,!ch2, !3P_join | Pre-defined - 'A' for ADX, 'R' for RMX | Defines which exchange is being used - 'A' for ADX, 'R' for RMX |

| Field Name | Friendly Name | Max Size | Packed Name ID | Position | Packing Convention | Inputs | Notes for standard usage, abbreviations, formats, etc |
|---|---|---|---|---|---|---|---|
| mm_advsym_c | advertiser | 4 | Creative Name | 2 | Exchange,!advertiser,!campaign,!concept1,!concept2,!concept3,!productsym,!responsecateg,!filetype,!dimension,!creativetargeting1,!creativetargeting2,!ch1,!ch2,!3P_join | Pre-defined - e.g. TRST, VIRM, COFX | Unique 4 character symbol for Advertiser - same as Line Item. |
| mm_campaign_c | campaign | 12 | Creative Name | 3 | Exchange,!advertiser,!campaign,!concept1,!concept2,!concept3,!productsym,!responsecateg,!filetype,!dimension,!creativetargeting1,!creativetargeting2,!ch1,!ch2,!3P_join | User defined - e.g. March-April, Flight 1 Pop-Pix | Describes campaign - e.g. 'March-April' - same as for line item |
| mm_concpt1 | Creative concept label 1 | 12 | Creative Name | 4 | Exchange,!advertiser,!campaign,!concept1,!concept2,!concept3,!productsym,!responsecateg,!filetype,!dimension,!creativetargeting1,!creativetargeting2,!ch1,!ch2,!3P_join | User defined - e.g. Golf | Describes key concept element defined by MM, e.g. the color 'blue' used prominently |
| mm_concpt2 | Creative concept label 2 | 12 | Creative Name | 5 | Exchange,!advertiser,!campaign,!concept1,!concept2,!concept3,!productsym,!responsecateg,!filetype,!dimension,!creativetargeting1,!creativetargeting2,!ch1,!ch2,!3P_join | User defined - e.g. Capture | Describes key concept element defined by MM, e.g. the color 'blue' used prominently |
| mm_concpt3 | Creative concept label 3 | 12 | Creative Name | 6 | Exchange,!advertiser,!campaign,!concept1,!concept2,!concept3,!productsym,!responsecateg,!filetype,!dimension,!creativetargeting1,!creativetargeting2,!ch1,!ch2,!3P_join | User defined - e.g. $650 pkdg | Describes key concept element defined by MM, e.g. the color 'blue' used prominently |
| mm_prodsym | Product Symbol | 6 | Creative Name | 7 | Exchange,!advertiser,!campaign,!concept1,!concept2,!concept3,!productsym,!responsecateg,!filetype,!dimension,!creativetargeting1,!creativetargeting2,!ch1,!ch2,!3P_join | Pre-defined - e.g. RESORT, PUBENT | Product symbol for product being marketed |
| mm_resp | Response Category | 2 | Creative Name | 8 | Exchange,!advertiser,!campaign,!concept1,!concept2,!concept3,!productsym,!responsecateg,!filetype,!dimension,!creativetargeting1,!creativetargeting2,!ch1,!ch2,!3P_join | Pre-defined - BD, BR, BL | 'BD' for brand, 'BR' for branded response, 'BL' for blend |
| mm_filetype | filetype | 3 | Creative Name | 9 | Exchange,!advertiser,!campaign,!concept1,!concept2,!concept3,!productsym,!responsecateg,!filetype,!dimension,!creativetargeting1,!creativetargeting2,!ch1,!ch2,!3P_join | Pre-defined - SWF, IMG | Creative file type |
| mm_dimension | dimension | 9 | Creative Name | 10 | Exchange,!advertiser,!campaign,!concept1,!concept2,!concept3,!productsym,!responsecateg,!filetype,!dimension,!creativetargeting1,!creativetargeting2,!ch1,!ch2,!3P_join | Pre-defined - 120 × 600, 160 × 600, 300 × 250, 468 × 60, 728 × 90 | Specifies W × H - '120 × 600', '160 × 600', '300 × 250', '468 × 60', '728 × 90' |
| mm_crtag1 | creative-targeting1 | 18 | Creative Name | 11 | Exchange,!advertiser,!campaign,!concept1,!concept2,!concept3,!productsym,!responsecateg,!filetype,!dimension,!creativetargeting1,!creativetargeting2,!ch1,!ch2,!3P_join | User-defined - e.g. 'Mozilla' | Describes targeting set at creative level |
| mm_crtag2 | creative-targeting2 | 18 | Creative Name | 12 | Exchange,!advertiser,!campaign,!concept1,!concept2,!concept3,!productsym,!responsecateg,!filetype,!dimension,!creativetargeting1,!creativetargeting2,!ch1,!ch2,!3P_join | User-defined - e.g. 'CA-only' | Describes targeting set at creative level |
| mm_ch1 | Creative Placeholder 1 | 32 | Creative Name | 13 | Exchange,!advertiser,!campaign,!concept1,!concept2,!concept3,!productsym,!responsecateg,!filetype,!dimension,!creativetargeting1,!creativetargeting2,!ch1,!ch2,!3P_join | TBD | Placeholder for additional fields |

| Field Name | Friendly Name | Max Size | Packed Name ID | Position | Packing Convention | Inputs | Notes for standard usage, abbreviations, formats, etc |
|---|---|---|---|---|---|---|---|
| mm_ch2 | Creative Placeholder 1 | 32 | Creative Name | 14 | Exchange,!advertiser,!campaign,!concept1,!concept2,!concept3,!productsym,!responsecateg,!filetype,!dimension,!creativetargeting1,!creativetargeting2,!ch1,!ch2,!3P_join | TBD | Placeholder for additional fields |
| mm_3pjoin | agency_creative_name_in_atlasorDFA | 64 | Creative Name | 15 | Exchange,!advertiser,!campaign,!concept1,!concept2,!concept3,!productsym,!responsecateg,!filetype,!dimension,!creativetargeting1,!creativetargeting2,!ch1,!ch2,!3P_join | Pre-defined - code representing name in 3rd party system | Creative name from DFA or Atlas - match table with codes created for creative names or ids, code inserted here |

For ADX/RMX Pixel Packed Names (In some embodiments, 50 character limit, e.g., due to RMX constraint)

| Field Name | Friendly Name | Max Size | Packed Name ID | Position | Packing Convention | Inputs | Notes for standard usage, abbreviations, formats, etc |
|---|---|---|---|---|---|---|---|
| mmx_advsym | Advertiser | 4 | Pixels | 1 | advertiser,!sequence,!pagetype,!pixeltype,!timelag-window,!subtractionID,!friendly page name,!security,!tag-type,!agency_pixel_name_in_at lasorDFA | Pre-defined - e.g. TRST, VIRM, COFX | Unique 4 character symbol for Advertiser |
| mmx_pixseq | sequence | 4 | Pixels | 2 | advertiser,!sequence,!pagetype,!pixeltype,!timelag-window,!subtractionID,!friendly page name,!security,!tag-type,!agency_pixel_name_in_at lasorDFA | User defined - e.g. 1A, 1B, 2A, 3A | Pixel order allows for easy sorting by importance - 1A, 1B, 1C, 1D.A, 1D.B (several funnel pages, different landing page outcomes) |
| mmx_pixpgetyp | pagetype | 3 | Pixels | 3 | advertiser,!sequence,!pagetype,!pixeltype,!timelag-window,!subtractionID,!friendly page name,!security,!tag-type,!agency_pixel_name_in_at lasorDFA | Pre-defined - MRT, MRO, MRD, FUN, LPG, RED, REI, REP | Funnel (FUN), Landing Page (LPG), Remarketing Direct RED), Remarketing Indirect (REM), Merit (MRT), REP |
| mmx_pixtype | pixeltype | 3 | Pixels | 4 | advertiser,!sequence,!pagetype,!pixeltype,!timelag-window,!subtractionID,!friendly page name,!security,!tag-type,!agency_pixel_name_in_at lasorDFA | Pre-defined - RMX: TRK, SEG, ?CRE? Merit only: PVO, PCO, PCS, PVS, PCP \| ADX: ADX | 'SEG' - RMX remarketing pixel. 'TRK' - RMX conversion pixel. think about TRK only = PV setting or changing to PVT |
| mmx_pixwindow | timelag-window | 4 | Pixels | 5 | advertiser,!sequence,!pagetype,!pixeltype,!timelag-window,!subtractionID,!friendly page name,!security,!tag-type,!agency_pixel_name_in_at lasorDFA | Pre-defined - unl or X d (30 d) or X h (36 h) | 'unl' for unlimited, or define actual number of days/hours, etc |
| mmx_pixsub | subtraction ID | 2 | Pixels | 6 | advertiser,!sequence,!pagetype,!pixeltype,!timelag-window,!subtractionID,!friendly page name,!security,!tag-type,!agency_pixel_name_in_at lasorDFA | Pre-defined - 4 digits | 4 digit subtraction ID for subtracting PC counts from PV pixels in RMX, unique by ?campaign? |
| mmx_pixshrtnme | short page name | 18 | Pixels | 7 | advertiser,!sequence,!pagetype,!pixeltype,!timelag-window,!subtractionID,!friendly page name,!security,!tag-type,!agency_pixel_name_in_at lasorDFA | Pre-defined - TY, HP, TP, BP (brand page), LGI (login), LGO (logout) | Allows for easy understanding of what page the pixel lives on - should be short as possible while remaining intuitable |
| mmx_pixsecrty | security | 2 | Pixels | 8 | advertiser,!sequence,!pagetype,!pixeltype,!timelag-window,!subtractionID,!friendly page name,!security,!tag-type,!agency_pixel_name_in_at lasorDFA | Pre-defined - S, N | Secure or Non-secure |
| mmx_pixtagtype | tag-type | 2 | Pixels | 9 | advertiser,!sequence,!pagetype,!pixeltype,!timelag-window,!subtractionID,!friendly page name,!security,!tag-type,!agency_pixel_name_in_at lasorDFA | Pre-defined - J, I | Javascript or Image |
| mmx_pix3Pnme | agency_pixel_name_in_atlasorDFA | 64 | Pixels | 10 | advertiser,!sequence,!pagetype,!pixeltype,!timelag-window,!subtractionID,!friendly page name,!security,!tag-type,!agency_pixel_name_in_at lasorDFA | Pre-defined - code representing name in 3rd party system | Pixel name from DFA or Atlas - match table with codes created for pixel names or ids, code inserted here |

Packed Names for Reporting

| Field Name | Friendly Name | Packed Max Size | Name ID | Position | Packing Convention | Inputs | Notes for standard usage, abbreviations, formats, etc |
|---|---|---|---|---|---|---|---|
| 3P Reports | mm_3padserve | | | 1 | 3PAdServer:!3Padvertiser:!3Pcampaign:!3Ptagid:!3Ptagname | | |
| 3P Reports | mm_3padv | | | 2 | 3PAdServer:!3Padvertiser:!3Pcampaign:!3Ptagid:!3Ptagname | | |
| 3P Reports | mm_3pcmpgn | | | 3 | 3PAdServer:!3Padvertiser:!3Pcampaign:!3Ptagid:!3Ptagname | | |
| 3P Reports | mm_3ptagid | | | 4 | 3PAdServer:!3Padvertiser:!3Pcampaign:!3Ptagid:!3Ptagname | | |
| 3P Reports | mm_3ptagname | | | 5 | 3PAdServer:!3Padvertiser:!3Pcampaign:!3Ptagid:!3Ptagname | | |

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention as defined by the following claims.

What is claimed:

1. A computer-implemented method for verifying a user across a plurality of advertisement exchanges and determining a bid for an impression opportunity on an advertisement exchange of the plurality of advertisement exchanges, the method comprising:

receiving, by a computer system, a first biddable request to bid for a first impression opportunity on a first advertisement exchange of the plurality of advertisement exchanges, wherein the first biddable request comprises a first user identifier used by the first advertisement exchange to identify the user;

inserting, by the computer system, into a first bid for the first impression opportunity a pixel comprising a key to a cookie mapping for the user, and placing the first bid for the first impression opportunity;

mapping, by the computer system, the first user identifier to a common user identifier, wherein the mapping the first user identifier to the common user identifier is caused by the pixel being triggered;

generating, by the computer system, a timestamp indicating when the mapping of the first user identifier to the common user identifier was performed;

receiving, by the computer system, a second biddable request to bid for a second impression opportunity on a second advertisement exchange of the plurality of advertisement exchanges, wherein the second biddable request comprises a second user identifier used by the second advertisement exchange to identify the user;

mapping, by the computer system, the second user identifier to the common user identifier and associating the second user identifier to the first identifier via the common user identifier;

verifying, by the computer system, that the mapping of the first user identifier is not expired in accordance to a predetermined policy by checking the timestamp indicating when the mapping of the first user identifier to the common user identifier was created;

generating, by the computer system, an updated mapping of the first user identifier against the common user identifier if the mapping of the first user identifier is determined to be expired;

querying, by the computer system, user information associated with the verified or updated mapping of the first user identifier; and determining, by the computer system, a second bid for the second impression opportunity in response to the queried user information associated with the verified or updated mapping of the first user identifier, wherein the second bid is determined based at least in part on the queried user information, wherein the computer system comprises a computer processor and an electronic storage medium.

2. The computer-implemented method of claim 1, further comprising placing, by the computer system, a second bid for the second impression opportunity on the second advertisement exchange, wherein the second bid comprises a pixel for trigger cookie mapping.

3. The computer-implemented method of claim 1, further comprising assigning, by the computer system, a first exchange identifier for identifying the first advertisement exchange.

4. The computer-implemented method of claim 3, wherein the first exchange identifier is stored in the cookie mapping.

5. The computer-implemented method of claim 1, further comprising assigning, by the computer system, a second exchange identifier for identifying the second advertisement exchange.

6. The computer-implemented method of claim 1, wherein the queried user information is stored on a user database of the computer system.

7. The computer-implemented method of claim 1, wherein the queried user information comprises one or more user attributes that are applicable for determining the second bid for the second impression opportunity.

8. The computer-implemented method of claim 7, wherein the user information comprises one or more of age, gender, geographical data, categories of interest, actions, or purchases of the user.

9. The computer-implemented method of claim 1, further comprising receiving, by a pixel server of the computer system, a call from the pixel.

10. The computer-implemented method of claim 9, further comprising decoding, by the computer system, the first user identifier from a string parameter of a query of the call from the pixel.

11. A system for verifying a user across a plurality of advertisement exchanges and determining a bid for an impression opportunity on an advertisement exchange of the plurality of advertisement exchanges, the system comprising:
- one or more computer readable storage devices configured to store a plurality of computer executable instructions; and
- one or more hardware computer processors in communication with the one or more computer readable storage devices and configured to execute the plurality of computer executable instructions in order to operate a demand side platform, wherein the demand side platform is configured to:
  - receive a first biddable request to bid for a first impression opportunity on a first advertisement exchange of the plurality of advertisement exchanges, wherein the first biddable request comprises a first user identifier used by the first advertisement exchange to identify the user;
  - insert into a first bid for the first impression opportunity a pixel comprising a key to a cookie mapping for the user, and place the first bid for the first impression opportunity;
  - map the first user identifier to a demand side platform user identifier, wherein the mapping the first user identifier to the demand side platform user identifier is caused by the pixel being triggered;
  - generate a timestamp indicating when the mapping of the first user identifier to the demand side platform user identifier was performed;
  - receive a second biddable request to bid for a second impression opportunity on a second advertisement exchange of the plurality of advertisement exchanges, wherein the second biddable request comprises a second user identifier used by the second advertisement exchange to identify the user;
  - map the second user identifier to the common user identifier and associate the second user identifier to the first identifier via the common user identifier;
  - verify that the mapping of the first user identifier is not expired in accordance to a predetermined policy by checking the timestamp indicating when the mapping of the first user identifier to the demand side platform user identifier was created;
  - generate an updated mapping of the first user identifier against the demand side platform user identifier if the mapping of the first user identifier is determined to be expired;
  - query user information associated with the verified or updated mapping of the first user identifier; and
  - determine a second bid for the second impression opportunity in response to the queried user information associated with the verified or updated mapping of the first user identifier, wherein the second bid is determined based at least in part on the queried user information.

12. The system of claim 11, wherein the demand side platform is further configured to place a second bid for the second impression opportunity on the second advertisement exchange, wherein the second bid comprises a pixel for trigger cookie mapping.

13. The system of claim 11, wherein the demand side platform is further configured to assign a first exchange identifier for identifying the first advertisement exchange.

14. The system of claim 13, wherein the first exchange identifier is stored in the cookie mapping.

15. The system of claim 11, wherein the demand side platform is further configured to assign a second exchange identifier for identifying the second advertisement exchange.

16. The system of claim 11, wherein the queried user information is stored on a user database of the demand side platform.

17. The system of claim 11, wherein the queried user information comprises one or more user attributes that are applicable for determining the second bid for the second impression opportunity.

18. The system of claim 17, wherein the user information comprises one or more of age, gender, geographical data, categories of interest, actions, or purchases of the user.

19. The system of claim 11, wherein the demand side platform is further configured to receive a call from the pixel.

20. The system of claim 19, wherein the demand side platform is further configured to decode the first user identifier from a string parameter of a query of the call from the pixel.

* * * * *